US012440582B2

(12) United States Patent
Zheng et al.

(10) Patent No.: US 12,440,582 B2
(45) Date of Patent: Oct. 14, 2025

(54) BIOTHIOL-ACTIVATABLE PROBE AND METHOD OF USE

(71) Applicant: BOARD OF REGENTS, THE UNIVERSITY OF TEXAS SYSTEM, Austin, TX (US)

(72) Inventors: Jie Zheng, Plano, TX (US); Xingya Jiang, Richardson, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 874 days.

(21) Appl. No.: 17/620,312

(22) PCT Filed: Jun. 17, 2020

(86) PCT No.: PCT/US2020/038045
§ 371 (c)(1),
(2) Date: Dec. 17, 2021

(87) PCT Pub. No.: WO2020/257224
PCT Pub. Date: Dec. 24, 2020

(65) Prior Publication Data
US 2022/0241439 A1 Aug. 4, 2022

Related U.S. Application Data

(60) Provisional application No. 62/862,484, filed on Jun. 17, 2019.

(51) Int. Cl.
A61K 49/00 (2006.01)
A61K 9/51 (2006.01)
A61K 49/18 (2006.01)
A61P 1/16 (2006.01)
G01N 33/542 (2006.01)
G01N 33/543 (2006.01)
G01N 33/68 (2006.01)
B82Y 5/00 (2011.01)

(52) U.S. Cl.
CPC ........ *A61K 49/0093* (2013.01); *A61K 9/5115* (2013.01); *A61K 49/0034* (2013.01); *A61K 49/186* (2013.01); *A61P 1/16* (2018.01); *G01N 33/542* (2013.01); *G01N 33/54353* (2013.01); *G01N 33/6815* (2013.01); *B82Y 5/00* (2013.01); *G01N 2800/085* (2013.01)

(58) Field of Classification Search
CPC .............. A61K 49/0093; A61K 9/5115; A61K 49/0034; A61K 49/186; A61K 49/0052; A61P 1/16; A61P 1/00; G01N 33/542; G01N 33/54353; G01N 33/6815; G01N 2800/085; G01N 33/5735; B82Y 5/00
See application file for complete search history.

(56) References Cited

U.S. PATENT DOCUMENTS

| | | | |
|---|---|---|---|
| 5,928,625 A | 7/1999 | Dorshow et al. | |
| 6,228,344 B1 | 5/2001 | Dorshow et al. | |
| 8,969,027 B2* | 3/2015 | Bossmann | B82Y 15/00 977/773 |
| 9,295,685 B2 | 3/2016 | Gombotz et al. | |
| 9,370,589 B2 | 6/2016 | Hara et al. | |
| 9,549,998 B2* | 1/2017 | Kattumuri | A61B 6/508 |
| 2012/0330116 A1 | 12/2012 | Eggers et al. | |
| 2017/0304902 A1 | 10/2017 | Azubel et al. | |

FOREIGN PATENT DOCUMENTS

| | | |
|---|---|---|
| CN | 103721271 | 4/2014 |
| CN | 103990138 | 8/2014 |

OTHER PUBLICATIONS

Park et al., Bioorganic & Medicinal Chemistry Letters 20 (2010) 2287-2291. (Year: 2010).*
Calavia et al., Photochem. Photobiol. Sci. 2018, 17, 1534-1552. (Year: 2018).*
Yu Hui et al: "A gold nanocluster-based ratiometric fluorescent probe for cysteine and homocysteine detection in living cells", New Journal of Chemistry, vol. 41, No. 11, Jan. 1, 2017 (Jan. 1, 2017), pp. 4416-4423, XP093004240, GB ISSN: 1144-0546, DOI: 10.1039/C6NJ04134E.
Partial Supplementary European Search Report issued for European Application No. 20827233.6, dated Dec. 15, 2022, 12 pages.
International Search Report and Written Opinion mailed Dec. 1, 2020 in PCT/US2020/038045 (16 pages).
Tina Gulin-Sarfraz et al., "FRET-reporter nanoparticles to monitor redox-induced intracellular delivery of active compounds", RSC Advances, 2014, 4, pp. 165429-16432.
https://en.wikipedia.org/w/index.php?title=Disulfide&oldid=892013719, "Disulfide", Apr. 11, 2019, entire document.
Liu et al., "Chapter Two-Emerging Regulatory Paradigms in Glutathione Metabolism," Advances in Cancer Research vol. 122, 2014, pp. 69-101.

(Continued)

*Primary Examiner* — Robert S Cabral
(74) *Attorney, Agent, or Firm* — Meunier Carlin & Curfman LLC

(57) ABSTRACT

A biothiol-activatable composition is disclosed that is configured to dissociate in the presence of a concentration of biomolecules that are excreted normally by a liver of a living subject comprising a noble metal nanoparticle, a reporter molecule, a linker molecule that is conjugated to the noble metal nanoparticle and to the reporter molecule, but displaceable in the presence of the biomolecules, and wherein the reporter molecule is released in the presence of the biomolecules. The noble nanoparticle is preferably a gold nanoparticle; the reporter molecule preferably comprises at least one of a fluorescent dye molecule, a radioactive molecule or an MRI agent and the linker molecule is preferably a thiol molecule displaceable by biothiols in the liver. In another aspect, the reporter molecule dissociates from the composition in the presence of a concentration of glutathione similar to what is found in liver sinusoids of a normally functioning liver.

21 Claims, 46 Drawing Sheets

(56) References Cited

OTHER PUBLICATIONS

Liu et al., "A novel near-infrared fluorescent probe with a large Stokes shift for biothiol detection and application in in vitro and in vivo fluorescense imaging", J. Mater. Chem. B, 2017, 5, entire document.
Adams J, Lauterburg B, Mitchell J. Plasma glutathione and glutathione disulfide in the rat: regulation and response to oxidative stress. J Pharmacol Exp Ther 1983, 227(3): 749-754.
Alander, Jarmo T., et al. "A review of indocyanine green fluorescent imaging in surgery." International journal of biomedical imaging 2012 (2012).
Balasubramanian SK, Jittiwat J, Manikandan J, Ong C-N, Liya EY, Ong W-Y. Biodistribution of gold nanoparticles and gene expression changes in the liver and spleen after intravenous administration in rats. Biomaterials 2010, 31(8): 2034-2042.
Ballatori N, Krance SM, Marchan R, Hammond CL. Plasma membrane glutathione transporters and their roles in cell physiology and pathophysiology. Mol Aspects Med 2009, 30(1-2): 13-28.
Barazzouk, S., Kamat, P. V. & Hotchandani, S. Photoinduced electron transfer between chlorophyll a and gold nanoparticles. The Journal of Physical Chemistry B 109, 716-723 (2005).
Braet F, Wisse E. Structural and functional aspects of liver sinusoidal endothelial cell fenestrae: a review. Comparative hepatology 2002, 1(1): 1.
Casini, A., Pompella, A. & Comporti, M. Liver glutathione depletion induced by bromobenzene, iodobenzene, and diethylmaleate poisoning and its relation to lipid peroxidation and necrosis. The American journal of pathology 118, 225 (1985).
Chen, Y. et al. Glutathione defense mechanism in liver injury: insights from animal models. Food and chemical toxicology 60, 38-44 (2013).
Choi HS, Liu W, Misra P, Tanaka E, Zimmer JP, Ipe BI, et al. Renal clearance of quantum dots. Nat Biotechnol 2007, 25(10): 1165.
Czeczot, H., Scibior, D., Skrzycki, M. & Podsiad, M. Glutathione and GSH-dependent enzymes in patients with liver cirrhosis and hepatocellular carcinoma. Acta biochimica polonica 53, 237-241 (2006).
Deleve, L. D. & Kaplowitz, N. in Seminars in liver disease. 251-266 (© 1990 by Thieme Medical Publishers, Inc.).
Dhar, S., Daniel, W. L., Giljohann, D. A., Mirkin, C. A. & Lippard, S. J. Polyvalent oligonucleotide gold nanoparticle conjugates as delivery vehicles for platinum (IV) warheads. J American Chemical Society 131, 14652-14653 (2009).
Dickinson DA, Forman HJ. Cellular glutathione and thiols metabolism. Biochem Pharmacol 2002, 64(5-6): 1019-1026.
Dreaden EC, Austin LA, Mackey MA, El-Sayed MA. Size matters: gold nanoparticles in targeted cancer drug delivery. Ther Deliv 2012, 3(4): 457-478.
Du B, Jiang X, Das A, Zhou Q, Yu M, Jin R, et al. Glomerular barrier behaves as an atomically precise bandpass filter in a sub-nanometre regime. Nature Nanotechnology 2017, 12: 1096.
Du B, Yu M, Zheng J. Transport and interactions of nanoparticles in the kidneys. Nature Reviews Materials 2018: 1.
Du, Yongle, et al. "Synthesis and evaluation of doxorubicin-loaded gold nanoparticles for tumor-targeted drug delivery." Bioconjugate chemistry 29.2 (2018): 420-430.
Eguchi, A., Wree, A. & Feldstein, A. E. Biomarkers of liver cell death. Journal of hepatology 60, 1063-1074 (2014).
Fernandez-Checa, J. C. & Kaplowitz, N. Hepatic mitochondrial glutathione: transport and role in disease and toxicity. Toxicology and applied pharmacology 204, 263-273 (2005).
Fischer HC, Liu L, Pang KS, Chan WC. Pharmacokinetics of nanoscale quantum dots: in vivo distribution, sequestration, and clearance in the rat. Adv Funct Mater 2006, 16(10): 1299-1305.
Gao, B. & Bataller, R. Alcoholic liver disease: pathogenesis and new therapeutic targets. Gastroenterology 141, 1572-1585 (2011).

Garcia-Ruiz, C. & Fernandez-Checa, J. C. Mitochondrial glutathione: hepatocellular survival-death switch. Journal of gastroenterology and hepatology 21, S3-S6 (2006).
Gu X, Manautou JE. Molecular mechanisms underlying chemical liver injury. Expert Rev Mol Med 2012, 14.
Guan, Tianpei, et al. "From detection to resection: photoacoustic tomography and surgery Guidance with indocyanine green loaded gold Nanorod@ liposome core-shell nanoparticles in liver Cancer." Bioconjugate chemistry 28.4 (2017): 1221-1228.
Hanigan MH, Pitot HC. Gamma-glutamyl transpeptidase—its role in hepatocarcinogenesis. Carcinogenesis 1985, 6(2): 165-172.
Hirano, A., Kaplowitz, N., Tsukamoto, H., Kamimura, S. & Fernandez-Checa, J. C. Hepatic mitochondrial glutathione depletion and progression of experimental alcoholic liver disease in rats. Hepatology 16, 1423-1427 (1992).
Hirn, S. et al. Particle size-dependent and surface charge-dependent biodistribution of gold nanoparticles after intravenous administration. European journal of pharmaceutics and biopharmaceutics 77, 407-416 (2011).
Iida, A. et al. Carbamazepine-induced liver injury requires CYP3A-mediated metabolism and glutathione depletion in rats. Drug Metabolism and Disposition 43, 958-968 (2015).
Jaeschke, H., Xie, Y. & McGill, M. R. Acetaminophen-induced liver injury: from animal models to humans. Journal of clinical and translational hepatology 2, 153 (2014).
Jewell, S. et al. Decreased hepatic glutathione in chronic alcoholic patients. Journal of hepatology 3, 1-6 (1986).
Jiang, X., Du, B. & Zheng, J. Glutathione-mediated biotransformation in the liver modulates nanoparticle transport. Nature nanotechnology 14, 874-882 (2019).
Jocelyn P. The Standard Redox Potential of Cysteine-Cystine from the Thiol-Disulphide Exchange Reaction with Glutathione and Lipoic Acid. The FEBS Journal 1967, 2(3): 327-331.
Kaplowitz N, Aw TY, Ookhtens M. The regulation of hepatic glutathione. Annu Rev Pharmacool Toxicol 1985, 25(1): 715-744.
Kaplowitz, N. The importance and regulation of hepatic glutathione. The Yale journal of biology and medicine 54, 497 (1981).
Lauterburg, B. H., Adams, J. D. & Mitchell, J. R. Hepatic glutathione homeostasis in the rat: efflux accounts for glutathione turnover. Hepatology 4, 586-590 (1984).
Lee, A. U. & Farrell, G. C. Mechanism of azathioprine-induced injury to hepatocytes: roles of glutathione depletion and mitochondrial injury. Journal of hepatology 35, 756-764 (2001).
Lee, W. M. Drug-induced hepatotoxicity. New England Journal of Medicine 349, 474-485 (2003).
Liu, J. et al. PEGylation and Zwitterionization: Pros and Cons in the Renal Clearance and Tumor Targeting of Near-IR-Emitting Gold Nanoparticles. Angew. Chem. 125, 12804-12808 (2013).
Lu, S. C. Glutathione synthesis. Biochimica et Biophysica Acta (BBA)-General Subjects 1830, 3143-3153 (2013).
Luo, Ming, et al. "Gold nanoparticles grafted by reduced glutathione with thiol function preservation." Colloid and Interface Science Communications 14 (2016): 8-12.
MacAllister, S. L., Young, C., Guzdek, A., Zhidkov, N. & O'Brien, P. J. Molecular cytotoxic mechanisms of chlorpromazine in isolated rat hepatocytes. Canadian journal of physiology and pharmacology 91, 56-63 (2013).
Macdonald, J. M., Schmidlin, O. & James, T. L. In vivo monitoring of hepatic glutathione in anesthetized rats by 13C NMR. Magnetic Resonance in Medicine: An Official Journal of the International Society for Magnetic Resonance in Medicine 48, 430-439 (2002).
Maellaro, E., Casini, A. F., Del Bello, B. & Comporti, M. Lipid peroxidation and antioxidant systems in the liver injury produced by glutathione depleting agents. Biochemical pharmacology 39, 1513-1521 (1990).
Meister, A. & Anderson, M. E. Glutathione. Annual review of biochemistry 52, 711-760 (1983).
Miao, Q. et al. Molecular afterglow imaging with bright, biodegradable polymer nanoparticles. Nature biotechnology 35, 1102 (2017).

(56) References Cited

OTHER PUBLICATIONS

Mitchell, J., Jollow, D., Potter, W., Gillette, J. & Brodie, B. Acetaminophen-induced hepatic necrosis. IV. Protective role of glutathione. Journal of Pharmacology and Experimental Therapeutics 187, 211-217 (1973).

Mohar, I. et al. Acetaminophen-induced liver damage in mice is associated with gender-specific adduction of peroxiredoxin-6. Redox biology 2, 377-387 (2014).

Nigam, D., Shukla, G. S. & Agarwal, A. K. Glutathione depletion and oxidative damage in mitochondria following exposure to cadmium in rat liver and kidney. Toxicology letters 106, 151-157 (1999).

Ookhtens M, Hobdy K, Corvasce M, Aw TY, Kaplowitz N. Sinusoidal efflux of glutathione in the perfused rat liver. Evidence for a carrier-mediated process. J Clin Invest 1985, 75(1): 258.

Paolicchi A, Sotiropuolou M, Perego P, Daubeuf S, Visvikis A, Lorenzini E, et al. γ-Glutamyl transpeptidase catalyses the extracellular detoxification of cisplatin in a human cell line derived from the proximal convoluted tubule of the kidney. Eur J Cancer 2003, 39(7): 996-1003.

Parmentier C, Leroy P, Wellman M, Nicolas A. Determination of cellular thiols and glutathione-related enzyme activities: versatility of high-performance liquid chromatography-spectrofluorimetric detection. Journal of Chromatography B: Biomedical Sciences and Applications 1998, 719(1-2): 37-46.

Peng C, Gao X, Xu J, Du B, Ning X, Tang S, et al. Targeting orthotopic gliomas with renal-clearable luminescent gold nanoparticles. Nano research 2017, 10(4): 1366-1376.

Plummer, J. L., Smith, B. R., Sies, H. & Bend, J. R. [8] Chemical depletion of glutathione in vivo in Methods in enzymology vol. 77, pp. 50-59 (Elsevier, 1981).

Purcell, Roslyn, Peter Kruger, and Mark Jones. "Indocyanine green elimination: a comparison of the LiMON and serial blood sampling methods." ANZ journal of surgery 76.1-2 (2006): 75-77.

Purucker, E., Winograd, R., Roeb, E. & Matern, S. Glutathione status in liver and plasma during development of biliary cirrhosis after bile duct ligation. Research in experimental medicine 198, 167-174 (1998).

Rolo, A. P., Teodoro, J. S. & Palmeira, C. M. Role of oxidative stress in the pathogenesis of nonalcoholic steatohepatitis. Free Radical Biology and Medicine 52, 59-69 (2012).

Shaw, S., Rubin, K. P. & Lieber, C. S. Depressed hepatic glutathione and increased diene conjugates in alcoholic liver disease. Digestive diseases and sciences 28, 585-589 (1983).

Sheweita, S. A. Heavy metal-induced changes in the Glutathione levels and Glutathione Reductase/Glutathione S-Transferase activities in the liver of male mice. International journal of toxicology 17, 383-392 (1998).

Shinohara H, Tanaka A, Kitai T, Yanabu N, Inomoto T, Satoh S, et al. Direct measurement of hepatic indocyanine green clearance with near-infrared spectroscopy: Separate evaluation of uptake and removal. Hepatology 1996, 23(1): 137-144.

Shuhendler, A. J., Pu, K., Cui, L., Uetrecht, J. P. & Rao, J. Real-time imaging of oxidative and nitrosative stress in the liver of live animals for drug-toxicity testing. Nature biotechnology 32, 373 (2014).

Simpson, Carrie A., et al. "In vivo toxicity, biodistribution, and clearance of glutathione-coated gold nanoparticles." Nanomedicine: Nanotechnology, Biology and Medicine 9.2 (2013): 257-263.

Singhal RK, Anderson ME, Meister A. Glutathione, a first line of defense against cadmium toxicity. The FASEB Journal 1987, 1(3): 220-223.

Skamarauskas, J. T. et al. Noninvasive In Vivo Magnetic Resonance Measures of Glutathione Synthesis in Human and Rat Liver as an Oxidative Stress Biomarker. Hepatology 59, 2321-2330, doi:10.1002/hep.26925 (2014).

Sun S, Ning X, Zhang G, Wang YC, Peng C, Zheng J. Dimerization of organic dyes on luminescent gold nanoparticles for ratiometric pH sensing. Angew Chem 2016, 128(7): 2467-2470.

Sun, S. et al. Dimerization of organic dyes on luminescent gold nanoparticles for ratiometric pH sensing. Angewandte Chemie International Edition 55, 2421-2424 (2016).

Tate SS, Meister A. γ-Glutamyl transpeptidase: catalytic, structural and functional aspects. The Biological Effects of Glutamic Acid and Its Derivatives. Springer, 1981, pp. 357-368.

Tsoi KM, MacParland SA, Ma X-Z, Spetzler VN, Echeverri J, Ouyang B, et al. Mechanism of hard-nanomaterial clearance by the liver. Nature materials 2016, 15(11): 1212.

Vinluan III, Rodrigo D., et al. "Glutathione-coated luminescent gold nanoparticles: a surface ligand for minimizing serum protein adsorption." ACS applied materials & interfaces 6.15 (2014): 11829-11833.

Vogt, B. L. & Richie Jr, J. P. Glutathione depletion and recovery after acute ethanol administration in the aging mouse. Biochemical pharmacology 73, 1613-1621 (2007).

Weber CA, Duncan CA, Lyons MJ, Jenkinson SG. Depletion of tissue glutathione with diethyl maleate enhances hyperbaric oxygen toxicity. American Journal of Physiology-Lung Cellular and Molecular Physiology 1990, 258(6): L308-L312.

Wilhelm S, Tavares AJ, Dai Q, Ohta S, Audet J, Dvorak HF, et al. Analysis of nanoparticle delivery to tumours. Nature Reviews Materials 2016, 1(5): 16014.

Winters RA, Zukowski J, Ercal N, Matthews RH, Spitz DR. Analysis of glutathione, glutathione disulfide, cysteine, homocysteine, and other biological thiols by high-performance liquid chromatography following derivatization by n-(1-pyrenyl) maleimide. Anal Biochem 1995, 227(1): 14-21.

Wu G, Fang Y-Z, Yang S, Lupton JR, Turner ND. Glutathione metabolism and its implications for health. The Journal of nutrition 2004, 134(3): 489-492.

Wu, Z., Chen, J. & Jin, R. One-Pot Synthesis of Au25 (SG) 18 2-and 4-nm Gold Nanoparticles and Comparison of Their Size-Dependent Properties. Adv. Funct. Mater. 21, 177-183 (2011).

Wu, Z., Suhan, J. & Jin, R. One-pot synthesis of atomically monodisperse, thiol-functionalized Au 25 nanoclusters. J Mater. Chem. 19, 622-626 (2009).

Rahman, I., Kode, A. & Biswas, S. K. Assay for quantitative determination of glutathione and glutathione disulfide levels using enzymatic recycling method. Nature protocols 1, 3159 (2006).

Yang, X. et al. Mouse liver protein sulfhydryl depletion after acetaminophen exposure. Journal of Pharmacology and Experimental Therapeutics 344, 286-294 (2013).

Ye L, Yong K-T, Liu L, Roy I, Hu R, Zhu J, et al. A pilot study in non-human primates shows No. adverse response to intravenous injection of quantum dots. Nature nanotechnology 2012, 7(7): 453.

Yoon, E., Babar, A., Choudhary, M., Kutner, M. & Pyrsopoulos, N. Acetaminophen-induced hepatotoxicity: a comprehensive update. Journal of clinical and translational hepatology 4, 131 (2016).

Zhang, Zhaowu, et al. "Conjugating folic acid to gold nanoparticles through glutathione for targeting and detecting cancer cells." Bioorganic & medicinal chemistry 18.15 (2010): 5528-5534.

Chung Yen Ang et al., "Turn-on" fluorescence probe integrated polymer nanoparticles for sensing biological thiol molecules, Scientific Reports, Nov. 14, 2014,vol. 4,No. 1,DOI: 10.1038/srep07057.

Navdeep Kaur et al., "Biomedical Applications for Gold Nanoclusters: Recent Developments and Future Perspectives", Nanoscale Research Letters, Sep. 26, 2018,vol. 13, No. 1, DOI: 10.1186/s11671-018-2725-9.

Zonghai Sheng et al., "Smart Human Serum Albumin-Indocyanine GreenNanoparticles Generated by Programmed Assembly for Dual-Modal Imaging-Guided Cancer Synergistic Phototherapy", ACS Nano, Dec. 8, 2014,vol. 8, No. 12, p. 12310-12322, DOI: 10.1021/nn5062386.

* cited by examiner

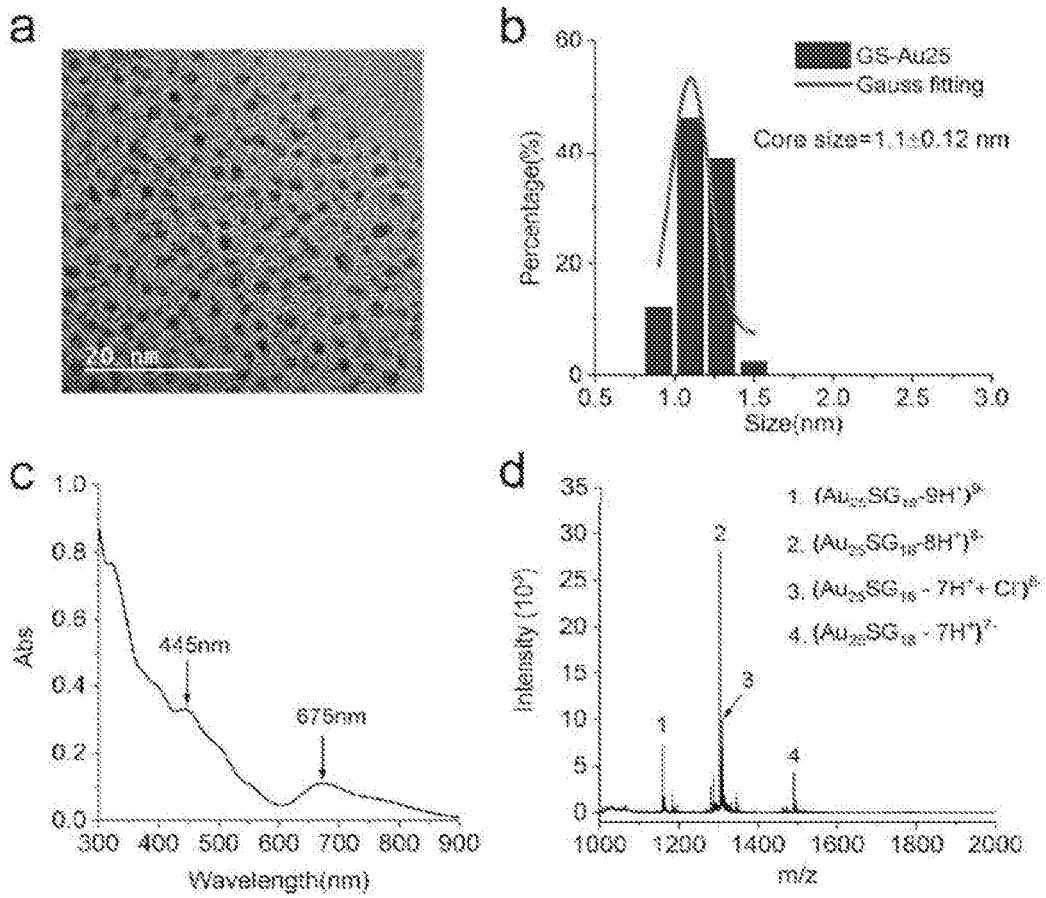
FIGS. 12A-D
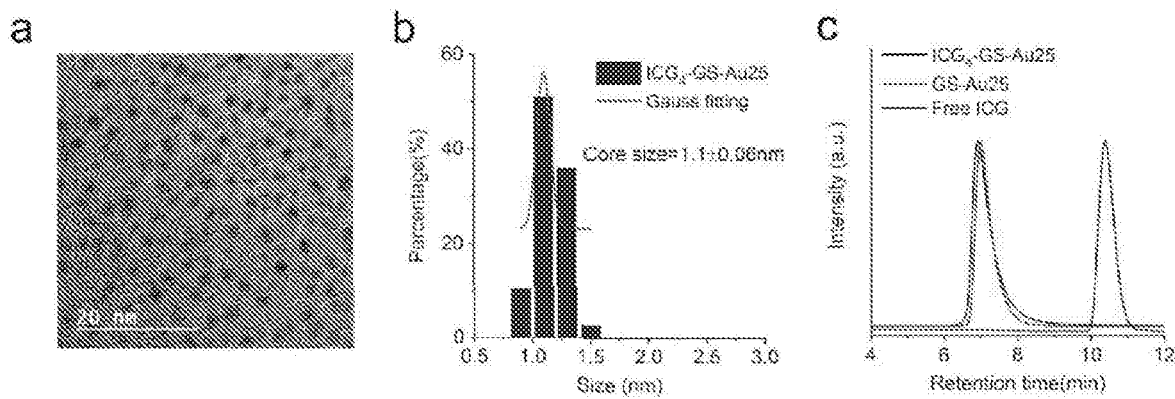
FIGS. 13A-C

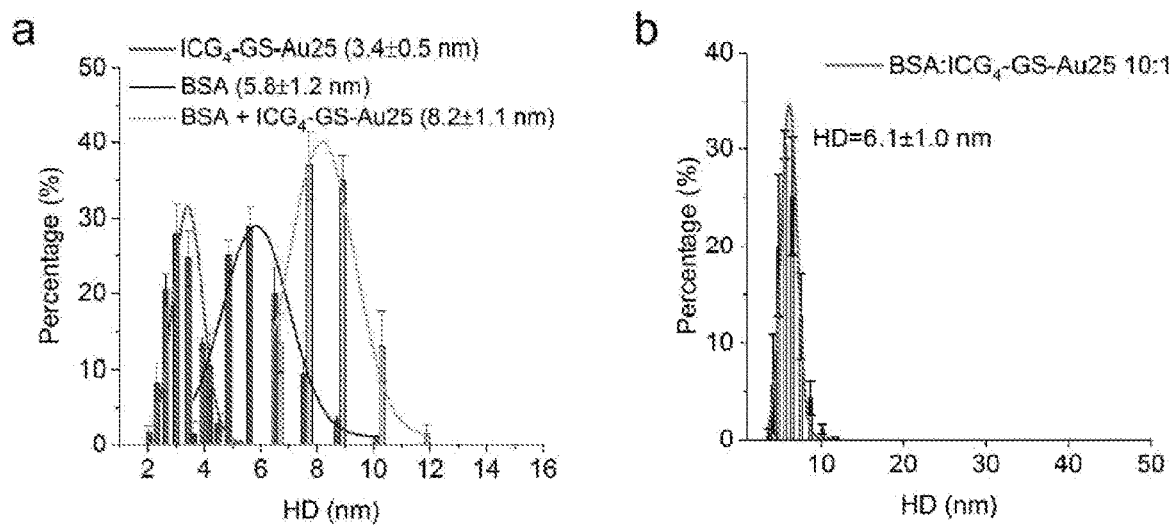
FIGS. 17A-B
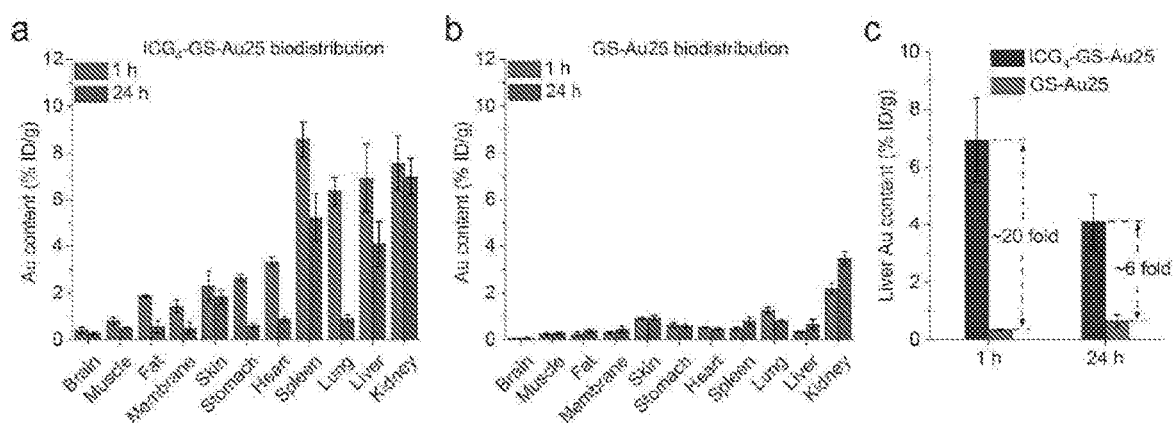
FIGS. 18A-C

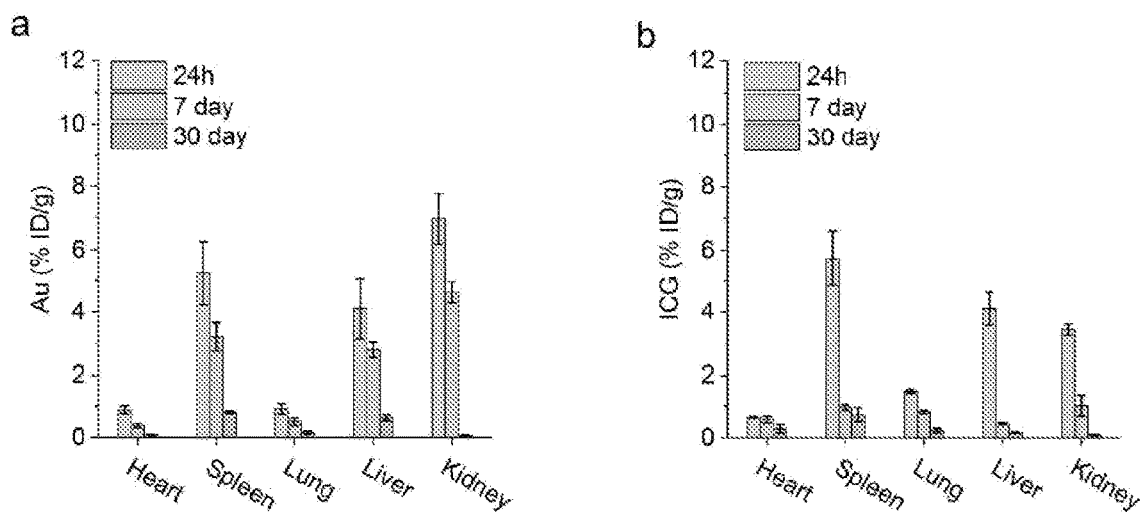
FIGS. 19A-B
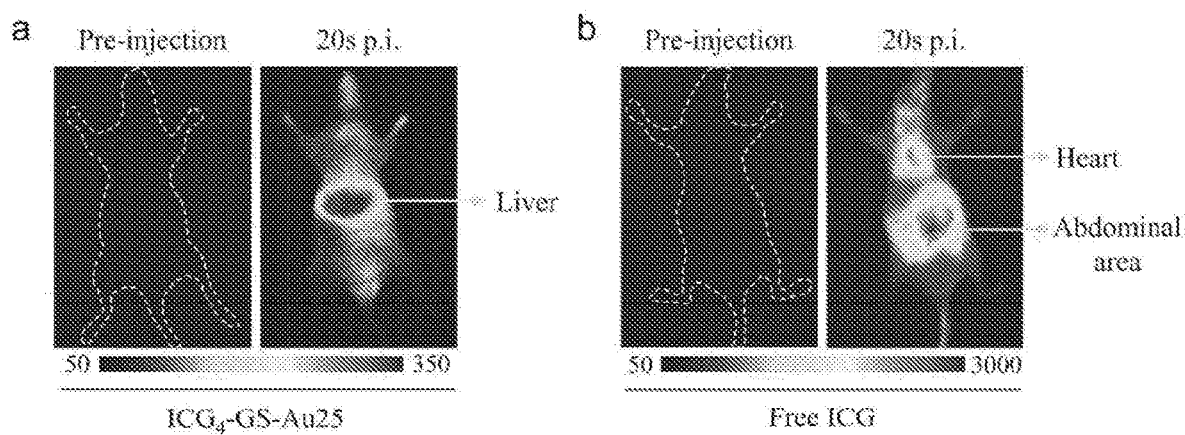
FIGS. 20A-B

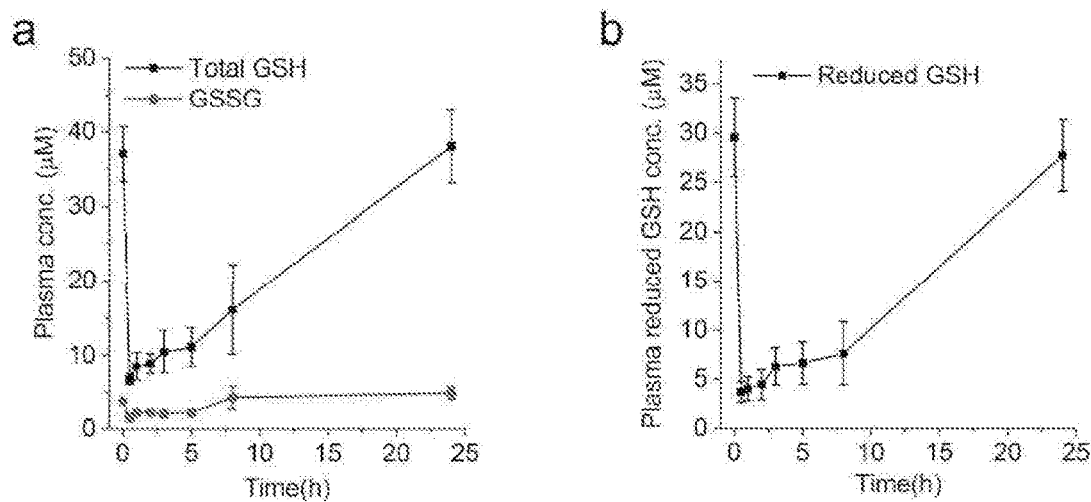
FIGS. 21A-B
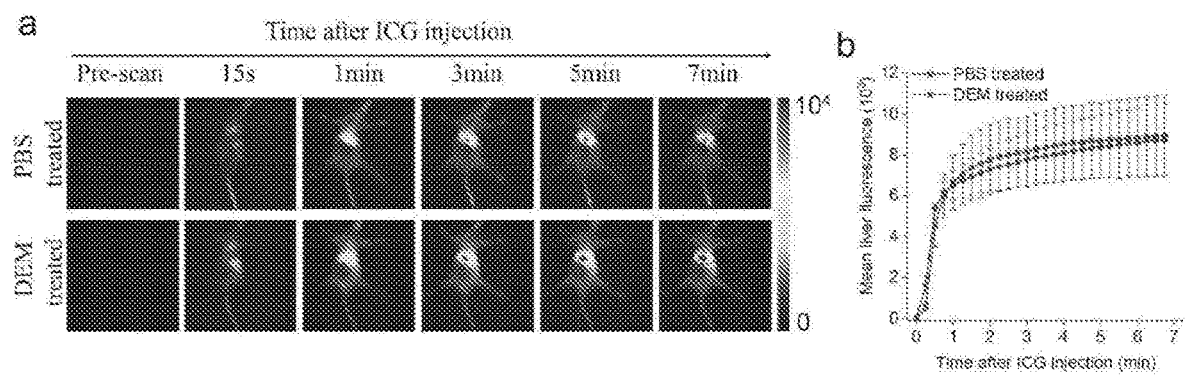
FIGS. 22A-B

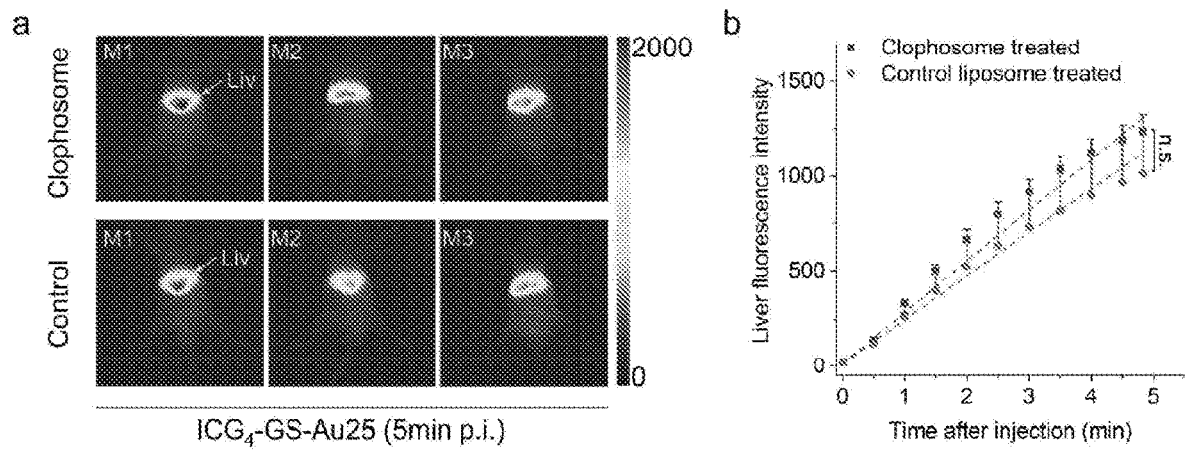
FIGS. 23A-B
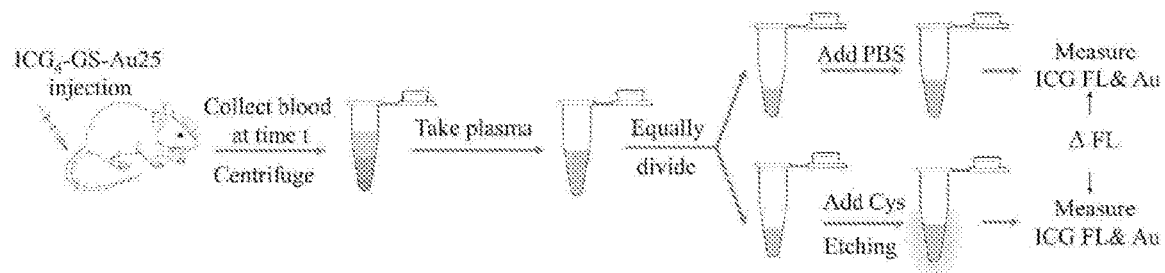
FIG. 24

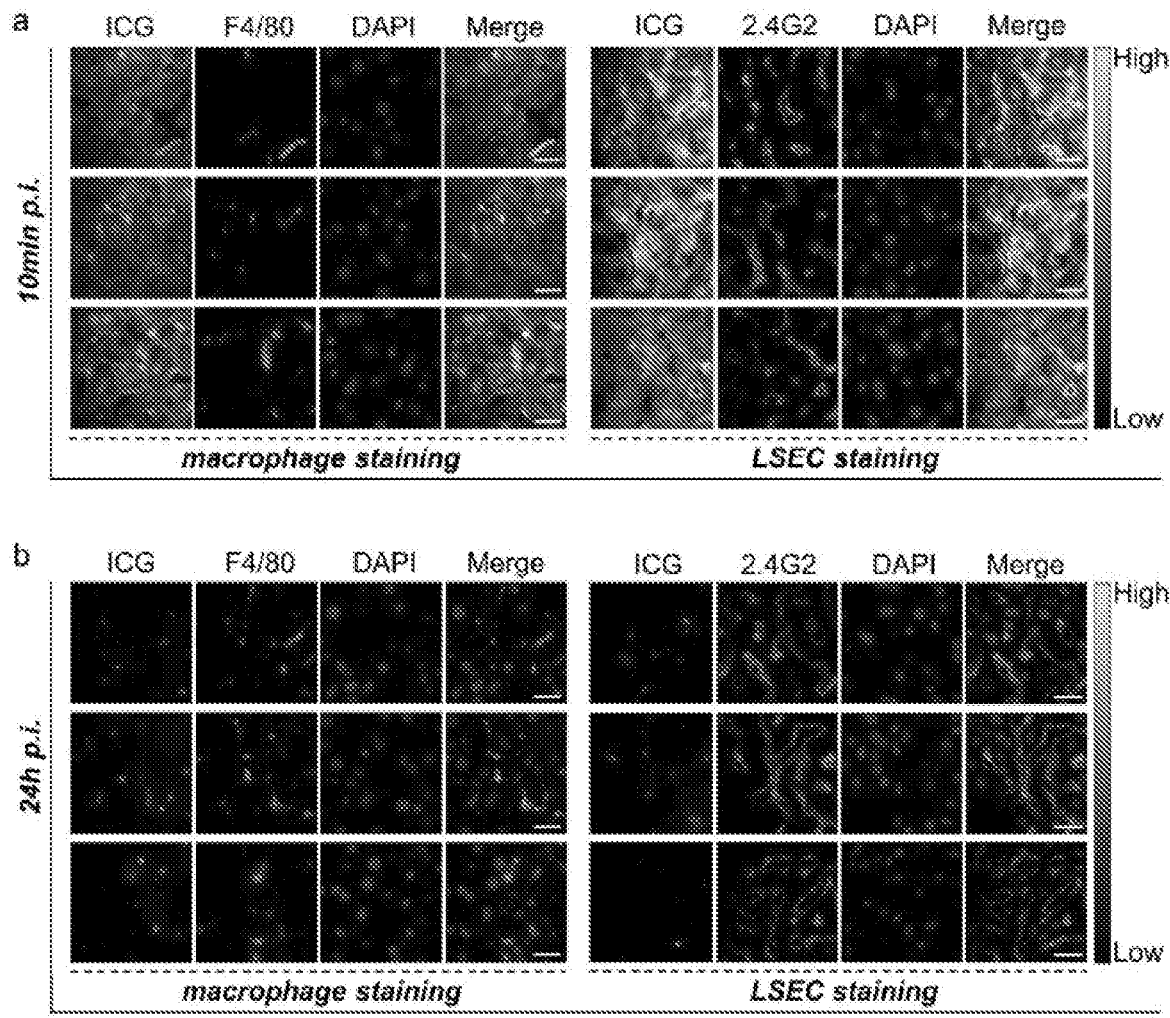
FIGS. 25A-B

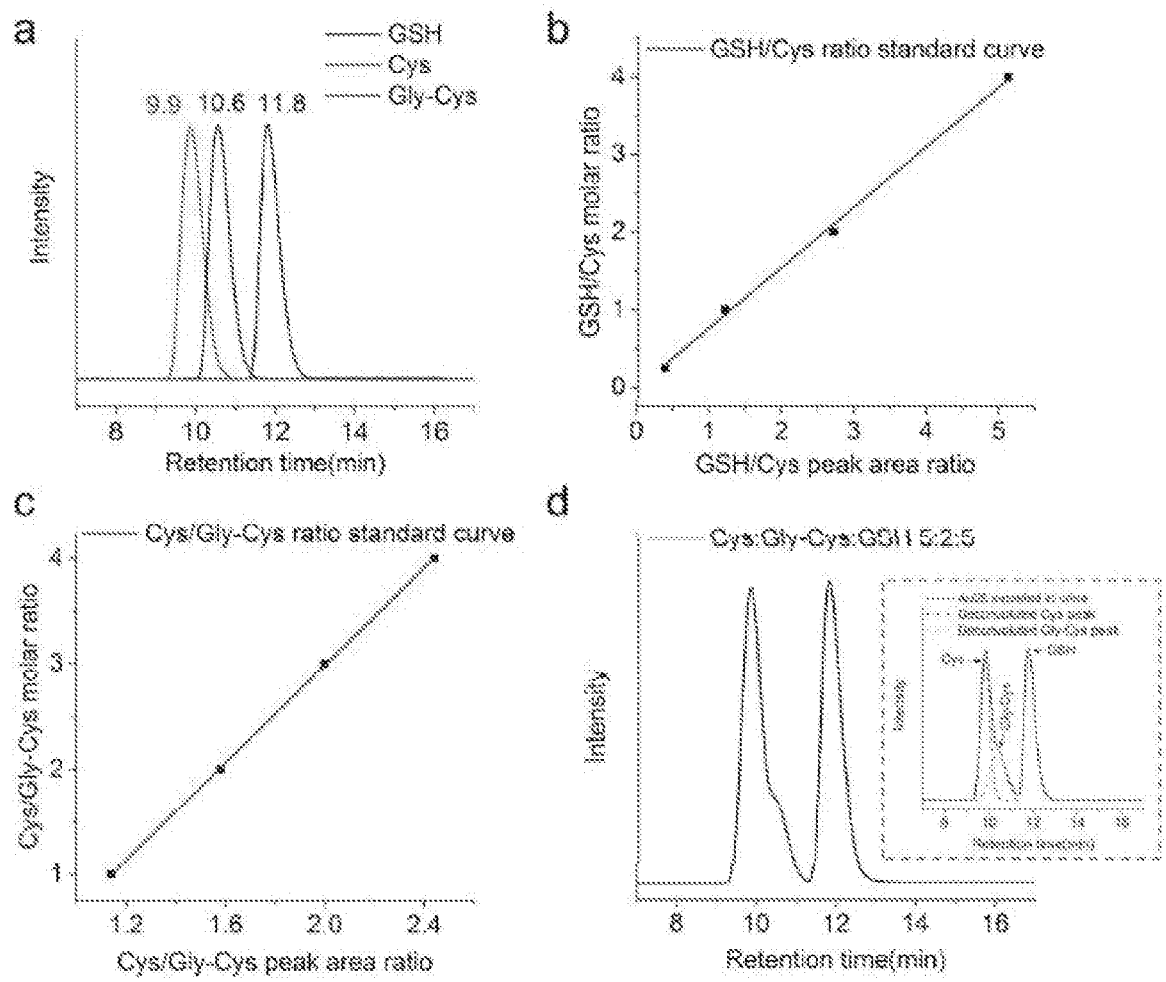
FIGS. 26A-D

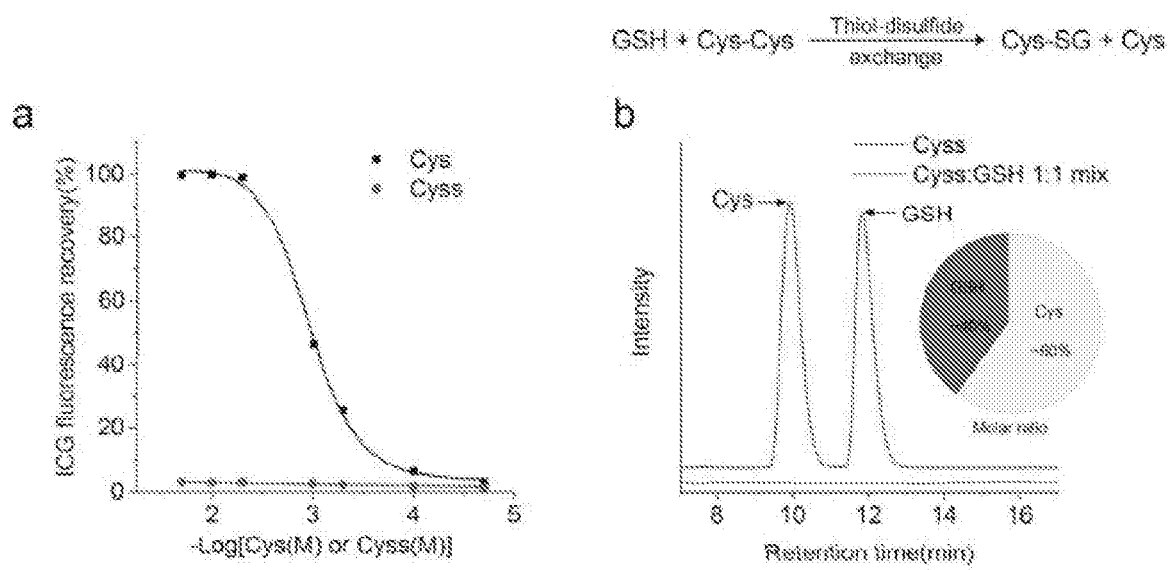
FIGS. 27A-B
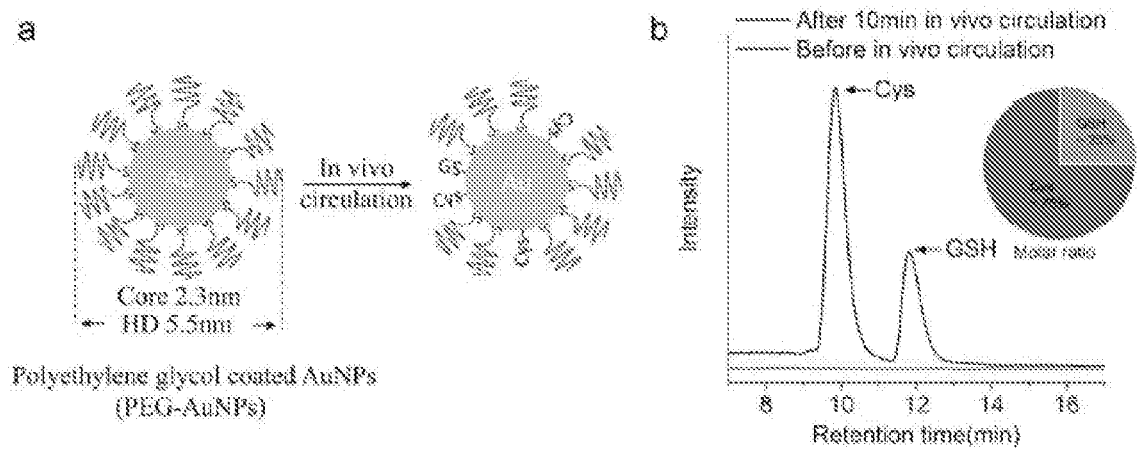
FIGS. 28A-B

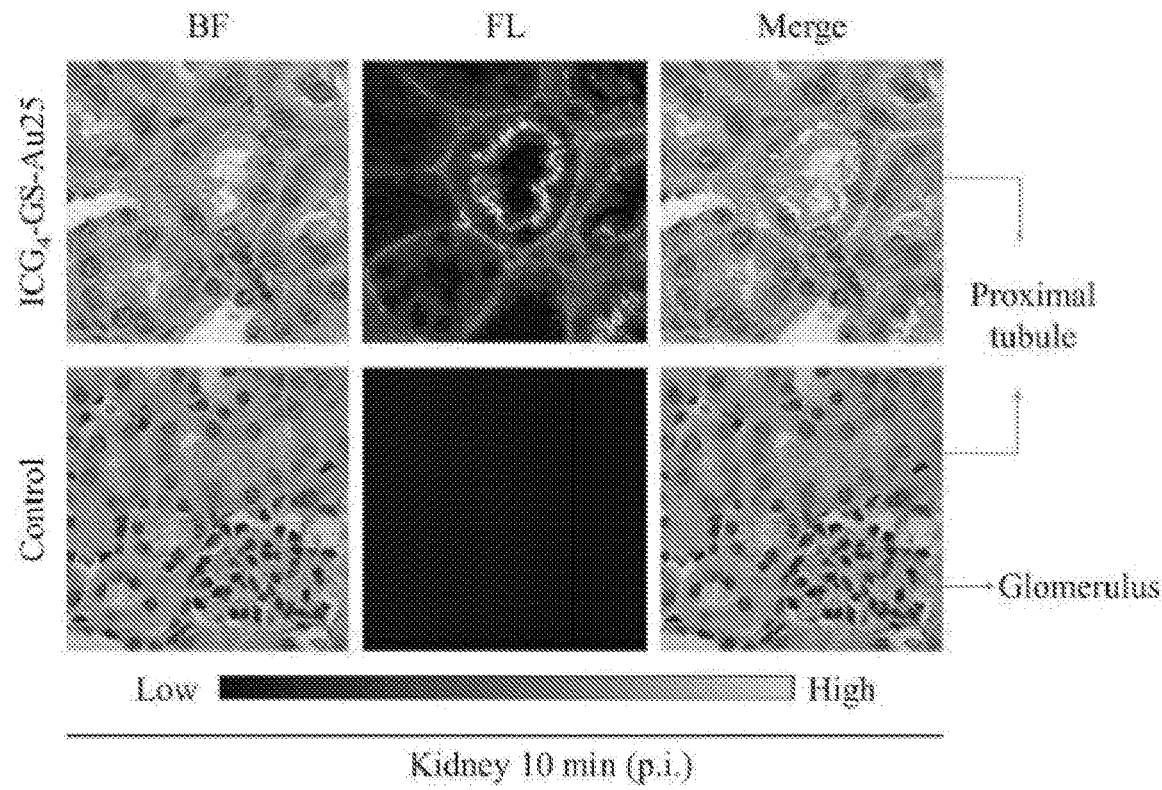
FIG. 29
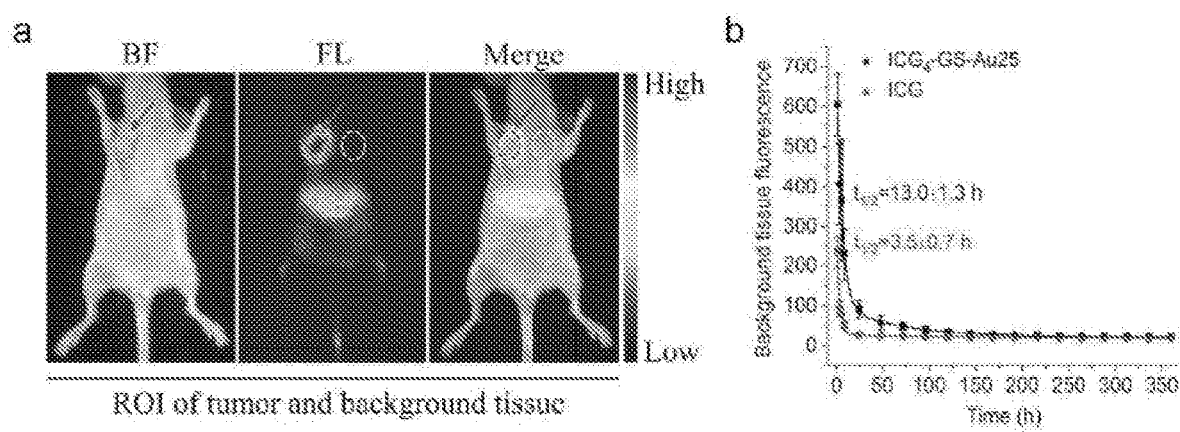
FIGS. 30A-B

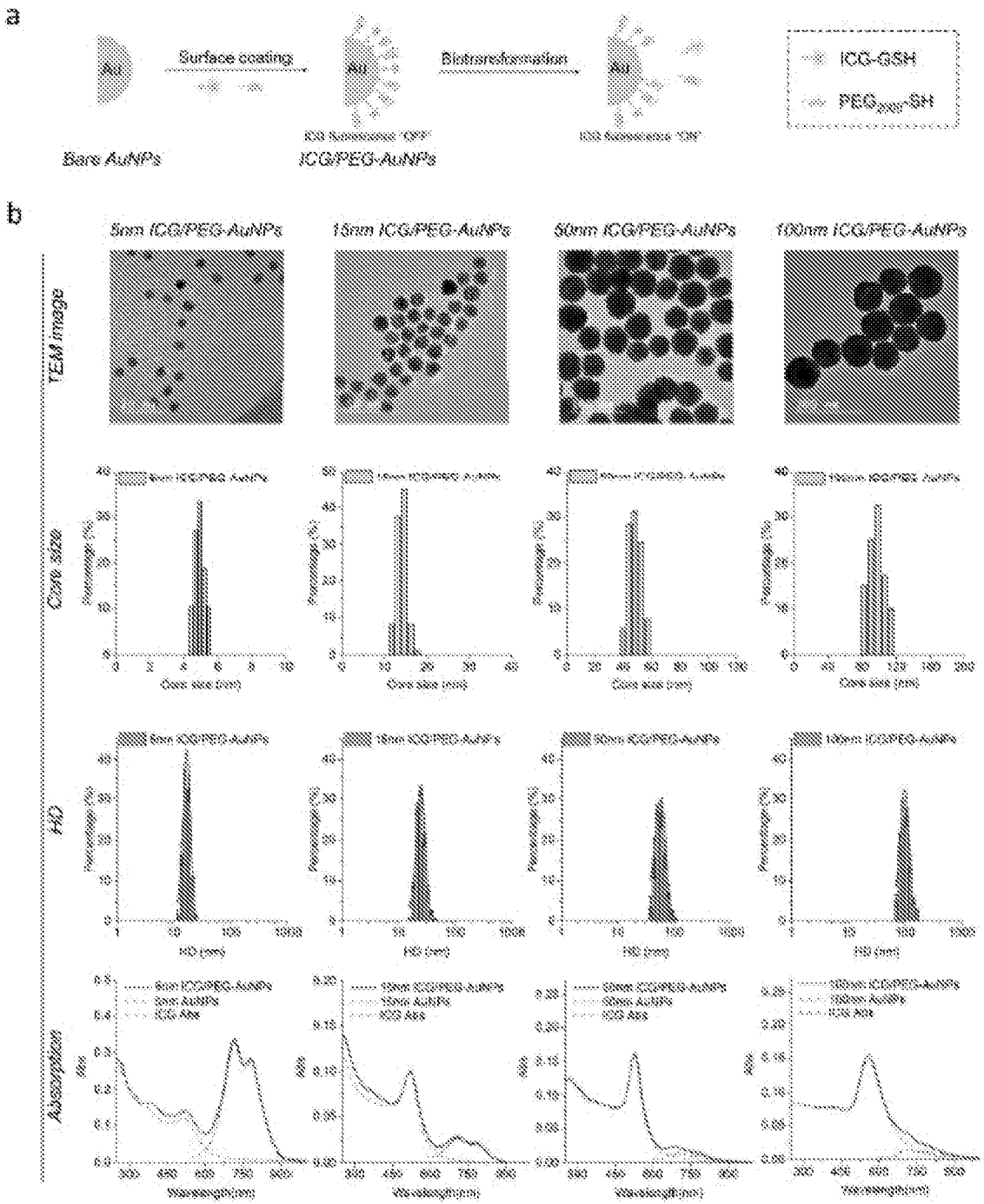
FIGS. 36A-B

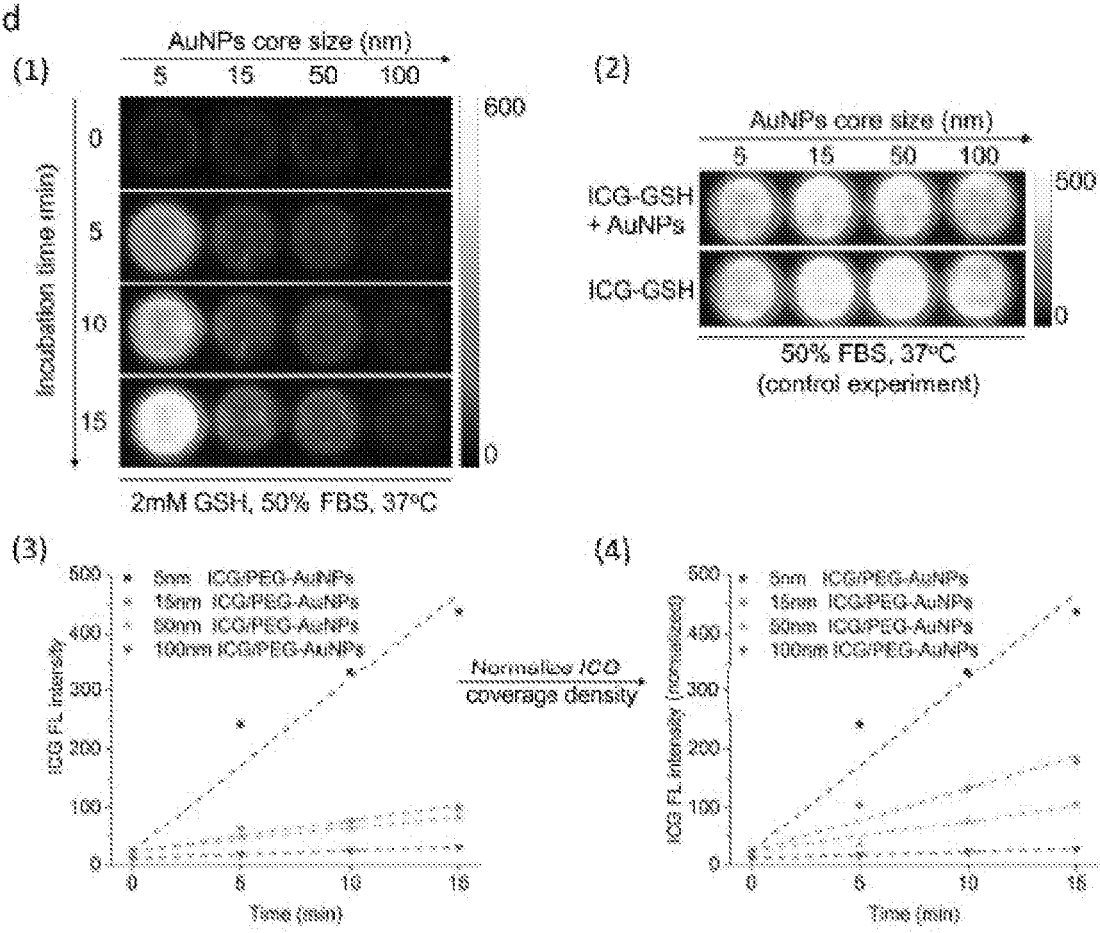
FIGS. 36C-D

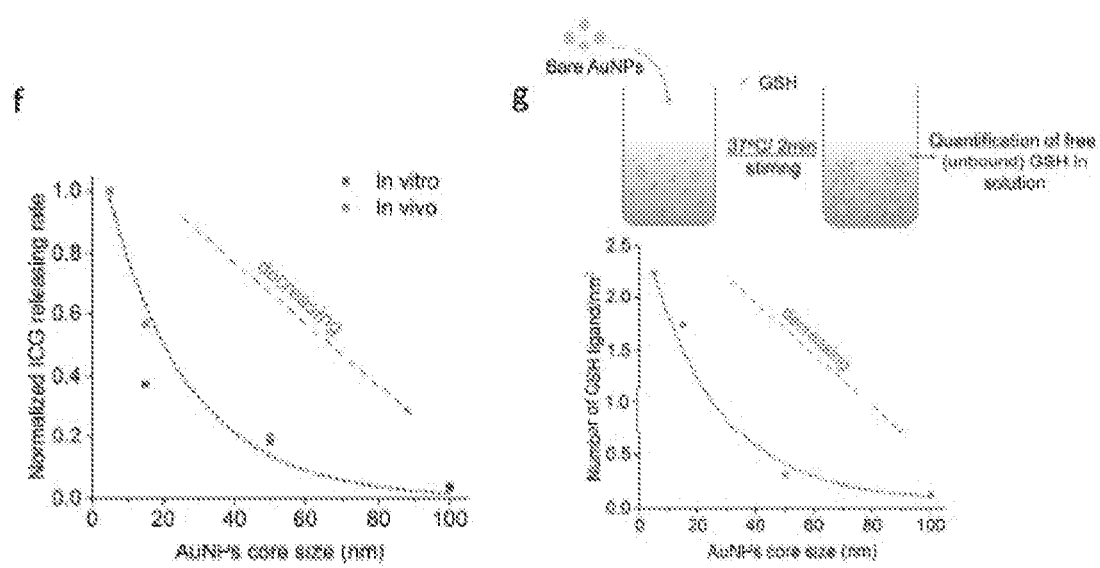
FIGS. 36F-G

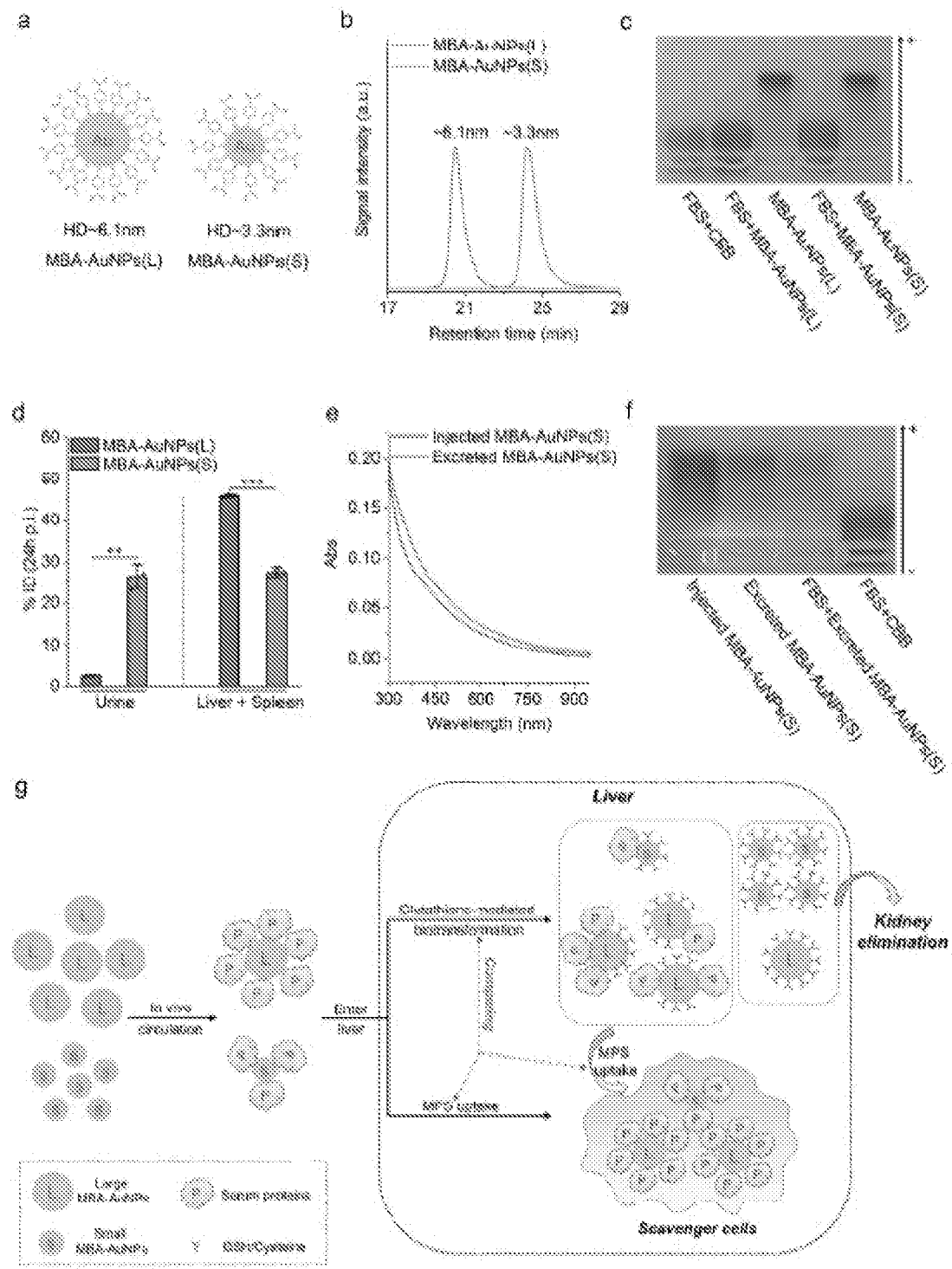
FIGS. 37A-G

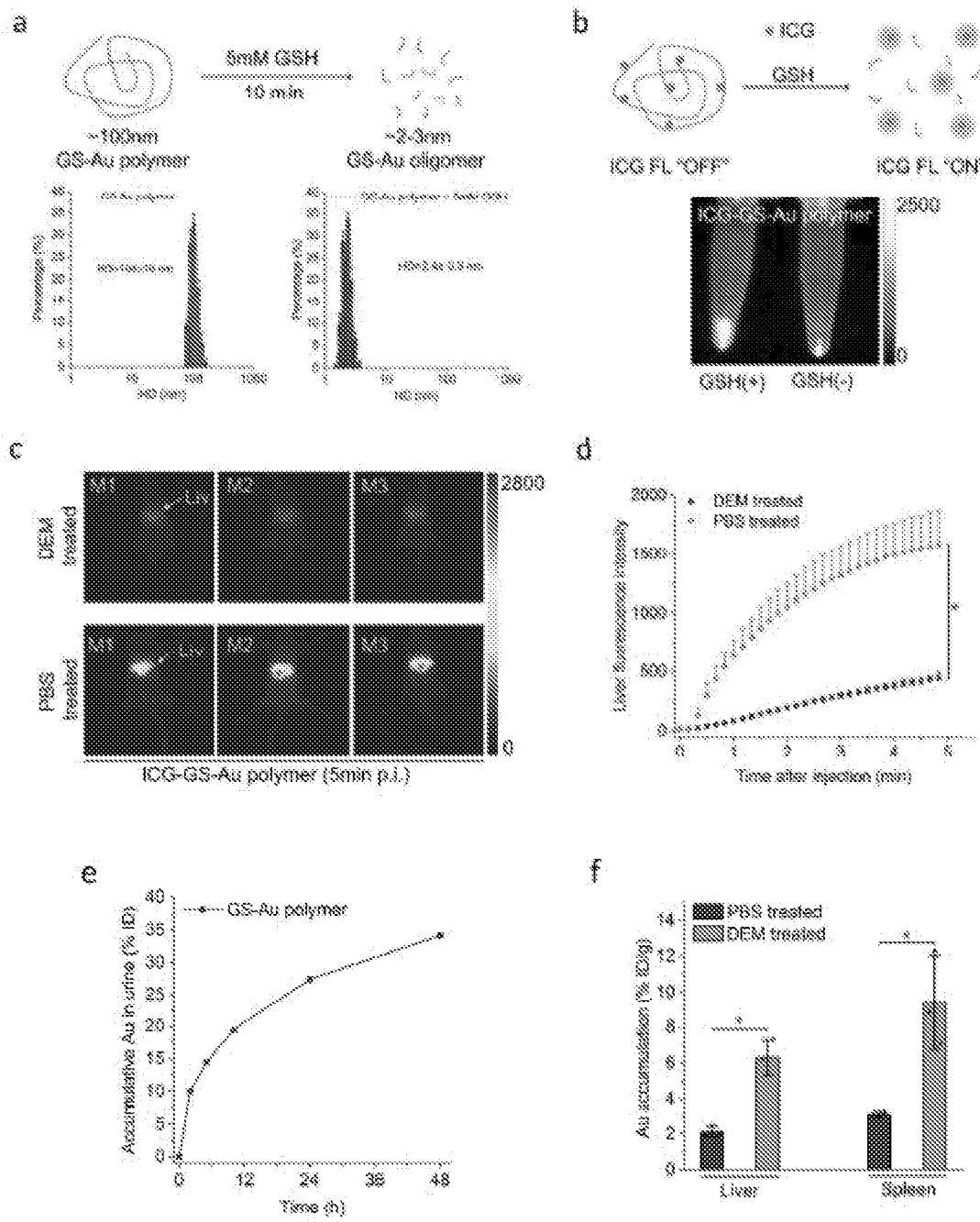
FIGS. 38A-F

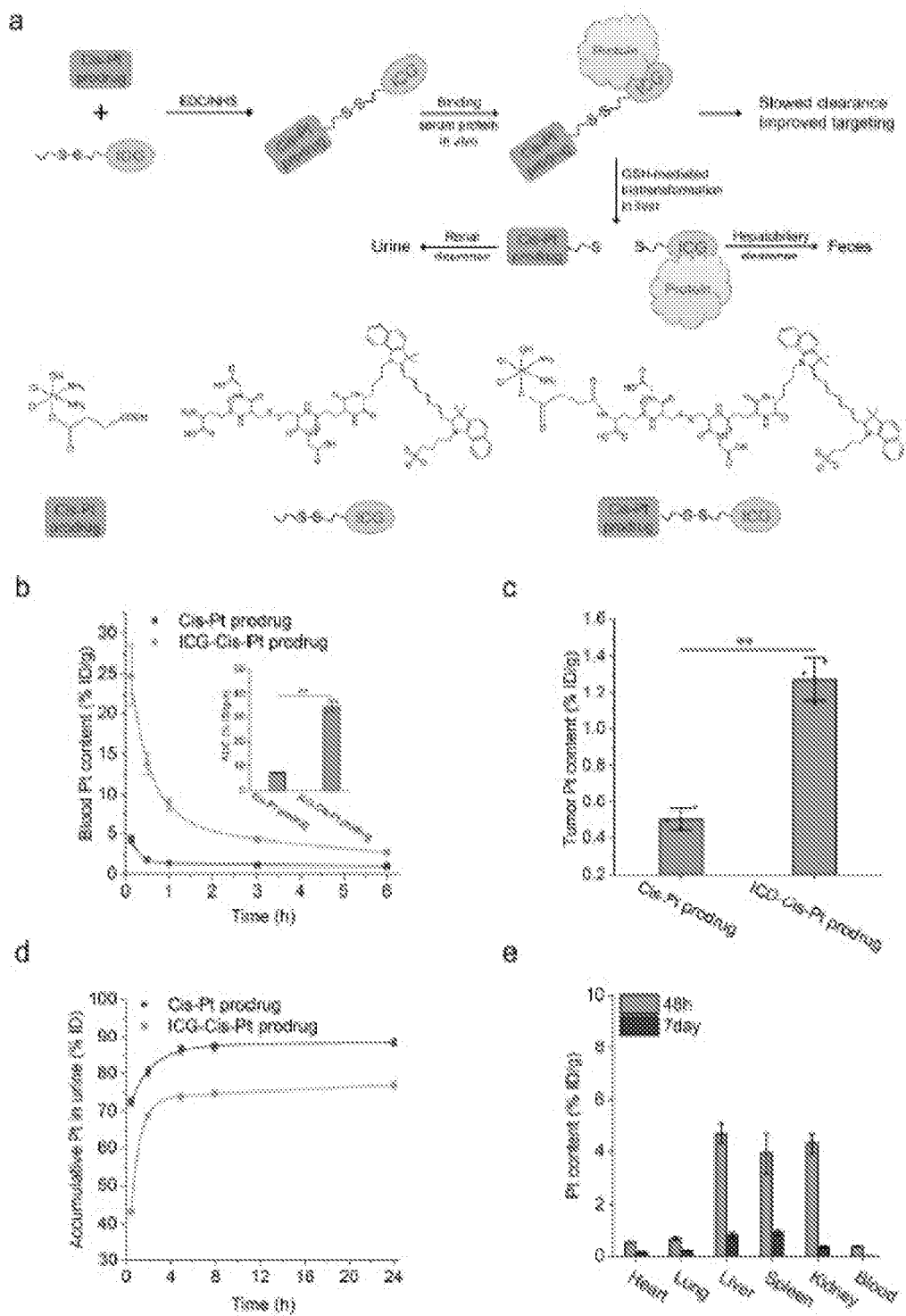
FIGS. 39A-E

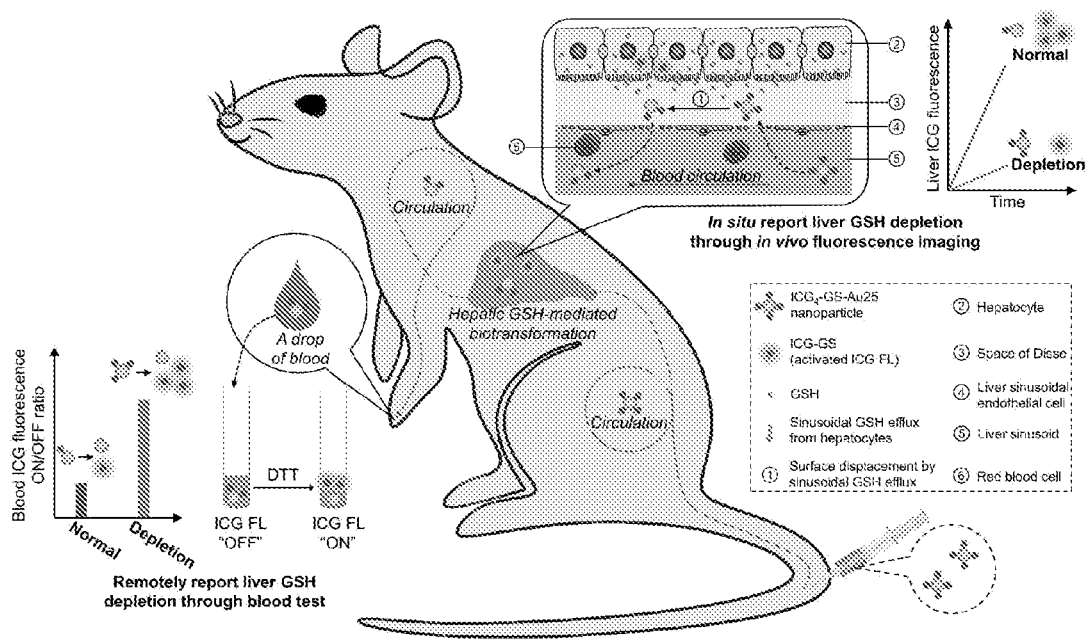
FIG. 40
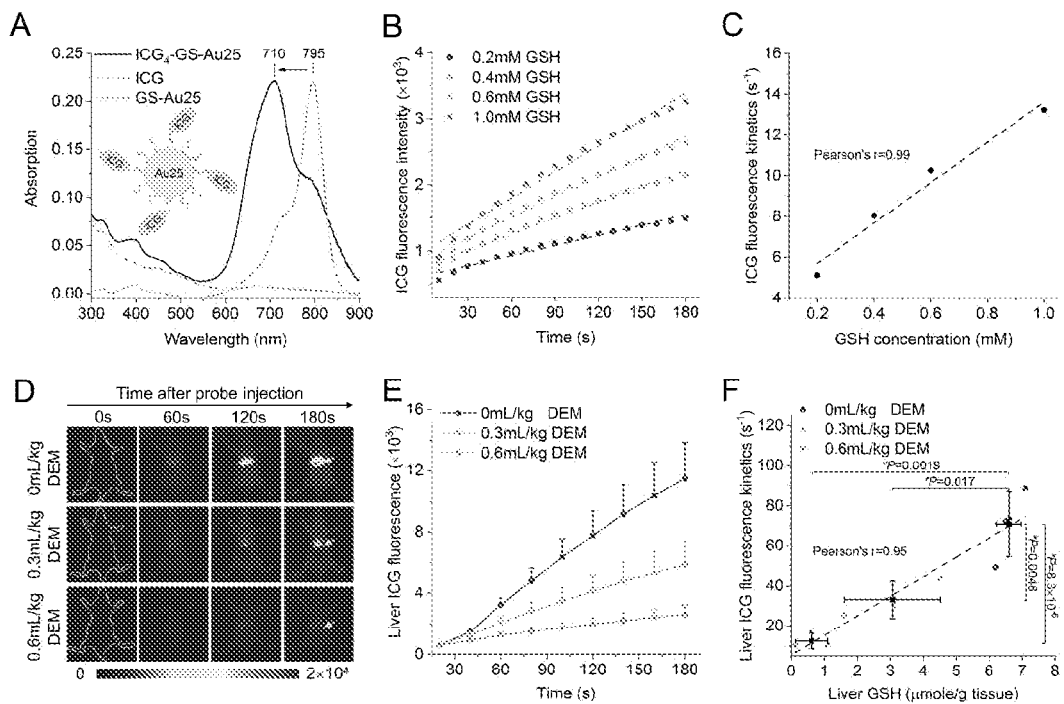
FIGS. 41A-F

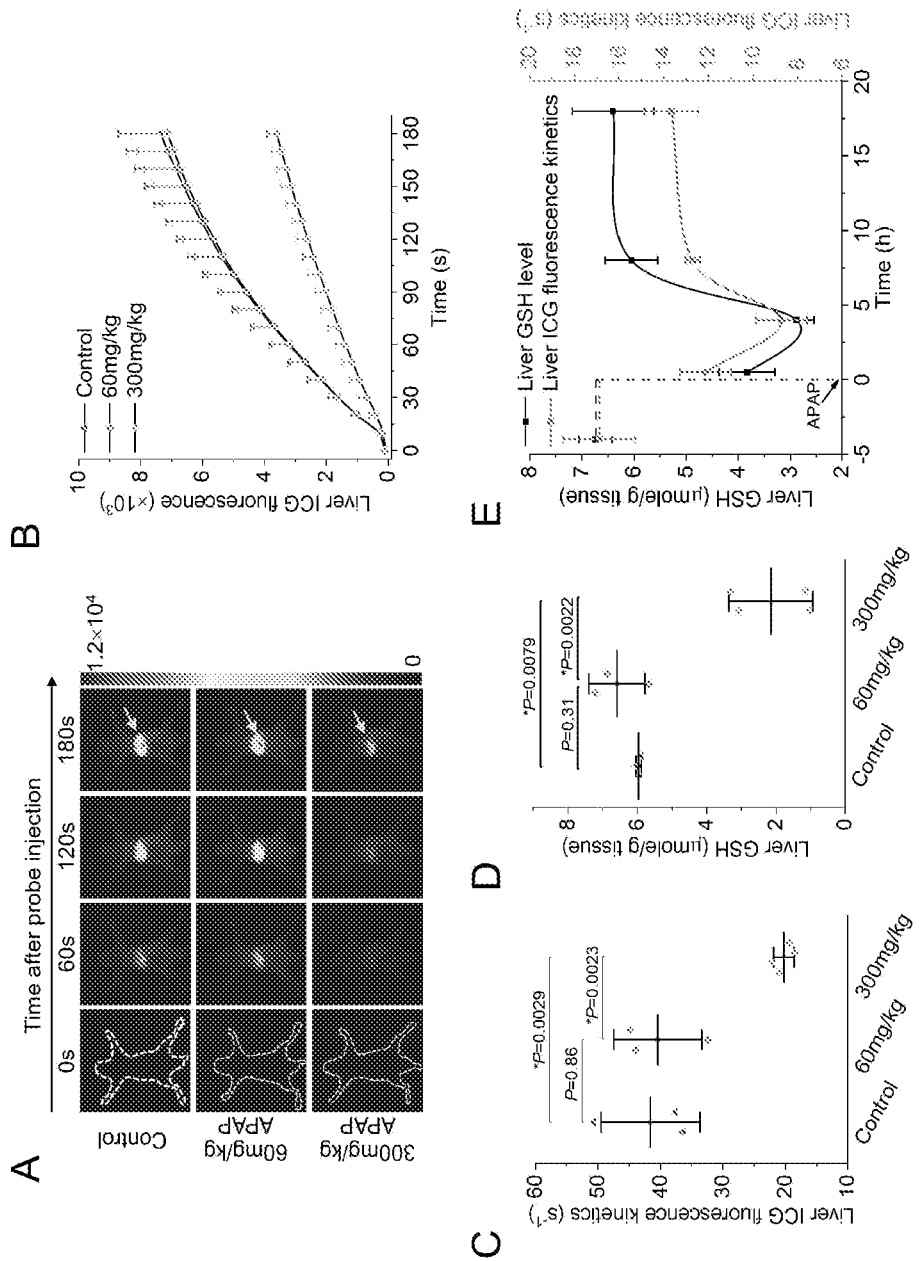
FIGS. 42A-E

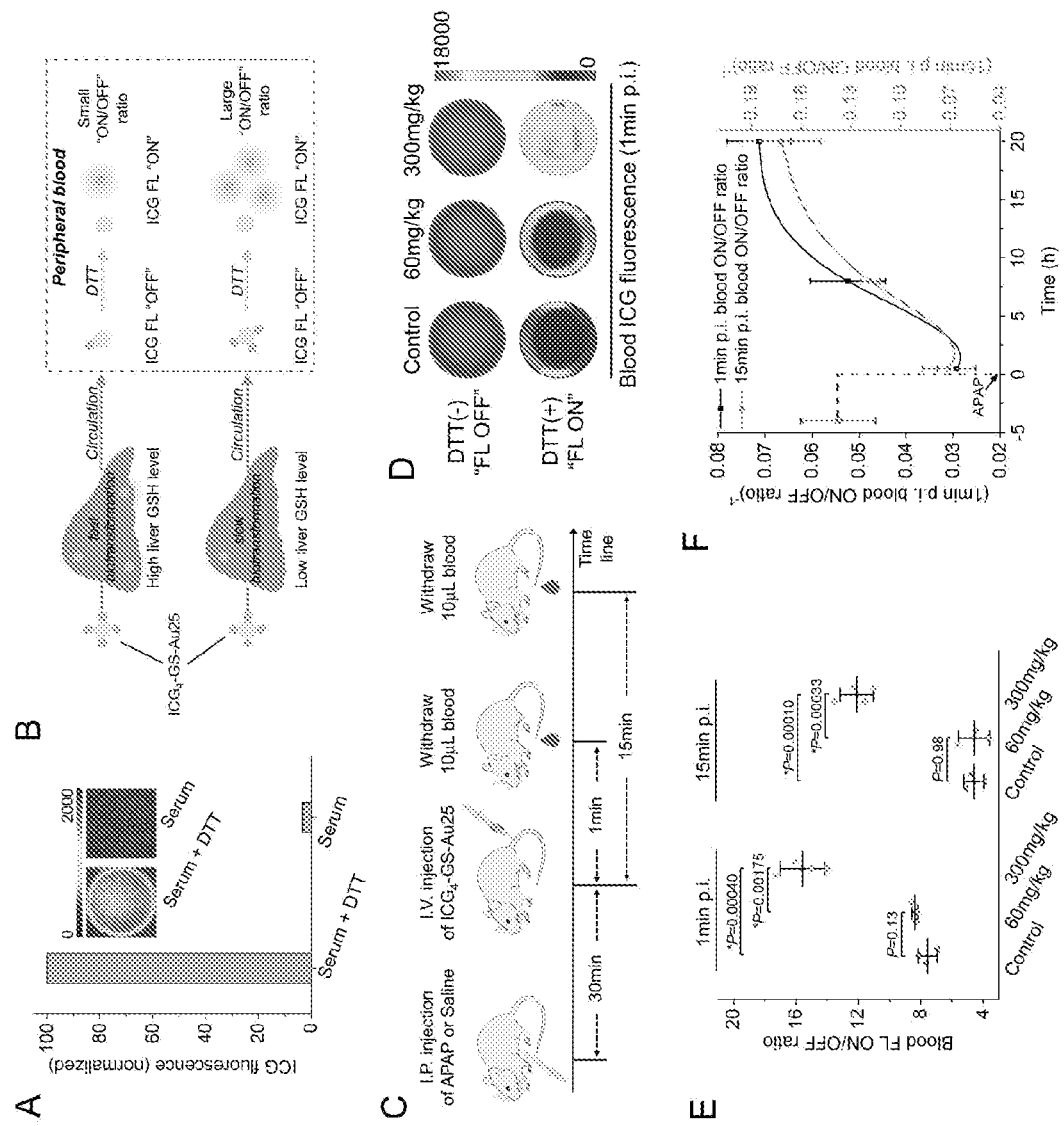
FIGS. 43A-F

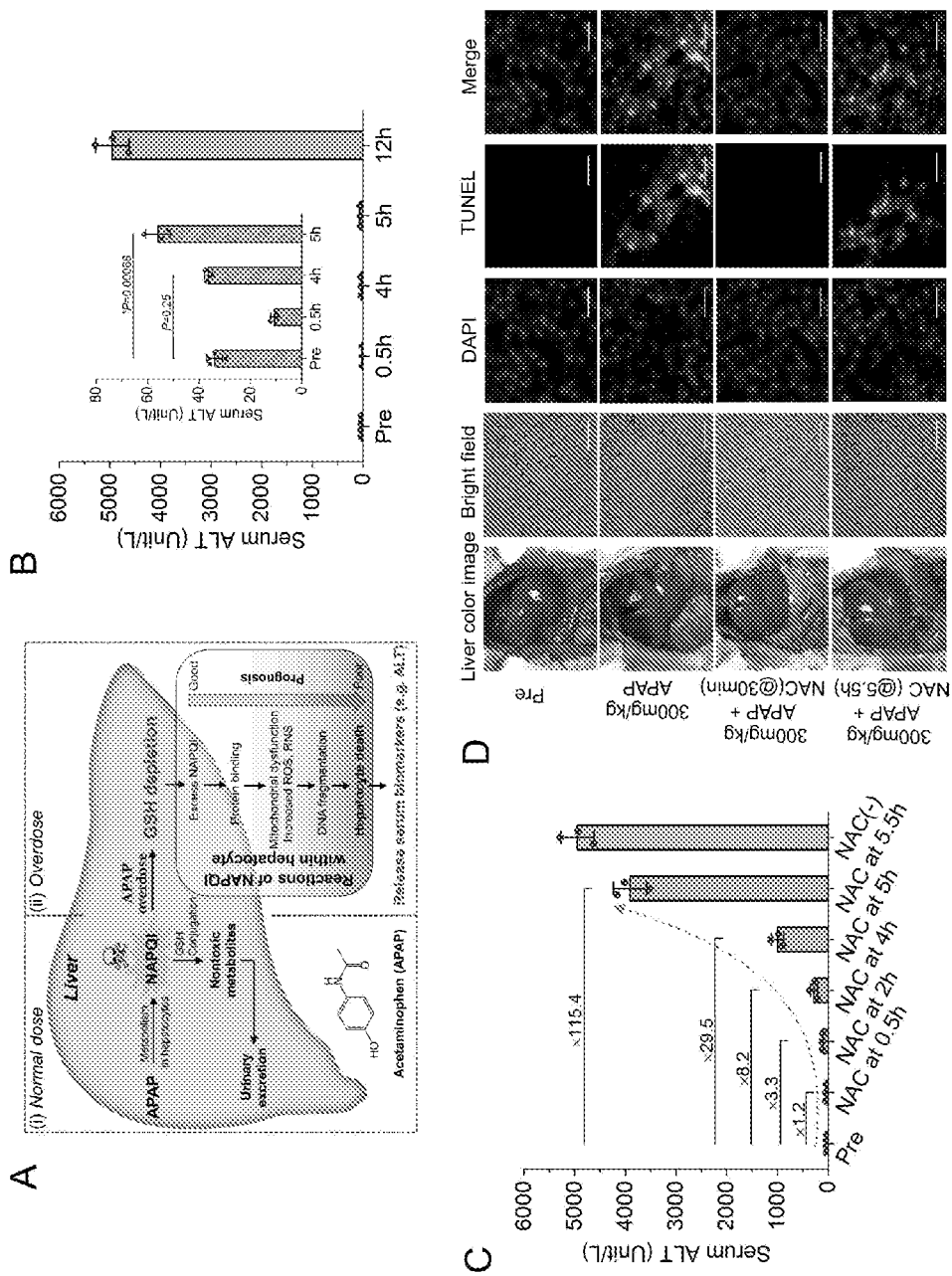
FIGS. 44A-D

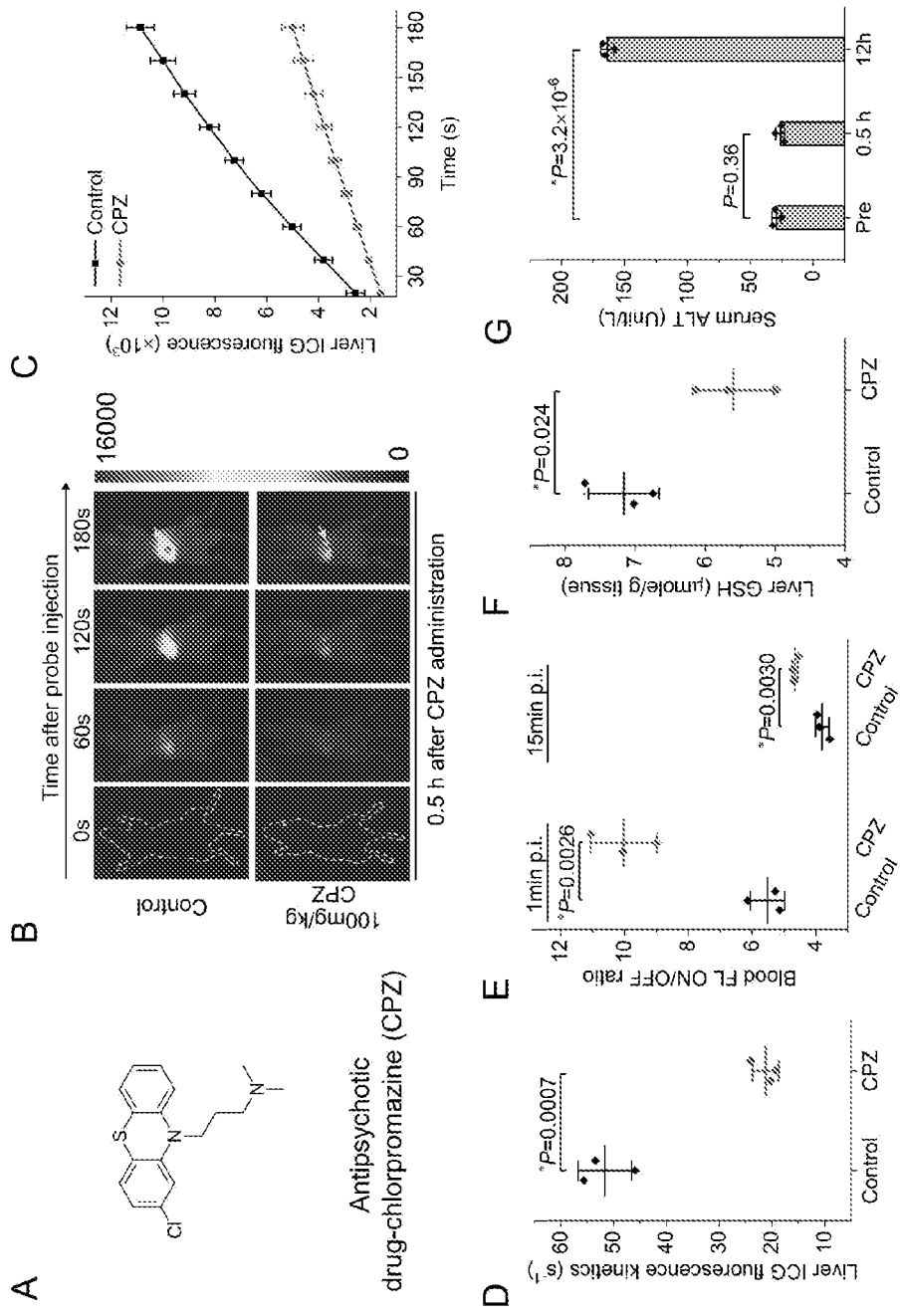
FIGS. 45A-G

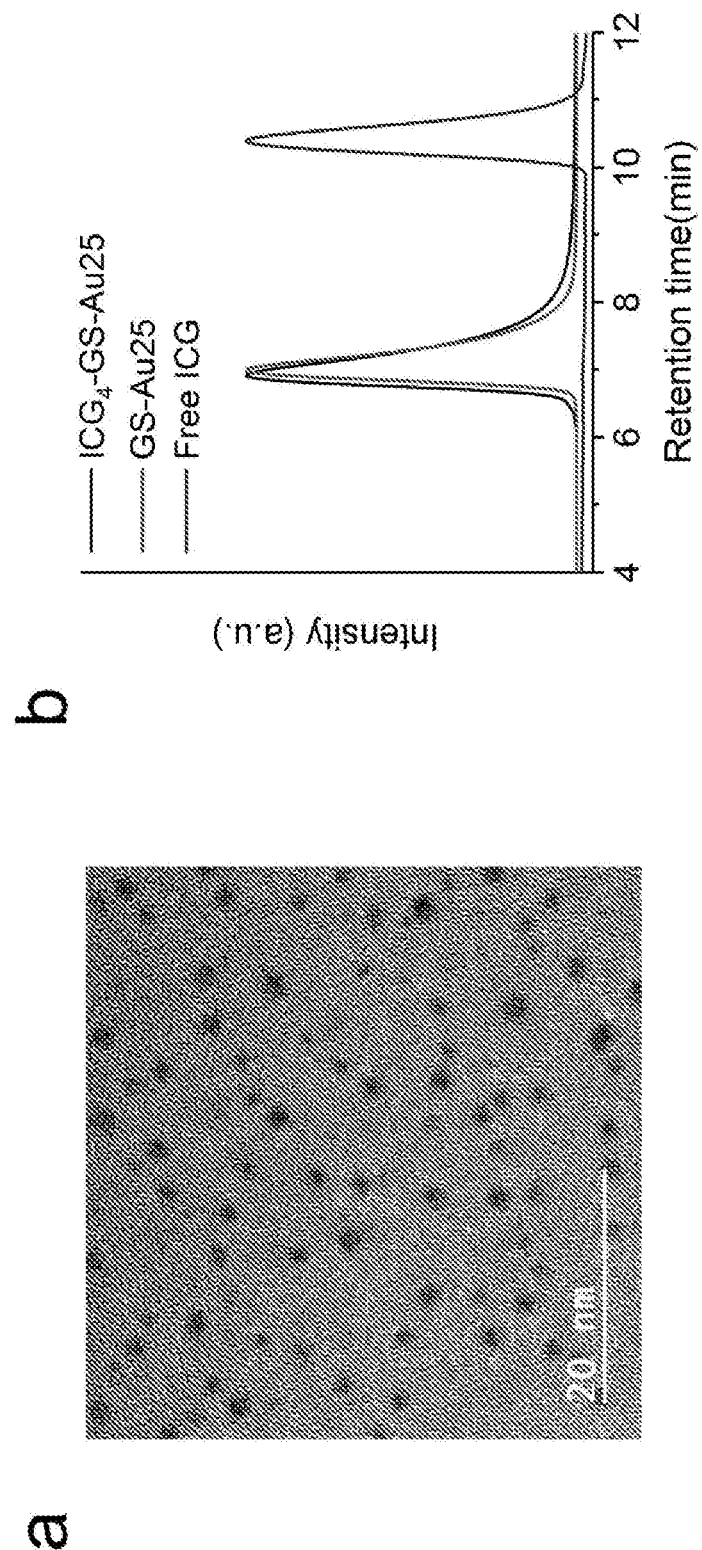
FIG. 46A-B

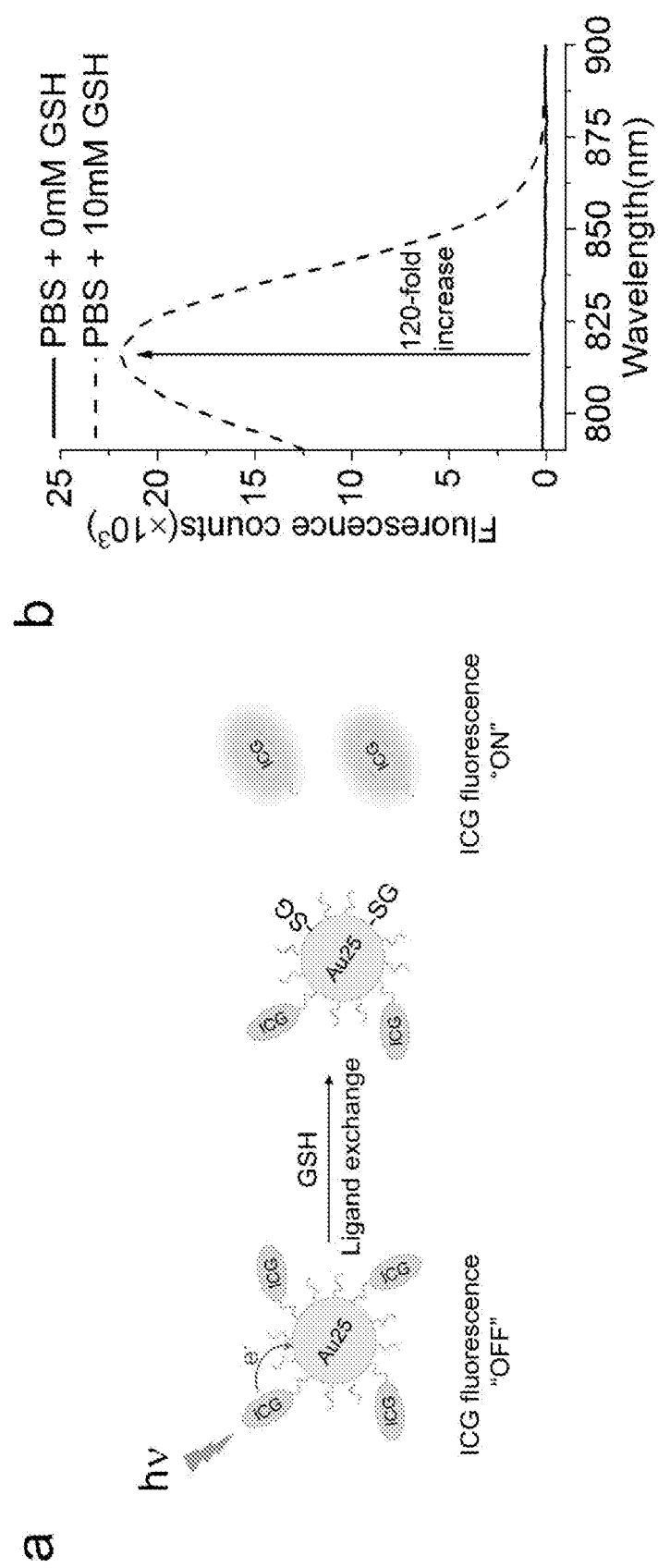
FIGS. 47A-B

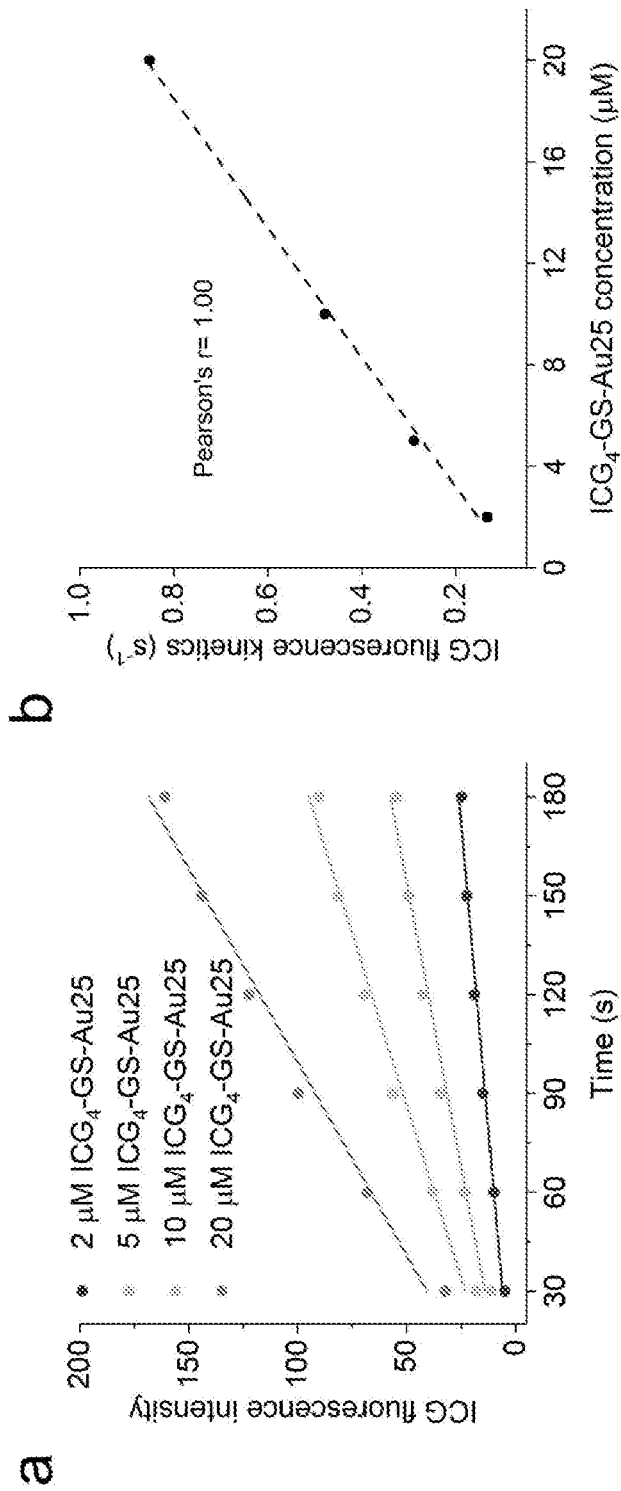
FIGS. 48A-B

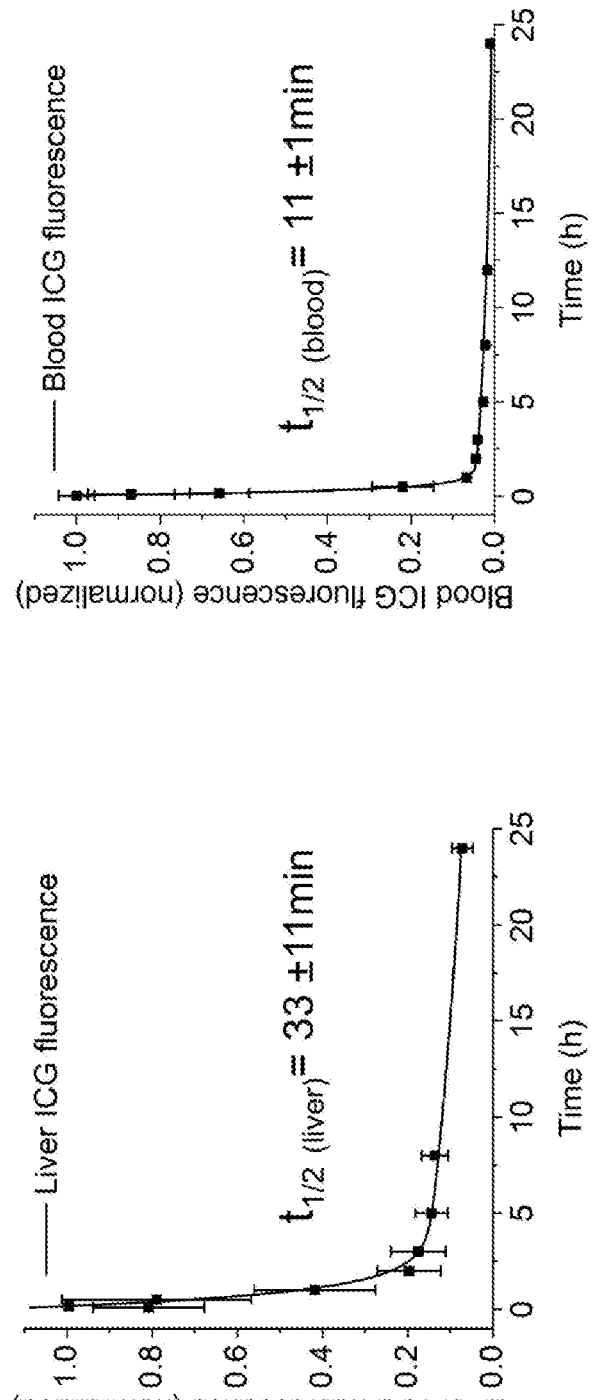
FIGS. 52A-B

BIOTHIOL-ACTIVATABLE PROBE AND METHOD OF USE

PRIORITY CLAIM

This application is a United States National Phase Patent Application of International Patent Application Number PCT/US2020/038045, filed on Jun. 17, 2020, which claims benefit of priority to U.S. Provisional Application Ser. No. 62/862,484, filed Jun. 17, 2019, the entire contents of which are hereby incorporated by reference.

STATEMENT REGARDING GOVERNMENT SPONSORED RESEARCH OR DEVELOPMENT

This invention was made with government support under Grant No. R01 DK103363 and Grant No. R01 DK115986 awarded by the National Institutes of Health. The government has certain rights in the invention. Additional support for the invention was provided under Grant No. RP160866 awarded by the Cancer Prevention and Research Institute of Texas and under Grant No. AT-1974-20180324 awarded by the Welch Research Foundation.

A. FIELD

This disclosure relates to a composition of matter for a bio-activatable nanoparticle-based probe for detecting liver dysfunction and for detecting cancerous tumors in a living subject and the invention incorporates methods of use thereof. An additional method of use is conceived wherein the bio-activatable nanoparticle is used for drug delivery. The invention further relates to a contrast agent for detecting liver dysfunction and for cancerous tumors in a living subject and methods of use thereof.

B. BACKGROUND

Liver detoxification is a natural defense response that the body uses to remove foreign materials. However, due to rapid uptake by mononuclear phagocyte system (MPS) in the liver (Tsoi et al., 2016; Wilhelm et al., 2016; Fischer et al., 2006), this process often dramatically shortens the blood retention of engineered nanoparticles, prevents them from efficiently targeting diseases and retains them in the body for a long period of time, which induces long-term nanotoxicity and hampers their clinical translation, in particular, for those non-degradable ones composed of toxic elements or heavy metals (Ye et al., 2012; Balasubramanian et al., 2010). However, like a sword with two edges, liver detoxification also plays an important role in minimizing toxicities of small xenobiotics. For instance, glutathione (GSH) mediated biotransformation is one of the most common liver detoxification strategies for the body to eliminate lipophilic molecules and heavy metals (Bu and Manautou, 2012). As the most abundant biothiol (~10 mM) in the liver, glutathione is synthesized inside hepatocytes and constantly effluxes into liver sinusoids through the fenestrated sinusoidal endothelium (Braet and Wisse, 2002) (FIG. 1A), followed by being transported to other compartments of the body (Kaplowitz et al., 1985; Ballatori et al., 2009). Within the liver, the nucleophilic cysteinyl residue of glutathione is highly reactive to electrophilic metabolites or heavy metals, reducing their toxicity, increasing their hydrophilicity and enhancing their clearance through either hepatobiliary pathway or renal system (Dickinson and Forman, 2002; Singhal et al., 1987). However, it is still largely unknown how this well-known glutathione-mediated biotransformation impacts nanoparticle transport such as blood retention, disease targeting, and clearance even though this physiological process occurs constantly in one's body.

Compared to liver MPS-mediated detoxification of engineered nanoparticles, glutathione one is much less understood because of the following challenges: 1) liver detoxifications mediated by MPS and glutathione are often entangled, which makes it challenging to exactly pinpoint the role of glutathione mediated biotransformation in the nanoparticle transport; 2) there is a lack of imaging techniques for non-invasive monitoring of glutathione-mediated detoxification in the liver sinusoid in real time; 3) it is very challenging to recover engineered nanoparticles afterward for detailed analysis of in vivo biotransformation induced by glutathione at the chemical level.

SUMMARY

Glutathione-mediated biotransformation in the liver is a detoxification process to eliminate small xenobiotics but its impacts on nanoparticle retention, targeting and clearance are much less understood than liver macrophage uptake even though both processes are involved in the liver detoxification. Disclosed herein is a thiol-activatable fluorescent nanoprobe, $ICG_4$-GS-Au25 cluster that can bind to serum protein and be transported to the liver, by which the biotransformation kinetics are non-invasively imaged in vivo at high specificity. The process is examined in detail at the chemical level. These results show that glutathione efflux from hepatocytes results in high local concentrations of not only glutathione but also cysteine in liver sinusoids, which transformed cluster surface chemistry, reduced its affinity to serum protein and significantly altered its blood retention, targeting and clearance. With this biotransformation, liver detoxification, a long-standing barrier in nanomedicine translation can be turned into a bridge toward the maximized targeting and minimized nanotoxicity.

It is the subject of the present disclosure, to design and teach a nanoparticle probe that can reach liver sinusoids, escape liver MPS uptake, report glutathione-mediated biotransformation kinetics non-invasively and allow further analysis of this process at the chemical level. As compared to previous technologies such as such as those employing Au nanoparticles having fluorescein and R6G, a key difference here is that ICG emission was fully quenched while fluorescein and R6G are still fluorescent. In addition, $ICG_4$-Au25 bound to serum proteins, which enhanced its liver specificity to hepatic glutathione. Moreover, after dissociation, the Au25 feature was efficiently eliminated out of the body while significant accumulation of previous fluorescein, R6G-AuNPs were retained in the liver. This permits, for example, improved application of the materials described herein for blood testing to monitor hepatic glutathione depletion in the liver.

According to embodiments of the disclosure, a biothiol-activatable composition useful for liver function imaging is disclosed wherein a biothiol-activatable composition is configured to dissociate in the presence of a concentration of biomolecules that are excreted normally by a liver of a living subject. The biothiol-activatable composition comprises a nanoparticle, a reporter molecule, a linker molecule that is conjugated to the nanoparticle and further conjugated to the reporter molecule. The linker molecule is displaceable in the presence of the concentration of biomolecules and wherein the reporter molecule is released in the presence of the concentration of biomolecules.

In some embodiments, the nanoparticle is a noble metal nanoparticle, such as a gold nanoparticle; the reporter molecule comprises at least one of a fluorescent dye molecule, a radioactive molecule or an MRI agent; the linker molecule is at least one of a thiol molecule or a thiol-cleavable molecule; and the linker molecule is displaceable by biothiols in the liver.

The linker molecule may be thiolate such as glutathione or thiol-cleavable molecule comprising a disulfide. In other embodiments, the thiol molecule is selected from the group consisting of glutathione, cysteine, cysteamine and thiol-terminated polyethylene glycol.

In another aspect of the disclosure, the concentration of biomolecules comprise glutathione and it is also conceived that the biothiol-activatable composition is configured to dissociate the reporter molecule in the presence of a concentration of glutathione, wherein the concentration of glutathione is similar to what is found in liver sinusoids of the living subject when the living subject has a normal liver function. In yet another aspect, the biothiol-activatable composition is taught wherein the threshold of the concentration of glutathione for dissociation is about 0.2 mM or greater and preferably 2 mM or greater.

In another embodiment, the biothiol-activatable composition is configured to dissociate the reporter molecule in the presence of a concentration of cysteine, wherein the concentration of cysteine is similar to what is found in liver sinusoids of the living subject when the living subject has a normal liver function. It is further taught that the threshold of the concentration of cysteine for dissociation is about 0.2 mM or greater and preferably 2 mM or greater.

In other embodiments, the reporter molecule is at least one of a fluorescent dye molecule, a radioisotope or an MRI agent. In a preferred embodiment, the fluorescent dye molecule is preferably indocyanine green. In another embodiment, the radioactive molecule comprises at least one of a $^{64}Cu^{2+}$ complex or iodine. In yet another embodiment the MRI contrast agent comprises at least one of a gadolinium or iron oxide nanoparticles.

In other embodiments, a therapeutic agent is taught wherein the therapeutic agent comprises: a drug (or prodrug) linked with one or more protein-binding molecules (such as ICG) through at least one of a thiolate linker or a thiol-cleavable linker (such as an S—S disulfide bond) to form a set of molecular complexes. The set of molecular complexes split into a first ("on-target") and second ("off-target") set of molecular complexes depending upon interactions with liver efflux. When the therapeutic agent is introduced into the bloodstream of a living subject, the one or more protein-binding molecules strongly bind to serum proteins and prevent the rapid renal clearance of the drug (or prodrug), increase the blood circulation time of the drug (or prodrug) and enhance targeting of the first set of molecular complexes to a lesion (e.g., tumor). "Off-Target" conjugates in the second set of molecular complexes are dissociated in the liver of a subject through cleavage of the thiolate linker or thiol-cleavable linker by glutathione efflux. The cleavage of the thiolate or thiol-cleavable linker releases the drug (or prodrug) from the protein-binding molecule and further allows the drug (or prodrug) to be cleared through the kidney without accumulation in the healthy tissues.

In another aspect of the disclosure a molecular complex for detecting the presence of thiols and for detecting liver dysfuction comprises a reporter molecule which is fluorescent when not attached to the molecular complex; a quencher, comprising at least one of a nanoparticle or a molecular structure, that quenches the fluorescence of the reporter molecule; and, a linker molecule comprising a disulfide bond and attaching the reporter molecule to the quencher through the disulfide bond.

In another embodiment of the molecular complex, the quencher comprises a thiol-reactive nanoparticle which is attached to the fluorophore via a thiol or thiolate linker.

A method, of detecting liver function in a living subject based on blood analysis with the use of the molecular complex is conceived. The method comprises the steps of introducing the molecular complex into the living subject's bloodstream, obtaining a blood sample from the living subject, analyzing the blood sample to determine a level of fluorescence and analyzing the level of fluorescence to determine a glutathione efflux in the liver of the living subject. The glutathione efflux is indicative of liver function (glutathione efflux being an early indicator of liver dysfunction).

The method based in blood analysis is further conceived wherein the step of analyzing further comprises mixing a thiol solution with the blood sample; when the level of fluorescence is above an indicative threshold the liver is determined to be dysfunctional; and, when the level of fluorescence is below or equal to the indicative threshold, the liver is determined to have normal function.

Another method is further conceived of detecting liver function in a living subject based on urine analysis and using the molecular complex to detect biothiols. The method comprises the steps of introducing the molecular complex into the living subject's bloodstream, obtaining a urine sample from the living subject, analyzing the urine sample to determine a level of fluorescence, analyzing the level of fluorescence to determine a glutathione efflux in the liver of the living subject.

The method based on urine analysis is further conceived wherein the step of analyzing further comprises mixing a thiol solution with the blood sample; when the level of fluorescence is above an indicative threshold the liver is determined to be dysfunctional; and, when the level of fluorescence is below or equal to the indicative threshold, the liver is determined to have normal function.

Another embodiment is conceived as a method for detecting the presence of thiols in a sample solution. The method comprises the steps of preparing a base solution containing a molecular complex; mixing the sample solution with base solution to form a test solution; analyzing the test solution to determine a level of fluorescence; and analyzing the level of fluorescence to determine a thiol concentration.

The use of the word "a" or "an" when used in conjunction with the term "comprising" in the claims and/or the specification may mean "one," but it is also consistent with the meaning of "one or more," "at least one," and "one or more than one." The word "about" means plus or minus 5% of the stated number.

It is contemplated that any method or composition described herein can be implemented with respect to any other method or composition described herein. Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 1A-B show Interactions of $ICG_4$-GS-Au25 with sinusoidal glutathione efflux in the liver. FIG. 1A, Sinusoidal glutathione efflux in the liver: reduced glutathione (GSH) is efficiently synthesized inside hepatocytes and consistently transported to the perisinusoidal space (Disse space), which then diffuses into the sinusoids through the well-fenestrated liver sinusoidal endothelial cells (LSEC) and joins systematic circulation. FIG. 1B, When $ICG_4$-GS-Au25 conjugates enter liver sinusoids, they diffuse across endothelial fenestrations due to the significantly reduced blood velocity in liver sinusoids as compared to that in arteries and veins. Glutathione efflux from the hepatocytes reduce extracellular cystine to cysteine, which, along with the effluxed glutathione, react with $ICG_4$-GS-Au25 conjugates by displacing protein-binding ICG-GS from the surface of Au25, recovering the fluorescence of ICG and transforming serum-protein bound non-renal clearable $ICG_4$-GS-Au25 nanoclusters to renal clearable ones.

FIGS. 2A-F show characterization of ICG-GS-Au25 nanoprobe. FIG. 2A, Schematic of bio-thiol activatable ICG-GS-Au25 nanoprobe: when ICG is conjugated onto glutathione ligands on Au25, the NIR fluorescence of ICG is severely quenched due to photoinduced electron transfer; once the ICG-GS ligand is displaced by biothiol molecules and detached from the Au25 surface, the electron transfer process is disrupted and NIR fluorescence of ICG is recovered concurrently. FIG. 2B, Absorption profiles of GS-Au25 conjugated with an average number of 0.9 (1), 1.8 (2), 2.6 (3), 4.1 (4) ICG molecules and free ICG (5). ICG absorption peak is gradually blue-shifted as increasing number of ICG molecules are conjugated onto single GS-Au25 nanocluster, a result of increased dipole-dipole coupling among ICG molecules. FIG. 2C, Fluorescence spectra of species 1-5 in PBS with the same amount of ICG (excited at 760 nm), indicating that GS-Au25 can efficiently quench the fluorescence of ICG regardless of the number of ICG on each Au25. FIG. 2D, Color picture of species 1-5 dissolved in PBS (top) and the corresponding ICG fluorescence signals (middle) taken with an in vivo imaging system. The bottom shows fluorescence signals of the same amount of species 1-5 dissolved in PBS containing 10 mM GSH (pH adjusted to 7.4). FIG. 2E, serum protein binding percentage of GS-Au25 and GS-Au25 conjugated with an average number of 0.9, 1.8, 2.6 and 4.1 ICG molecules after 15 min incubation in 50% FBS at 37° C. Protein bound and non-bound portions were separated by gel electrophoresis and quantified by ICP-MS. Inset is a color picture showing gel electrophoresis results of GS-Au25 conjugated with an average number of 4.1 ICG molecules ($ICG_4$-GS-Au25), (1') $ICG_4$-GS-Au25 in PBS, (2') $ICG_4$-GS-Au25 in 50% FBS, (3') 50% FBS stained with 1% CBB dye. FIG. 2F, Percentage of ICG fluorescence recovery after incubating $ICG_4$-GS-Au25 in PBS or 50% FBS with different concentrations of GSH (pH adjusted to 7.4) for 10 min at 37° C. The threshold GSH concentration was estimated by finding the x-axis intercept of the tangent line at the maximal first derivative (slope) point of the respective curve.

FIGS. 3A-I show the effect of sinusoidal glutathione efflux on the in vivo behavior of $ICG_4$-GS-Au25. FIG. 3A, Renal clearance kinetics of GS-Au25 (n=3) and $ICG_4$-GS-Au25 (n=3) after intravenous injection in BALB/c mice. FIG. 3B, (i) Pharmacokinetics of GS-Au25 (n=3) and $ICG_4$-GS-Au25 (n=3) after intravenous injection in BALB/c mice. (ii) Area under the pharmacokinetics curve (AUC) and clearance parameters of GS-Au25 and $ICG_4$-GS-Au25 derived from their pharmacokinetics measurements. FIG. 3C, ICG and Au clearance in urine and feces at 24 hr after intravenous injection of $ICG_4$-GS-Au25 in BALB/c mice (n=3). FIG. 3D, Representative time-series non-invasive fluorescence imaging of PBS-treated (control) and DEM-treated BALB/c mice intravenously injected with 3 nmole $ICG_4$-GS-Au25 per mouse. ICG fluorescence signal from the liver (indicated by the white arrow) of DEM-treated mice was significantly lower than that of control mice after inhibition of sinusoidal GSH efflux. FIG. 3E, Liver ICG fluorescence kinetics of PBS-treated (n=5) mice in the first 5 min post-injection is 5.2±0.3 times faster than that of DEM-treated (n=5) mice, as monitored by the non-invasive in vivo fluorescence imaging. FIG. 3F, Average number of ICG molecules on each circulating Au25 at different time points in PBS-treated (n=3) and DEM-treated (n=3) mice after intravenous injection of 3 nmole $ICG_4$-GS-Au25 per mouse (see FIG. 24 for quantification methods). The ICG dissociation half-life in PBS-treated mice is 19.6±2.4 min whereas in DEM-treated mice is 142.8±14.6 min. FIG. 3G, Comparison of first 2 hr blood pharmacokinetics between PBS-treated (n=3) and DEM-treated (n=3) mice following intravenous injection of the same dose of $ICG_4$-GS-Au25. The inset is the renal clearance efficiency of Au25 at 30 min post-injection for PBS-treated (n=3) and DEM-treated (n=3) mice intravenously injected with $ICG_4$-GS-Au25. FIG. 3H, Fluorescence microscopic imaging of liver tissue slides of normal mice at 10 min and 24 hr after intravenous injection of $ICG_4$-GS-Au25. Liver sinusoidal endothelial cells (LSECs) were immunostained by anti-CD16/CD32 antibodies (red channel) and cell nuclei were counterstained with DAPI (blue channel). Scale bar, 15 μm. FIG. 3I, Absorption profiles of the Au nanoclusters excreted in urine from either PBS-treated (n=3) or DEM-treated (n=3) mice intravenously injected with $ICG_4$-GS-Au25. Absorption of $Au_{25}(SG)_{18}$ is included as a reference. Statistical significance is evaluated using a two-sample unequal variances (Welch's) t-test (P<0.01, *P<0.005). Data points are reported as mean±s.d.

FIGS. 4A-D show analysis of the Au25 surface chemistry after in vivo biotransformation. FIG. 4A, Illustration of the two-phase ligand-exchange method for the analysis of surface ligands on Au25 after biotransformation. The color pictures at the bottom show Au25 extracted and purified from the urine of $ICG_4$-GS-Au25 injected mice before and after two-phase ligand-exchange. FIG. 4B, Representative HPLC analysis result of the surface ligands of Au25 excreted in the urine of $ICG_4$-GS-Au25 injected mice (n=3). Molar ratios of the three surface ligands, cysteine, cysteinylglycine and glutathione were presented as the inserted pie chart. The detailed HPLC peak assignment and quantification can be found in FIGS. 26A-D. FIG. 4C, (i) Representative HPLC analysis results of the surface ligands of GS-Au25 ($Au_{25}(SG)_{18}$) after 10 min in vitro incubation in freshly-acquired mouse blood at 37° C. and 10 min in vivo circulation with both renal arteries temporarily clamped to prevent rapid renal clearance of GS-Au25. The inset is a zoom-in figure of the cysteine signal peaks. (ii) Average number of cysteine ligands on each GS-Au25 surface after in vitro incubation or in vivo circulation for 10 min (n=3). FIG. 4D, Fluorescence microscope imaging of kidney tissues (H&E stained) of a normal mouse at 10 min after intravenous injection of $ICG_4$-GS-Au25 (see FIG. 29 for additional and control images). Images of two magnifications (400× and 1000×) show that ICG fluorescence light-up is mainly at the wall of proximal tubular lumens (characterized by the dense microvilli) rather than the glomeruli. Scale bar, 50 µm in 400× images; 20 µm in 1000× images. Statistical significance is evaluated using a two-sample unequal variances (Welch's) t-test (**P<0.01). Data points are reported as mean±s.d.

FIG. 5A, Tumor targeting efficiency of $ICG_4$-GS-Au25 (n=3) in terms of Au (i) and ICG (ii) at 24 hr post-injection as compared to those of GS-Au25 (n=3) and free ICG (n=3), respectively. FIG. 5B, Comparison of ICG blood pharmacokinetics between mice intravenously injected with free ICG (n=3) and $ICG_4$-GS-Au25 (n=3). The inserted is the area under the ICG pharmacokinetics curve (AUC) for free ICG and $ICG_4$-GS-Au25. FIG. 5C, Representative in vivo fluorescence images of MCF-7 tumor bearing nude mice at various time points after intravenous injection of either $ICG_4$-GS-Au25 or equal amount of free ICG. Blue arrows indicate the tumors. FIG. 5D, Tumor contrast index (CI=tumor mean fluorescence intensity/contralateral background tissue mean fluorescence intensity) curves as a function of time for $ICG_4$-GS-Au25 (n=3) and free ICG (n=3) injected mice. FIG. 5E, Tumor fluorescence-intensity curves as a function of time for $ICG_4$-GS-Au25 (n=3) and free ICG (n=3) injected mice. Both curves were fitted with two-phase exponential decay functions to obtain the weighted average half-lives. FIG. 5F, On the left is an illustration of the experiment proving that ICG-Au25 conjugates as a whole effectively extravasated tumor blood vessels and entered tumor microenvironment. At 15 mM post-intravenous injection of $ICG_4$-GS-Au25, the mice were sacrificed and thoroughly perfused with PBS to remove ICG-Au25 conjugates in blood vessels, and then tumors were resected and intratumorally injected with 10 mM GSH (pH 7.4) to induce the dissociation of ICG-Au25 in tumor microenvironment. On the right is the tumor ICG fluorescence intensity (normalized) before and after introducing GSH. The significantly enhanced ICG fluorescence after GSH injection proves that ICG-Au25 conjugates effectively entered the tumor microenvironment. The inset are the fluorescence images of an MCF-7 tumor before and after intratumoral injection of GSH. FIG. 5G, Fluorescence microscope imaging of MCF-7 tumor tissue (H&E stained) of a nude mouse at 24 hr after intravenous injection of $ICG_4$-GS-Au25 (additional and control images are in FIG. 31). ICG was efficiently taken up by the tumor cells and located in endosome-like membrane-bound compartments (see the zoom-in image at lower left), consistent with the observations at the in vitro level (FIG. 32). Scale bar, 6 µm for the zoom-in image at lower left and 20 µm for the rest. Statistical significance is evaluated using a two-sample unequal variances (Welch's) t-test (P<0.01, *P<0.005). Data points are reported as mean±s.d.

FIG. 9B is a flow chart related to FIG. 9A.

FIG. 10B is a flow chart related to FIG. 10A.

FIGS. 12A-D. Characterization of the synthesized GS-Au25. (FIG. 12A) TEM image of the synthesized GS-Au25 nanoclusters. (FIG. 12B) The average core size of GS-Au25 is ~1.1 nm, comparable to that of the reported values (Wu et al., 2011). (FIG. 12C) Absorption spectrum of the synthesized GS-Au25 exhibits the characteristic absorption features of Au25 nanoclusters. (FIG. 12D) Electrospray ionization mass spectrometry (ESI-MS) analysis confirms the molecular formula of Au25(SG)1s.

FIGS. 13A-C. Characterization of ICG4-GS-Au25. (FIG. 13A) TEM image of the purified ICG4-GS-Au25 nanoprobes. (FIG. 13B) The average core size of 1CG4-GS-Au25 is ~1.1 nm, identical to that of GS-Au25. (FIG. 13C) Size-exclusion chromatography confirms that no free ICG was left after the purification of 1CG4-GS-Au25.

FIGS. 17A-B. Hydrodynamic diameter (HD) of ICG4-GS-Au25 in PBS and BSA. (FIG. 17A) In PBS, ICG4-GS-Au25 has an HD of ~3.4 nm whereas in the presence of BSA at molar ratio of 1:1, ICG4-GS-Au25 binds to BSA and the overall HD increases to ~8.2 nm. (FIG. 17B) Large size aggregates were not observed by incubating ICG4-GS-Au25 in excess of BSA (molar ratio 1:10), indicating that ICG4-GS-Au25 will not aggregate in vivo after binding to serum proteins in blood. The measured size slightly decreased at 1:10 molar ratio due to the dominance of free BSA.

FIGS. 18A-C. Biodistribution of ICG4-GS-Au25 and GS-Au25 quantified by ICP-MS. (FIG. 18A) Au biodistribution in different organs of mice injected with ICG4-GS-Au25 (n=3). (FIG. 18B) Au biodistribution in different organs of mice injected with GS-Au25 (n=3). (FIG. 18C) Comparison of Au content in liver at 1 hr and 24 hr p.i.

FIGS. 19A-B. Long-term biodistribution of ICG4-GS-Au25 in major organs. (FIG. 19A) Au biodistribution in major organs at 24 hr, 7 day and 30 day after i.v. injection of 1CG4-GS-Au25. (FIG. 19B) ICG biodistribution in major organs at 24 hr, 7 day and 30 day after i.v. injection of 1CG4-GS-Au25 (n=3).

FIGS. 20A-B. Representative in vivo fluorescence images of mice after intravenous injection of ICG4-GS-Au25 and free ICG. Non-invasive in vivo fluorescence imaging of mice intravenously injected with ICG4-GS-Au25 (FIG. 20A) and free ICG (FIG. 20B) at 20 sec post-injection. Unlike free ICG that lighted up heart and background tissues (abdominal area) right after intravenous injection, ICG4-GS-Au25 remained relatively dark during extra-hepatic blood circulation but was lighted up immediately after entering the liver, indicating the major role of liver in inducing the dissociation of ICG from Au25 in vivo.

FIGS. 21A-B. Plasma glutathione level after DEM administration. (FIG. 21A) Plasma total glutathione (reduced GSH+2GSSG) and glutathione disulfide (GSSG) concentration at various time points after intraperitoneal injection of 1 mL/kg DEM in mice (n=3). (FIG. 21B) Plasma reduced glutathione concentration at different time was then calculated by subtracting GSSG from the total GSH concentration. The quantification of plasma total GSH and GSSG was carried out according to the established procedures (Rahman et al., 2006) via a modified Tietze enzymatic recycling assay.

FIGS. 22A-B. Comparison of liver uptake of ICG in DEM-treated mice and PBS-treated mice. (FIG. 22A) Representative time-series fluorescence images of DEM-treated and PBS-treated mice intravenously injected with the same amount of free ICG (~10 nmole). (FIG. 22B) Liver ICG fluorescence kinetics of PBS-treated (n=3) and DEM-treated (n=3) mice, indicating that hepatic uptake of ICG was not significantly altered after DEM administration. Red dashed circle indicates the region of interest (ROI) for liver fluorescence quantification.

FIGS. 23A-B. Non-invasive fluorescence imaging of ICG4-GS-Au25 dissociation in macrophage-depleted mice and control mice. (FIG. 23A) Non-invasive in vivo fluorescence images of mice (n=3) pretreated with clodronate liposomes (Clophosome) and control liposomes (control) at 5 min post-i.v. injection of the same ICG4-GS-Au25. (FIG. 23B) Liver ICG fluorescence kinetics of mice treated with clodronate liposomes and control liposomes after i.v. injection of the ICG4-GS-Au25. Statistical significance is evaluated by two-way ANOVA ("n.s.", p>0.05, no significant difference).

FIG. 24. Scheme of quantifying the number of ICG molecules per circulating Au25 in blood.

FIGS. 25A-B. Fluorescent IHC staining of liver macrophage and liver sinusoidal endothelial cell (LESC). Fluorescent images of liver tissue slides with immunohistochemistry (IHC) staining of macrophage or LSEC from mice injected with ICG4-GS-Au25 at 10 min (FIG. 25A) and 24 hr (FIG. 25B) post-injection. Cell nuclei were counterstained with DAPI. Scale bar, 15 μm. The bright and dotted ICG fluorescence around the wall of sinusoids had longer retention than those ICG signals in hepatocytes and co localized well with either liver macrophage or LSEC, indicating that a very small portion of injected ICG4-GS-Au25 was still subject to uptake by those scavenger cells in liver.

FIGS. 26A-D. HPLC peak assignment and quantifications. (FIG. 26A) Retention times of NPM derivatized Cys (~9.9 min), Gly-Cys (~10.6 min) and GSH (~11.8 min) in HPLC under the same condition as that used for nanoparticle surface ligand analysis, matching well to the retention times of those surface ligands on the excreted Au25 in urine. (FIG. 26B) Standard curve of the GSH/Cys molar ratio versus their peak area ratio. (FIG. 26C), Standard curve of the Cys/Gly-Cys molar ratio versus their peak area ratio. (FIG. 26D) HPLC result of a mixture of Cys, Gly-Cys and GSH at a molar ratio of 5:2:5 (calculated based on the standard curves), which is almost identical to that obtained from the surface ligands of the excreted Au25 (inserted), further validated the peak assignment and quantifications.

FIG. 27A-B. In vitro thiol-disulfide exchange between GSH and cystine. (FIG. 27A) Percentage of ICG fluorescence recovery after incubating ICG4-GS-Au25 in PBS containing various concentrations of either cysteine (Cys) or cystine (Cyss) for 10 min at 37° C. While Cys is able to displace ICG-GS from the surface of Au25 in a concentration dependent manner, Cyss cannot displace ICG-GS regardless of its concentration due to the absence of thiol group (—SH). (FIG. 27B) HPLC results of pure Cyss and a 1:1 mixture of Cyss and GSH. The disulfide group in Cyss cannot react with NPM so no signal could be observed for pure Cyss; however, a 1:1 mixture of GSH and Cyss for just 5 mM at 37° C. could rapidly convert −60% Cyss to Cys via a thiol-disulfide exchange reaction, consistent with the literature that GSH-Cyss reaction favors the formation of Cys (equilibrium constant k>1) in physiological conditions (Jocelyn, 1967; Wu et al., 2009).

FIGS. 28A-B. Surface ligand analysis of PEG-AuNPs after 10 min in vivo circulation. (FIG. 28A) Illustration of the PEG-AuNPs used for in vivo experiment. PEG-AuNPs were synthesized based on our previously reported method (Liu et al., 2013). (FIG. 28B) HPLC analysis of the surface ligands of PEG-AuNPs before and after in vivo circulation. PEG-AuNPs were intravenously injected into mice immediately after their renal arteries were clamped to prevent renal elimination of PEG-AuNPs. After 10 mM circulation, blood was withdrawn through cardiac puncture and PEG-AuNPs were extracted and purified for surface ligand analysis. GSH and Cys with a molar ratio of ~1:3 were found on the surface of PEG-AuNPs after in vivo circulation. Since ligand displacement of circulating AuNPs happened mainly at liver sinusoids, this experiment further confirmed the primary role of sinusoidal GSH and Cys in bio-transforming the surface chemistry of circulating AuNPs in vivo.

FIG. 29. Additional fluorescence image of kidney tissue from ICG4-GS-Au25 injected mice and the control. Control images are from mice injected with PBS. Scale bar, 20 μm.

FIGS. 30A-B. Decay of background tissue fluorescence signal over time. (FIG. 30A) Representative in vivo imaging of 1CG4-GS-Au25 injected mouse (72 hr p.i.) illustrating the region of interest (ROI) chosen for tumor (red dashed circle) and background tissue (yellow dashed circle) ICG fluorescence quantification. Red arrows indicate tumor location. (FIG. 30B) Decay profiles of ICG fluorescence in background tissues over time for mice injected with ICG4-GS-Au25 or free ICG. A significant difference between ICG fluorescence decay half-live in tumor (310.3 h) vs. in background tissues (~13 h) accounts for the high tumor imaging contrast and prolonged imaging time window in ICG4-GS-Au25 injected mice.

FIGS. 36A-G. Glutathione-mediated biotransformation of different-sized AuNPs. (FIG. 36A) Scheme illustrating the construction of ICG/PEG-AuNPs and monitoring of glutathione-mediated biotransformation through the "turn-on" of ICG fluorescence. (FIG. 36B) Characterization of different-sized ICG/PEG-AuNPs. The subtraction-derived ICG absorption and the particle size were used to calculate the ICG surface coverage density on AuNPs. (FIG. 36C) Table summarizing the core size, hydrodynamic diameter and calculated ICG surface coverage density of different-sized ICG/PEG-AuNPs. (FIG. 36D1) Fluorescence imaging of different-sized ICG/PEG-AuNPs incubated in 2 mM GSH PBS solution (containing 50% FBS, 37° C., pH7.4) for 0, 5, 10 and 15 min. The total amount of ICG was kept the same for each sized ICG/PEG-AuNPs. (FIG. 36D2) Control experiment showing that fluorescence of the released ICG-GSH would not be quenched by the different-sized AuNPs. (FIGS. 36D3-4) Time-dependent ICG fluorescence recovering rate of different-sized ICG/PEG-AuNPs before and after factoring differences in their surface ICG coverage density (all normalized to that of 5 nm ICG/PEG-AuNPs). (FIG. 36E1) Representative non-invasive in vivo fluorescence imaging of macrophage-depleted mice at multiple time points following intravenous injection of different-sized ICG/PEG-AuNPs. The total amount of injected ICG was kept the same for each sized ICG/PEG-AuNPs. 100 nm ICG/PEG-AuNPs were excluded in the in vivo study due to enormous dose of AuNPs required to keep ICG amount constant for different-sized AuNPs and a decent SIN ratio as well. (FIGS. 36E2-3) Time-dependent liver ICG fluorescence intensity of mice injected with different-sized ICG/PEG-AuNPs before and after factoring differences in their surface ICG coverage density (all normalized to that of 5 nm ICG/PEG-AuNPs), n=3. (FIG. 36F) Normalized ICG releasing rate in both in vitro and in vivo experiments with respect to the size of ICG/PEG-AuNPs (after correction of their differences in ICG surface coverage density). Both in vitro and in vivo experiments indicate that biotransformation rate of solid AuNPs decrease exponentially with the increase in their core sizes. (FIG. 36G) Average GSH ligand density on different-sized bare (citrate-stabilized) AuNPs after reaction with excess GSH for just 2 min. GSH reacts significantly faster with smaller bare AuNPs than that of larger ones even in the very beginning time period (the first 2 min) when GSH could almost freely react with AuNPs without much ligand-ligand steric hindrance, implying this size-dependent glutathione-mediated biotransformation arises fundamentally from the fact that the surface gold atoms of smaller AuNPs are more reactive towards GSH. The scheme on the top depicts the experimental design. GSH ligand density on nanoparticle surface was determined by quantifying the remaining free unbound GSH in solution after reaction through the Tietze enzymatic recycling assay.

FIG. 37A-G. Glutathione-mediated biotransformation of 3 nm and 6 nm 4-mercaptobenzoic acid coated gold nanoparticles (MBA-AuNPs). (FIG. 37A) Two different-sized MBA-AuNPs were synthesized and named as MBA-AuNPs (L) for the larger ones and MBA-AuNPs(S) for the smaller ones. (FIG. 37B) Gel filtration chromatography of the two different-sized MBA-AuNPs. Their sizes were determined by a series of protein standards. (FIG. 37C) Due to the lack of anti-fouling property of MBA ligand, both MBA-AuNPs bind to serum proteins tightly as revealed by the agarose gel electrophoresis. (FIG. 37D) Au accumulation in urine as well as in liver and spleen of mice at 24 hr post-intravenous injection of MBA-AuNPs(L) or MBA-AuNPs(S), n=3. MBA-AuNPs(S) exhibited a 10-fold increase in renal clearance and significantly lowered MPS uptake compared to that of MBA-AuNPs(L) at 24 hr p.i. Statistical significance is evaluated by two-sample t-test ($p<0.01$, *$P<0.005$). (FIG. 37E) The MBA-AuNPs (S) excreted in urine had similar absorption of the Au cores relative to the injected ones, indicating that their Au core structures did not change. (FIG. 37F) The MBA-AuNPs (S) excreted in urine were found to no longer bind to serum proteins, clearly proving that their surface chemistry had been bio-transformed. (FIG. 37G) Scheme illustrating the competing and interacting role of hepatic GSH-mediated biotransformation and MPS uptake in modulating the in vivo transport of both MBA-AuNPs. These results clearly confirmed the balance between MPS uptake and glutathione-mediated biotransformation and that smaller MBA-AuNPs were more readily transformed by the glutathione-mediated biotransformation, which significantly enhanced their renal clearance and reduced nonspecific accumulation by the MPS than that of larger MBA-AuNPs, consistent with our observation from ICG4-GS-Au25 and other large AuNPs.

FIGS. 38A-F. Glutathione-mediated biotransformation of ~100 nm polymeric GS-Au nanoparticles. (FIG. 38A) Scheme showing that ~100 nm large GS-Au polymeric nanoparticles could be disintegrated into ~2-3 nm ultrasmall nanoparticles after incubation with 5 mM GSH PBS solution (37° C., pH 7.4) for 10 min as proved by DLS measurement of their hydrodynamic diameter (HD). (FIG. 38B) Illustration of ICG conjugated GS-Au polymeric nanoparticles (ICG-GS-Au polymer) and the "turn-on" of ICG fluorescence when ICG-GS-Au polymer were dissociated by GSH. Shown in the bottom is the fluorescence image of ICG-GS-Au polymer in PBS solution with (+) and without (−) 5 mM GSH (pH7.4). (FIG. 38C) Non-invasive in vivo fluorescence imaging of mice (n=3) treated with either DEM or PBS at 5 min post-intravenous injection of the same I CG-GS-Au polymer. (FIG. 38D) Time-dependent liver ICG fluorescence intensity of DEM- and PBS-treated mice following i.v. injection of the same ICG-GS-Au polymer. Liver ICG fluorescence in control mice (PBS-treated) increased significantly faster than that in DEM-treated mice, clearly proving that the polymeric GS-Au nanoparticles were disintegrated by the gluathione-mediated biotransformation in liver. (FIG. 38E) Renal clearance of the ~100 nm GS-Au polymer through the in vivo dissociation in liver during the first 48 hr p.i., n=3. (FIG. 38F) Liver and spleen accumulation of Au in DEM- and PBS-treated mice at 48 hr post-intravenous injection of the same GS-Au polymer. The liver and spleen accumulation of polymeric GS-Au nanoparticles significantly increased once mice were pretreated with DEM to inhibit glutathione-mediated biotransformation, consistent with our hypothesis that glutathione-mediated biotransformation helps to facilitate the renal clearance of GS-Au polymer and reduce the MPS uptake. Statistical significance is evaluated by two-sample t-test (*$p<0.05$).

FIGS. 39A-E. Utilization of hepatic glutathione-mediated biotransformation to enhance tumor targeting of a cisplatin prodrug. (FIG. 39A) Scheme illustrating the rationale of designing the ICG-Cis-Pt prodrug by combining temporal serum protein binding and hepatic glutathione-mediated biotransformation to slow down the rapid renal clearance of Cis-Pt prodrug and enhance its tumor targeting efficiency while avoiding predominant accumulation in MPS. (FIG. 39B) Blood retention of ICG-Cis-Pt prodrug is significantly longer than that of Cis-Pt prodrug due to ICG-induced serum protein binding that slows down the renal clearance. Inserted is the comparison of AUC of ICG-Cis-Pt prodrug (34.2±2.2% ID/g×h) and that of Cis-Pt prodrug (7.4±0.2% ID/g×h) during the first 6 hr p.i. (FIG. 39C) Tumor targeting efficiency of Cis-Pt pro drug and ICG-Cis-Pt prodrug at 48 hr p.i. (FIG. 39D) Renal clearance profiles of Cis-Pt prodrug and ICG-Cis-Pt prodrug. The initial renal clearance kinetics of ICG-Cis-Pt is significantly reduced relative to that of Cis-Pt prodrug, consistent with the pharmacokinetics study. (FIG. 39E) Biodistribution of Pt in organs at 48 hr and 7 day following intravenously injection of ICG-Cis-Pt prodrug. The accumulation of ICG-Cis-Pt in MPS as well as in other major organs is low and continues to decrease over time. Statistical significance is evaluated by two-sample t-test (**$p<0.01$).

FIG. 40. Schematic illustration of ICG$_4$-GS-Au25 enabled non-invasive monitoring of hepatic GSH depletion through both the in vivo fluorescence imaging and blood test. After intravenous administration, ICG$_4$-GS-Au25 nanoprobes bind to serum proteins and are efficiently transported to the liver, where their surface chemistries undergo biotransformation specifically by the liver sinusoidal GSH efflux, displacing the ICG-GS moiety from the surface of Au25 and activating the NIR fluorescence of ICG, thus allowing for reporting liver GSH through in vivo fluorescence imaging. The biotransformed ICG$_4$-GS-Au25 derivatives with reduced number of surface-ICG molecules will carry the hepatic GSH information back to blood circulation, where they are fairly stable and therefore enable detecting hepatic GSH level from peripheral blood after detaching the remaining ICG-GS from Au25 with dithiothreitol (DTT). Compared with normal condition, hepatic GSH depletion results in decreased ICG fluorescence activation kinetics in the liver and increased ICG fluorescence ON/OFF ratios in the peripheral blood because ICG molecules are less efficiently released in the liver and thus more ICG molecules will remain on the Au25 surface after going through the liver sinusoids. Finally, the separated ICG-GS and Au25 will be cleared through the hepatobiliary and renal pathways, respectively, without being retained in the body.

FIGS. 41A-F. Fluorescence activation kinetics of ICG$_4$-GS-Au25 depends linearly on GSH level both in vitro and in vivo. (FIG. 41A) Absorption spectra of ICG$_4$-GS-Au25, free ICG and GS-Au25 nanocluster. Inserted is a schematic of the ICG$_4$-GS-Au25 structure. (FIG. 41B) Time-dependent ICG fluorescence intensity of ICG$_4$-GS-Au25 incubated in PBS containing different concentrations of GSH. (FIG. 41C) Correlation between GSH concentration and ICG fluorescence recovery kinetics of ICG$_4$-GS-Au25. The degree of correlation is quantified by Pearson's correlation coefficient (Pearson's r). (FIG. 41D) Representative noninvasive in vivo fluorescence images show the activation of ICG fluorescence in the liver (pointed by arrows) following i.v. injection of the same dose of $ICG_4$-GS-Au25 in mice pre-treated with different doses of diethyl maleate (DEM) 30 mins in advance. (FIG. 41E) Time-dependent liver ICG fluorescence curves of DEM-treated mice after injection of the same dose of $ICG_4$-GS-Au25. (FIG. 41F) Correlation between liver GSH level and liver ICG fluorescence kinetics of individual mouse. N=3 mice for 0.3 and 0.6 mL/kg DEM-treated groups, N=4 for 0 mg/kg DEM-treated group. Statistical significance is evaluated by two-sample equal variance t-test (P<0.05; statistically significant). Data points are presented as means and standard deviation.

FIGS. 42A-E. Monitoring of drug-induced hepatic GSH depletion with $ICG_4$-GS-Au25 through fluorescence imaging. (FIG. 42A) Representative noninvasive in vivo fluorescence images of mice show the activation of ICG fluorescence in the liver (pointed by arrows) following i.v. injection of the same dose of $ICG_4$-GS-Au25 in mouse model of acetaminophen (APAP)-induced liver injury. Mice were intraperitoneally injected with an overdose of APAP (300 mg/kg), a normal dose of APAP (60 mg/kg) or saline (0 mg/kg) as control at 30 min before the injection of $ICG_4$-GS-Au25. (FIG. 42B) Time-dependent liver ICG fluorescence curves of APAP-treated mice after injection of the same $ICG_4$-GS-Au25. (FIG. 42C) Comparison of liver ICG fluorescence kinetics of mice treated with different doses of APAP. N=3 mice for control and 60 mg/kg groups, N=4 mice for 300 mg/kg group. (FIG. 42D) Liver GSH level measured ex vivo immediately after in vivo fluorescence imaging. (FIG. 42E) Consecutively monitor liver GSH level in the same group of APAP overdosed mice through repeated administration of $ICG_4$-GS-Au25. APAP (300 mg/kg body weight) was intraperitoneally administered to mice at 0 h and the liver fluorescence imaging was performed at 4 h prior to APAP injection (normal status) as well as at 0.5, 4, 8 and 18 h after APAP injection. N=3 mice for consecutive liver fluorescence imaging. The liver GSH levels at different time points before and after APAP injection were directly measured ex vivo using liver tissues of 5 groups of mice (N=3 for each group). Statistical significance is evaluated by two-sample equal variance t-test (P<0.05; statistically significant). Data points are presented as means and standard deviation.

FIGS. 43A-F. Monitoring drug-induced hepatic GSH depletion with $ICG_4$-GS-Au25 through blood test. (FIG. 43A) ICG fluorescence of the same $ICG_4$-GS-Au25 after 20 min incubation in fresh mouse serum or mouse serum containing 10 mM DTT. (FIG. 43B) Schematic of the rationale for blood sampling-based detection method. (FIG. 43C) Timeline of the experiment. (FIG. 43D) Typical ICG fluorescence of peripheral blood samples from mice treated with 0, 60 mg/kg and 300 mg/kg body weight APAP at 1 min after the injection of $ICG_4$-GS-Au25 nanoprobe. DTT was used to release ICG-GS from the surface of Au25 nanocluster. (FIG. 43E) Peripheral blood ICG fluorescence ON/OFF ratio at 1 min as well as 15 min after the injection of $ICG_4$-GS-Au25 nanoprobe at 30 min post APAP treatment. N=3 mice for control and 60 mg/kg groups, N=4 mice for 300 mg/kg group. (FIG. 43F) Consecutively monitor liver GSH level via blood test in the same APAP overdosed mice (N=3) through repeated administration of $ICG_4$-GS-Au25. 300 mg/kg body weight APAP was i.p. administered to mice at 0 h (indicated by the arrow) and peripheral blood was sampled at 1 min as well as 15 min after the injection of $ICG_4$-GS-Au25 at multiple time points before and after APAP treatment. Statistical significance is evaluated by two-sample equal variance t-test (P<0.05; statistically significant). Data points are presented as means and standard deviation.

FIGS. 44A-D. Monitoring hepatic GSH depletion in drug-induced liver injury allows early treatment and improves prognosis. (FIG. 44A) Scheme of the APAP metabolism and pathophysiology process of APAP overdose induced hepatotoxicity. Hepatic GSH depletion occurs much earlier than the death of hepatocytes and the release of serum biomarkers. (FIG. 44B) Serum ALT levels of mice (N=3) at multiple time points after receiving 300 mg/kg body weight APAP. Inserted figure shows the serum ALT levels in the first 5 hrs. (FIG. 44C) Serum ALT levels of mice (N=3) at 12 h post injection of overdose APAP with NAC treatment at different time points after APAP administration. (FIG. 44D) Representative color pictures of the liver (12 h after APAP administration) as well as fluorescent microscope images of cell death in liver tissues (detected using TUNEL assay) from APAP overdosed mice without NAC treatment or receiving NAC treatment at 30 min (early treatment) and 5.5 h (delayed treatment) after APAP administration. Cell nuclei were counter-stained with DAPI. Scale bar, 20 µm. Statistical significance is evaluated by two-sample equal variance t-test (P<0.05; statistically significant). Data points are presented as means and standard deviation.

FIGS. 45A-G. Early detection of CPZ-induced liver injury by $ICG_4$-GS-Au25 enabled fluorescence imaging and blood test of hepatic GSH depletion. (FIG. 45A) Structure of the antipsychotic drug chlorpromazine (CPZ). CPZ was administered to the mice intraperitoneally at a dose of 100 mg/kg body weight. (FIG. 45B) Representative in vivo fluorescence imaging of control (PBS-treated) and CPZ-treated mice at 0.5 h after drug administration with intravenous injection of the same $ICG_4$-GS-Au25. (FIG. 45C) Time dependent liver ICG fluorescence following the injection of $ICG_4$-GS-Au25 (N=3 mice for each group). (FIG. 45D) Liver ICG fluorescence activation kinetics of control and CPZ-treated mice. (FIG. 45E) The ICG fluorescence ON/OFF ratio of peripheral blood at 1 mM and 15 min after the injection of $ICG_4$-GS-Au25 at 0.5 h post CPZ treatment. (FIG. 45F) Measured Liver GSH level of the control and CPZ-treated mice at 0.5 h after CPZ administration confirms the decrease in hepatic GSH level by CPZ. (FIG. 45G) Serum ALT levels of mice before and at 0.5 h and 12 h after the administration of 100 mg/kg body weight CPZ. Statistical significance is evaluated by two-sample equal variance t-test (P<0.05; statistically significant).

FIGS. 46A-B. Characterization of $ICG_4$-GS-Au25. (FIG. 46A) TEM image of purified ICG4-GS-Au25 nanoprobes showing excellent monodispersity with core size ~1.1 nm. (FIG. 46B) Size-exclusion chromatography confirms no free ICG was left after the purification of ICG4-GS-Au25.

FIGS. 47A-B. GSH activatable ICG4-GS-Au25 fluorescence. (FIG. 47A) Schematic illustration of ICG fluorescence turn-on after ICG4-GS-Au25 reaction with GSH through ligand exchange. (FIG. 47B) ICG fluorescence spectra of ICG4-GS-Au25 in PBS and after incubation in PBS containing 10 mM GSH (pH-7.4) for 10 min.

FIGS. 48A-B. Reaction of different concentrations of ICG4-GS-Au25 with GSH. (FIG. 48A) ICG fluorescence activation of different concentrations of ICG4-GS-Au25 reacting with 0.2 mM GSH in PBS (pH-7.4). (FIG. 48B) Linear correlation between ICG fluorescence activation kinetics and ICG4-GS-Au25 concentration.

FIGS. 52A-B. ICG clearance kinetics in the liver and blood after intravenous injection of ICG4-GS-Au25. (FIG. 52A) ICG clearance kinetics in the liver. (FIG. 52B) ICG clearance kinetics in the blood. N=3 mice for each experiment.

DETAILED DESCRIPTION OF THE DISCLOSURE

A review of the details of various embodiments of the present disclosure is provided first with the help of FIGS. 7-10. Experimental details follow in discussion of FIGS. 1-6.

Figure 7:
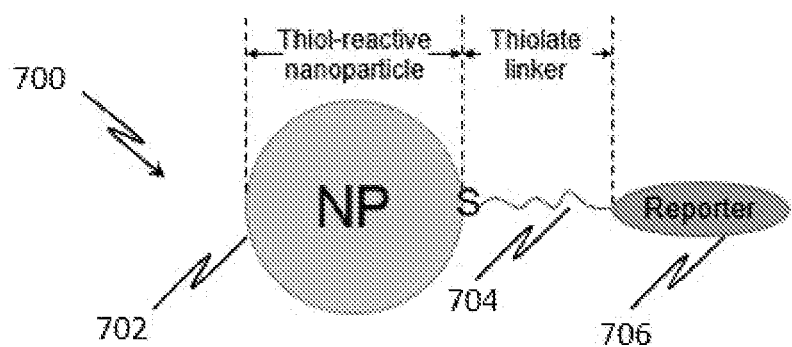
FIG. 7 is a schematic of a composition for liver function detection according to an embodiment of the present disclosure. The composition comprises a thiolate linker with the thiol group linked to a thiol-reactive nanoparticle and the other end linked to a reporter. The thiol-reactive nanoparticle includes but is not limited to metal (Au, Ag, Pt, etc.) nanoparticles, metal-containing nanoparticles ($Ag_2S$, ZnS, etc.) and semiconductor quantum dots. The thiolate linker includes but is not limited to small thiol and peptides (glutathione, cystine, cystamine, etc.) as well as thiolate polymer linkers ($NH_2$—PEG (polyethylene glycol)-SH, COOH-PEG-SH, etc.). The fluorophore may be but is not limited to near infrared fluorophores (ICG, IRDye 800CW, 800CW-1, Cy7.5, Cy7, Alexa Fluor 750, etc.), radioisotopes for PET and SPECT imaging, CT contrast agents and MRI contrast agents.

Referring to FIG. 7, an embodiment of the present disclosure is illustrated as composition 700 useful for liver function imaging in vivo. Composition 700 comprises a thiol-reactive nanoparticle (NP) 702 attached to a reporter molecule 706 via a thiolate linker 704. Thiol-reactive NP 702 may be selected from pure metal nanoparticles, metal-containing nanoparticles, semiconductor quantum dots, MoS nanoparticles, graphene nanoparticles and carbon nanostructures. Non-limiting examples of pure metal nanoparticles are Au, Ag, Pt and non-limiting examples of metal-containing nanoparticles are $Ag_2S$, ZnS. Thiolate linker 704 may be selected, for example, from small thiol molecules, peptides and thiolate polymer linkers. Example thiol molecules and peptides include (but should not be limited to) glutathione, cysteine and cysteamine. Example thiolate polymer linkers include (but should not be limited to) polyethylene glycol-SH and COOH-PEG-SH. Examples of reporter molecule 706 may be selected, for example, from a near infrared fluorphore, a radiositope for PET and SPECT imaging, a CT contrast agent and an MRI contrast agent. Examples of a near-infrared fluorophore useful for the embodiment include ICG, IRDye 800CW, 800CW-1, Cy7.5, Cy7 and Alexa Fluor 750 and others.

Figure 8:
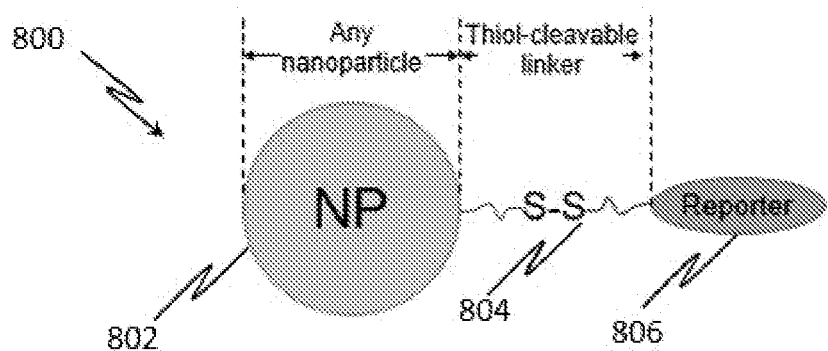
FIG. 8 is a schematic of a composition for liver function detection according to another embodiment of the present disclosure. The composition comprises a thiol-cleavable linker with one end linked to a nanoparticle and the other end linked to a reporter. The thiol-cleavable linker includes but is not limited to small disulfide molecules and peptides (oxidized glutathione, cystine, cystamine, etc.) as well as disulfide polymer linkers (PEG-s-s-PEG, etc.). The fluorophore may be but is not limited to ICG, IRDye 800CW, 800CW-1, Cy7.5, Cy7, Alexa Fluor 750 and other light-emitting molecules suitable for bioimaging.

Referring to FIG. 8, an embodiment of the present disclosure is illustrated as composition 800 also useful for liver function imaging in vivo. Composition 800 comprises a nanoparticle (NP) 802 attached to a reporter molecule 806 via a thiol-cleavable linker 804. NP 802 is conceivably any nanoparticle. Non-limiting examples of NP 802 are pure metal nanoparticles, metal-containing nanoparticles, semiconductor quantum dots, MoS nanoparticles, graphene nanoparticles and carbon nanostructures.

Thiol-cleavable linker 804 may be selected, for example, from small disulfide molecules, peptides and disulfide polymer linkers. Example disulfide molecules and peptides include (but should not be limited to) oxidized glutathione, cystine and cystamine Disulfide polymer linkers such as PEG-s-s-PEG are appropriate for composition 800. Examples of reporter molecule 806 may be selected, for example, from a near infrared fluorphore, a radiositope for pet and SPECT imaging, a CT contrast agent and an MRI contrast agent. Examples of a near-infrared fluorophore useful for the embodiment include ICG, IRDye 800CW, 800CW-1, Cy7.5, Cy7 and Alexa Fluor 750 and others.

Figure 9A:
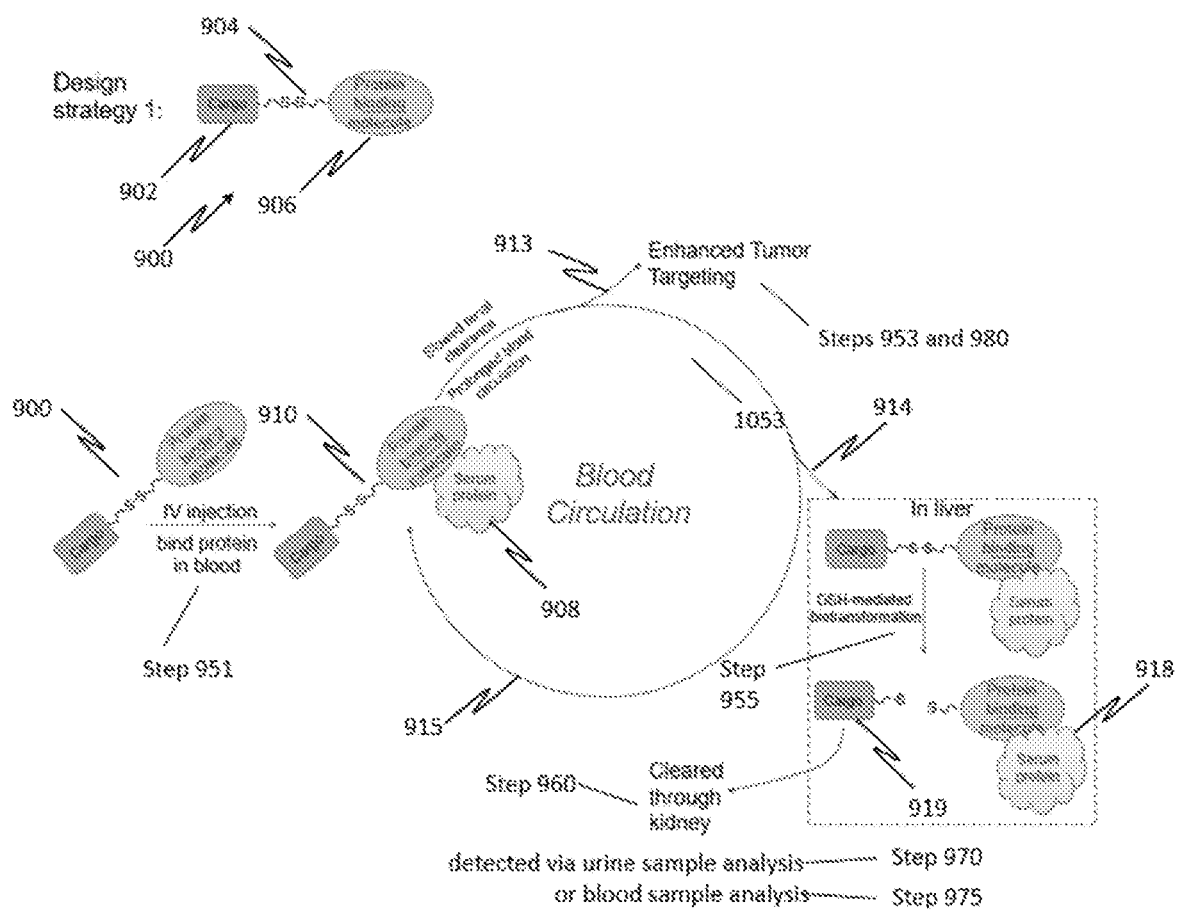
FIG. 9A-B is a schematic of a composition and method for delivery of a diagnostic agent (e.g., contrast agent) or therapeutic agent (e.g., drug) that are rapidly cleared through kidney filtration according to an embodiment of the present disclosure.
Figure 9B:
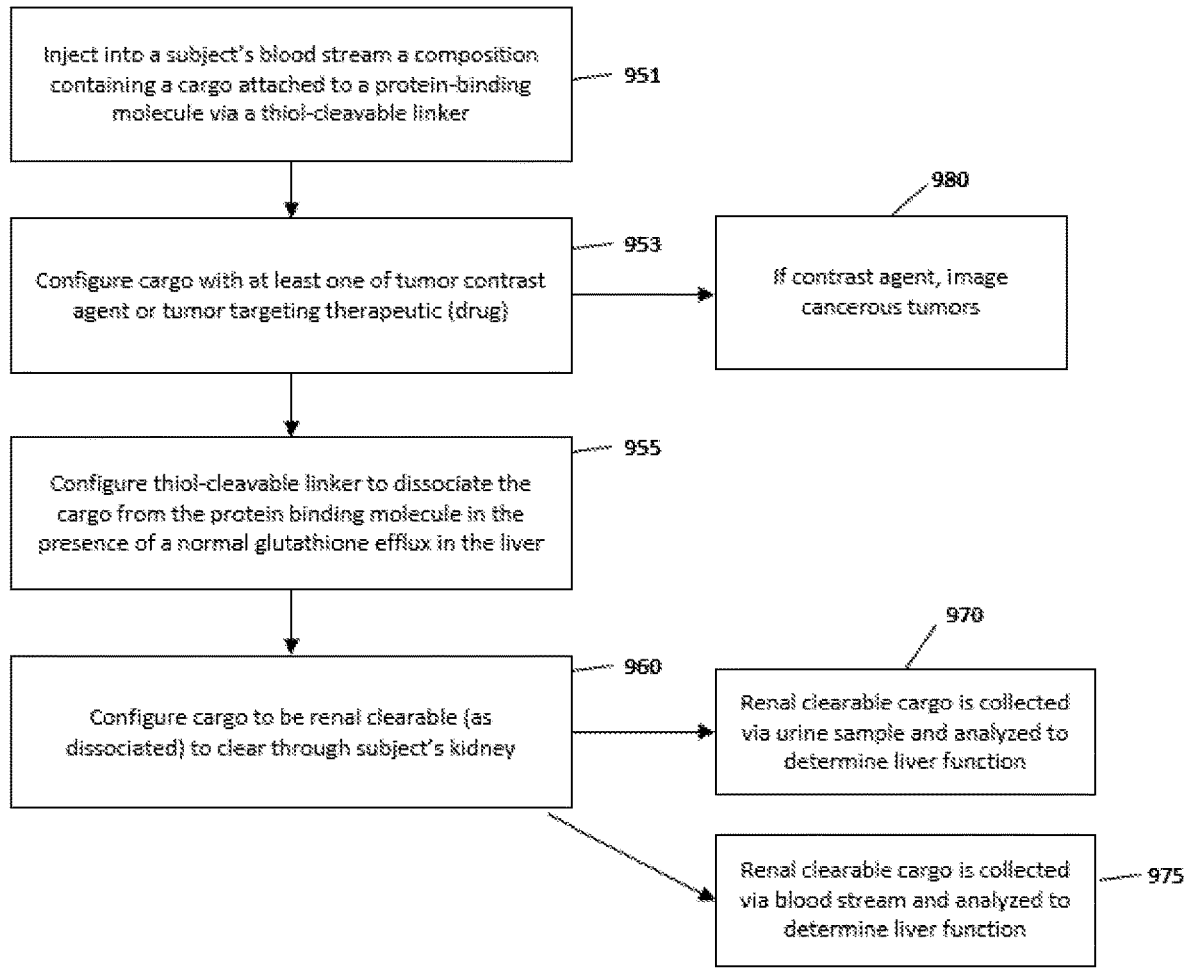

Referring to FIGS. 9A-B, an embodiment of the present disclosure is illustrated as biothiol-activatable composition 900 useful for targeting of tumors for the delivery of a contrast agent or therapeutic (e.g., drug).

Biothiol-activatable composition 900 (FIG. 9A) links a cargo entity 902 with a nontoxic protein-binding molecule 906 via a thiol-cleavable disulfide linker 904. Cargo entity 902 can be a molecule or molecular complex that includes, for example, a contrast agent or a drug. Protein-binding molecule 906 can be, for example ICG, or other molecule with binding affinity to serum protein.

In use, biothiol-activatable composition 900 has the property of being rapidly cleared through kidney filtration after IV injection into a subject's blood stream and dissociation by GSH-mediated biotransformation in the subject's liver as indicated in the steps of method 950 (FIGS. 9A and 9B). At step 951, a concentration of biothiol-activatable composition 900 is injected into a subject's blood stream, for example, with an IV injection, where it binds to serum protein 908 and becomes a concentration of in vivo bioactiavatable composition 910. The effect of serum protein binding is to increase the overall size of the in vivo composition 910 to above the subject's kidney filtration threshold. The size increase prevents rapid renal clearance of cargo 902 and promotes pro-longed blood circulation.

In vivo biothiol-activatable composition 910 comprises three portions: a first portion 914 of in vivo composition 910 is dissociated in the subject's liver; a second portion 913 targets cancerous tumors and binds to them; and, a third portion 915 continues to circulate in the subject's blood stream having a concentration that decreases gradually over time depending upon dissociation and renal clearance rates.

Portion 913, containing non-dissociated biothiol-activatable composition, experiences slows renal clearance and pro-longs blood circulation. According to step 953, cargo 902, of portion 913 of the circulating in vivo composition, is configured to target cancerous tumors for contrast imaging or drug delivery. According to step 955, the thiol-cleavable disulfide linker is configured to dissociate in the presence of glutathione efflux in the subject's liver in a GSH-mediated biotransformation. Portion 914 dissociates into a renal clearable cargo 919 and a biodegradable component 918. According to step 960, the renal clearable cargo 919 clears through the subject's kidney.

Signature of the levels of dissociation and normal levels of GSH in the liver are detectable ex vivo via urine or blood sample analysis. Optionally, at step 970, a urine sample of the subject is analyzed to determine liver function and/or dissociation levels by detecting presence of cargo 919. Optionally, at step 975, a blood sample is collected from the subject and analyzed to determine liver function and/or dissociation levels by detecting presence of cargo 919. At step 970 or at step 975, in a preferred embodiment, a thiol solution is mixed with the urine or blood sample, respectively, and a tested fluorescence signal from the sample is analyzed and compared to base fluorescence signal from a normally functioning liver. If the liver is malfunctioning, then the tested fluorescence signal will be higher than the base fluorescence signal. This is because the rate of dissociation of the biothiol-activatable composition in the malfunctioning liver will decrease and the levels of biothiol-activatable composition in the blood stream and urine will subsequently increase.

Optionally, at step 980, if the cargo includes a contrast agent, cancerous tumors of the subject are imaged, for example, via optical, PET, SPECT, CT or MRI imaging.

Figure 10A:
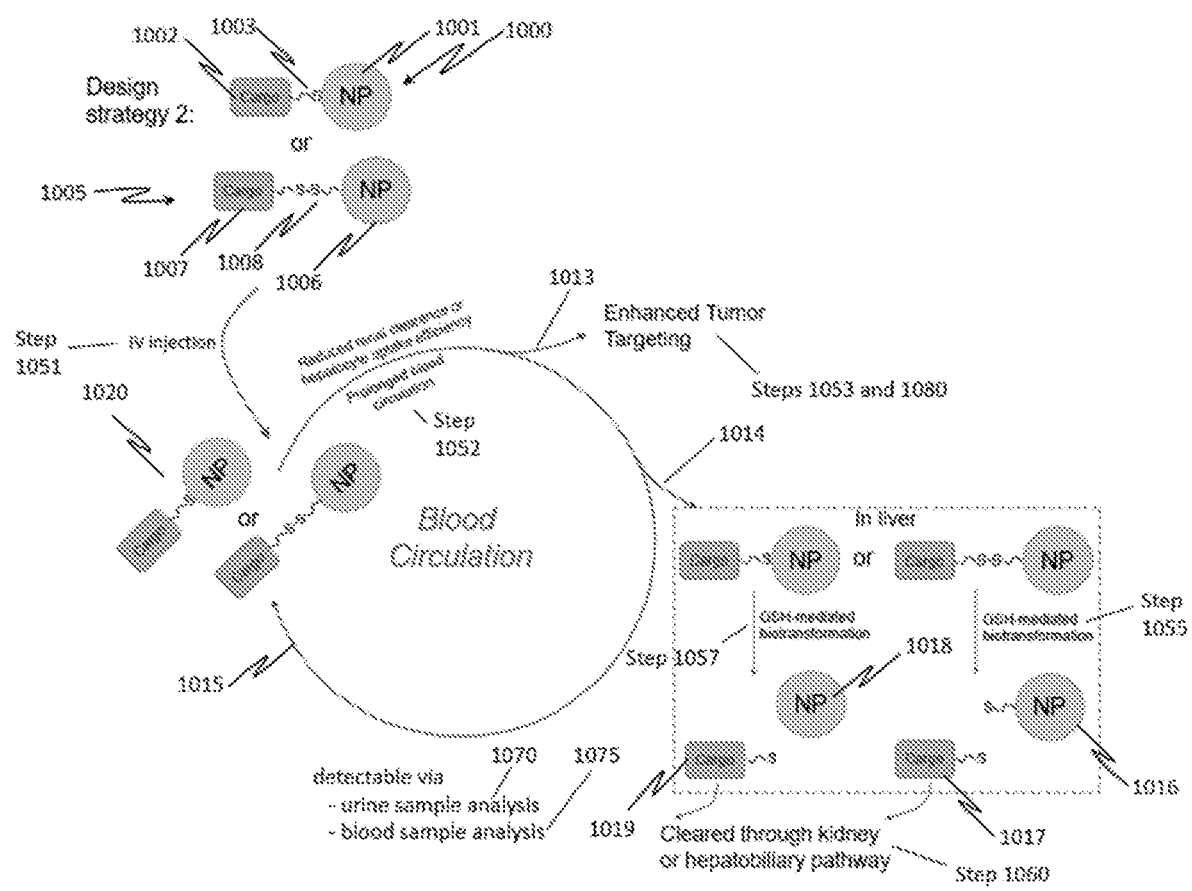
FIG. 10A-B is a schematic of compositions and method for delivery of a diagnostic agent (e.g., contrast agent) or therapeutic agent (e.g., drug) that are rapidly cleared through kidney filtration or hepatobiliary pathway according to an embodiment of the present disclosure.
Figure 10B:
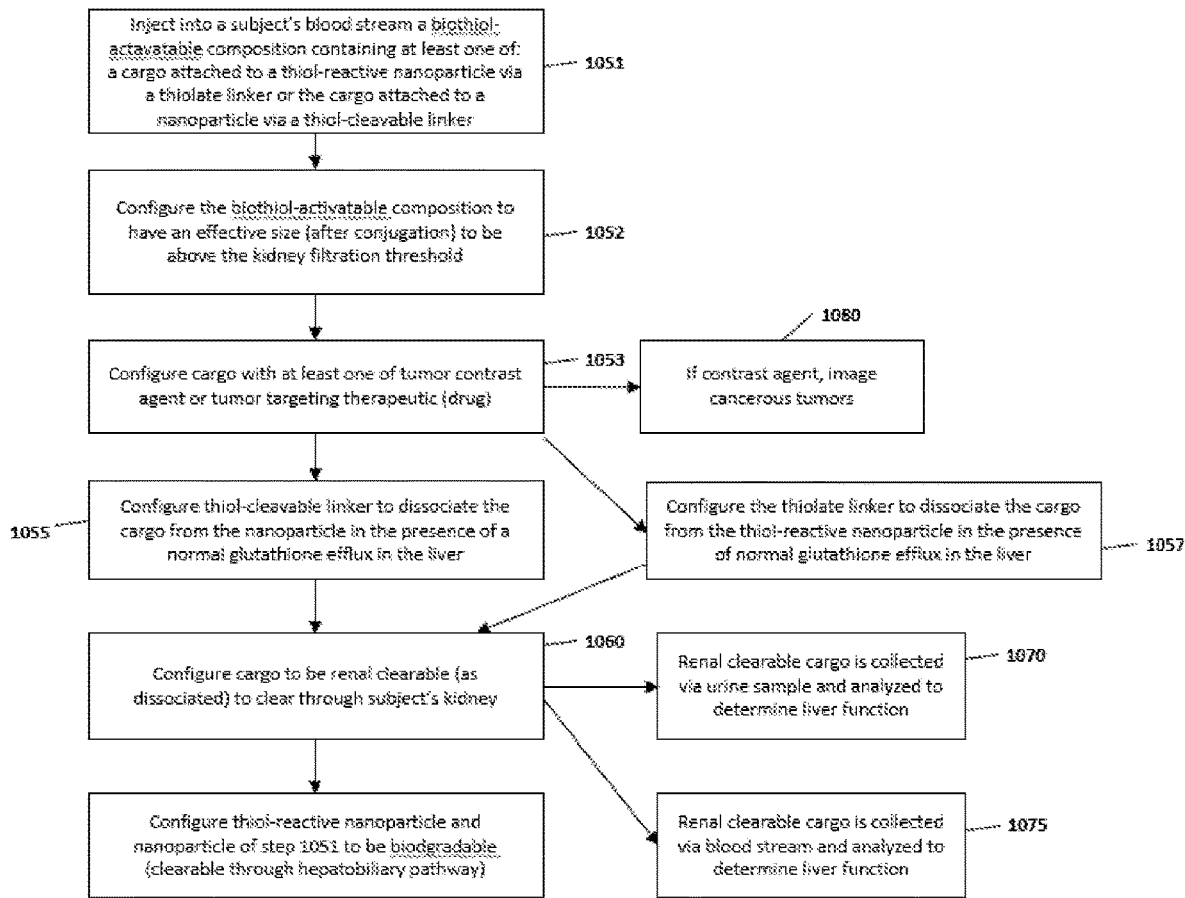

Referring to FIGS. 10A-B, a first embodiment of the present disclosure is illustrated as biothiol-activatable composition 1000 useful for targeting of tumors for the delivery of a contrast agent or therapeutic (e.g., drug).

Biothiol-activatable composition 1000 (FIG. 10A) links a cargo entity 1002 with a thiol-reactive nanoparticle 1001 via a thiolate linker 1003. Cargo entity 1002 can be a molecule or molecular complex that includes, for example, a contrast agent or a drug. Thiolate linker 1003 and thiol-reactive nanoparticle 1001 can be selected as described for composition 700. In a preferred embodiment where the cargo entity is targeted for tumor cells, composition 1000 is selected to have an effective size after conjugation to be above the kidney filtration threshold.

A second embodiment of the present disclosure is illustrated as biothiol-activatable composition 1005 also useful for targeting of tumors for the delivery of a contrast agent or therapeutic (e.g., drug).

Biothiol-activatable composition 1005 (FIG. 10A) links a cargo entity 1007 with a nanoparticle 1006 via a thiol-cleavable linker 1008 including a disulfide bond. Cargo entity 1007 can be a molecule or molecular complex that includes, for example, a contrast agent or a drug. Thiol-cleavable linker 1008 and nanoparticle 1006 can be selected as described for composition 800. In a preferred embodiment where the cargo entity is targeted for tumor cells, composition 1005 is selected to have an effective size after conjugation to be above the kidney filtration threshold.

In use, biothiol-activatable compositions 1000 and 1005 have the property of being rapidly cleared through kidney filtration after IV injection into a subject's blood stream and dissociation by GSH-mediated biotransformation in the subject's liver as indicated in the steps of method 1050 (FIGS. 10A and 10B). At step 1051, a concentration of either biothiol-activatable composition 1000 or 1005 is injected into a subject's blood stream, for example, with an IV injection and becomes a concentration of in vivo bioactiavatable composition 1020. At step 1052, the biothiol-activatable composition is designed to have an effective size after conjugation to be above the kidney filtration threshold so as to reduce renal clearance or hepatocyte uptake efficiency thereby prolonging blood circulation.

In vivo biothiol-activatable composition 1020 comprises three portions: a first portion 1014 of in vivo composition 102010 is dissociated in the subject's liver; a second portion 1013 targets cancerous tumors and binds to them; and, a third portion 1015 continues to circulate in the subject's blood stream having a concentration that decreases gradually over time depending upon dissociation and renal clearance rates.

Portion 1013, containing non-dissociated biothiol-activatable composition, experiences slows renal clearance and pro-longs blood circulation. According to step 1053, the cargo entity, of portion 1013 of the circulating in vivo composition, is configured to target cancerous tumors for contrast imaging or drug delivery.

According to step 1055, the thiol-cleavable di-sulfide linker is configured to dissociate in the presence of glutathione efflux in the subject's liver in a GSH-mediated biotransformation. According to the path of step 1055, portion 1014 dissociates into a renal clearable cargo 1017 and a biodegradable component 1016.

Alternatively, according to step 1057, the thiolate linker is configured to dissociate in the presence of glutathione efflux in the subject's liver in a GSH-mediated biotransformation. According to the path of step 1057, portion 1014 dissociates into a renal clearable cargo 1019 and a biodegradable component 1018.

According to step 1060, the renal clearable cargo 1017 (or 1019) clears through the subject's kidney. Signature of the levels of dissociation and normal levels of GSH in the liver are detectable ex vivo via urine or blood sample analysis. Optionally, at step 1070, a urine sample of the subject is analyzed to determine liver function and/or dissociation levels by detecting presence of cargo 1017 (or 1019). Optionally, at step 1075, a blood sample is collected from the subject and analyzed to determine liver function and/or dissociation levels by detecting presence of cargo 1017 (or 1019). At step 1070 or at step 1075, in a preferred embodiment, a thiol solution is mixed with the urine or blood sample, respectively, and a tested fluorescence signal from the sample is analyzed and compared to base fluorescence signal from a normally functioning liver. If the liver is malfunctioning, then the tested fluorescence signal will be higher than the base fluorescence signal. This is because the rate of dissociation of the biothiol-activatable composition in the malfunctioning liver will decrease and the levels of biothiol-activatable composition in the blood stream and urine will subsequently increase.

Optionally, at step 1080, if the cargo entity includes a contrast agent, cancerous tumors of the subject can be imaged, for example, via optical, PET, SPECT, CT or MRI imaging.

Biodegradable components 918, 1016 and 1018 are clearable through hepatobiliary pathway wherein substances (nanoparticles, small molecules, etc.) are taken up by the hepatocytes in liver and then excreted from the hepatocytes into the bile ducts, which eventually drain into the small intestine and clear out through feces.

Figure 11:
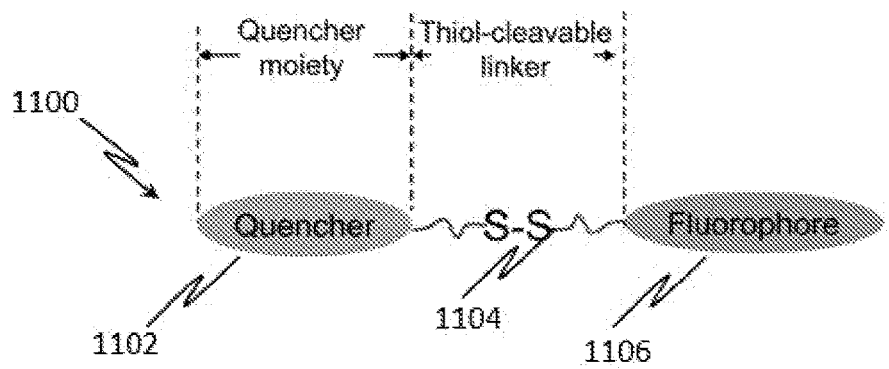
FIG. 11 is a schematic of a composition for liver function detection according to a further embodiment of the present disclosure. The composition comprises a thiol-cleavable linker with one end linked to a quencher and the other end linked to a fluorophore so that the emission of the fluorophore can be quenched by the quencher. The quencher can be but is not limited to an organic molecule, a metal complex or a nanoparticle. The thiol-cleavable linker includes but is not limited to small disulfide molecules and peptides (oxidized glutathione, cystine, cystamine, etc.) as well as disulfide polymer linkers (PEG-s-s-PEG, etc.). The fluorophore may be but is not limited to ICG, IRDye 800CW, 800CW-1, Cy7.5, Cy7, Alexa Fluor 750 and other light-emitting molecules suitable for bioimaging.

Referring to FIG. 11, an embodiment of the present disclosure is illustrated as composition 1100 useful for liver function detection in vivo. Composition 1100 comprises a quencher moiety 1102 attached to a fluorophore molecule 1106 via a thiol-cleavable linker 1104. Quencher moiety 1102 may be selected from organic molecules, metal complexes and nanoparticles such as metal-containing nanoparticles, semiconductor quantum dots, MoS nanoparticles, graphene nanoparticles and carbon nanostructures. Thiol-cleavable linker 1104 may be selected, for example, from small disulfide molecules, peptides and disulfide polymer linkers. Example disulfide molecules and peptides include (but should not be limited to) oxidized glutathione, cystine and cysteamine Disulfide polymer linkers such as PEG-s-s-PEG are appropriate for composition 1100. Examples of fluorophore 1106 useful for the embodiment include ICG, IRDye 800CW, 800CW-1, Cy7.5, Cy7 and Alexa Fluor 750 and other light emitting molecules suitable for bioimaging. Quencher moiety 1102 and fluorophore 1106 are selected so that fluorescence from fluorophore 1106 is quenched when attached to quencher moiety 1102. When not attached to the quencher moiety, the fluorophore exhibits fluorescence.

Regarding how the determination of the liver glutathione efflux function is accomplished in greater detail, a molecular complex such as the composition 700, 800 or 1100 is introduced into a living subject's blood stream. Then a blood sample or a urine sample is collected. In general, the method utilizes a measurement of the blood or urine sample to determine of the ratio of nanoparticle/reporter (quencher/fluorophore). If the ratio is above a certain number, it indicates the liver glutathione efflux function is damaged. If it is below or the same as a certain number, it means the liver function is normal.

Thiol molecules are first added into the blood or urine sample to release organic dyes from the nanoparticle surface. If the reporter (fluorophore) is an organic dye, a fluorescence spectrometer is used to measure fluorescence intensity. If the nanoparticle (quencher) is an inorganic nanoparticle such as a gold nanoparticle, an ICP-mass spectrometer is used to measure the amount of gold in the sample which is converted into a measured number of gold nanoparticles. The fluorescence intensity gives a measure of the number of free reporters (free fluorophores) so that ultimately, the number of attached reporters per nanoparticle is calculated (or fluorophores per quencher). If the number of attached reporters per nanoparticle (fluorophores per quencher) is above a certain number, then the liver glutathione efflux function is damaged. In clinical practice, since the ratio (quencher/fluorophore or nanoparticle/reporter) is pre-determined and standardized for normal livers, the fluorescence intensity per unit mass, can simply be used to determine liver glutathione efflux function.

II. Examples

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1

In a preferred embodiment of the present disclosure, a specific "smart" nanoprobe, $ICG_4$-GS-Au25, is constructed by conjugating indocyanine green (ICG), a clinically used serum protein-binding and NIR-emitting fluorophore, onto a renal-clearable glutathione coated Au25 nanocluster, GS-Au25 ($Au_{25}(SG)_{18}$), that can escape MPS uptake, clear out of the body through the kidneys and be recovered from the urine (Du et al., 2017; 2018). Conjugation of ICG onto GS-Au25 resulted in the binding of GS-Au25 to serum proteins and quenching of ICG emission, which, however, can be reactivated by small-molecule thiols at high concentrations in native physiological environment. After intravenous injection of this specific nanoprobe, $ICG_4$-GS-Au25 was transported to the liver sinusoids, where ICG was released from the particle surface and the activated ICG fluorescence allowed us to in situ monitor the biotransformation kinetics of $ICG_4$-GS-Au25. Interestingly, serum protein-bound and non-renal clearable $ICG_4$-GS-Au25 became renal clearable as ICG-GS was gradually displaced by not only glutathione but also cysteine derived from sinusoidal glutathione efflux (FIG. 1B). Moreover, because of this glutathione-mediated biotransformation, the clearance pathways of ICG and GS-Au25 were not sacrificed after conjugation while tumor targeting and retention of ICG were greatly enhanced for ~30 and 80 times, respectively: ICG-based tumor imaging contrast index (CI) was increased from 1.8 to 7.6 and imaging window reached 2 weeks with CI above 2.5. The glutathione-mediated biotransformation is not limited to Au25 cluster but also observed from larger AuNPs ranging from 5 nm to 100 nm even though the biotransformation rate was exponentially decreased with the increase in size. On the other hand, the inventors found that renal clearance of 100 nm nanoparticles and tumor targeting of small molecule drugs can be enhanced with this glutathione-mediated biotransformation strategy as long as they are designed to efficiently react with glutathione or cysteine in liver. These findings clearly demonstrate that glutathione-mediated biotransformation in the liver offers a new pathway to modulate in vivo transport and nano-bio interactions of many nanomedicines, turning liver detoxification, a long-standing barrier, into a bridge to expedite clinical translation of nanomedicines.

Design and synthesis of ICG-GS-Au25 nanoprobes for in vivo detection of glutathione efflux at high specificity. GS-Au25 nanoclusters were chosen as model because they are well-defined and their ultrasmall particle size allows them to be rapidly filtered out through kidneys (Du et al., 2017). In addition, gold nanoparticles are thiol (e.g., glutathione) reactive due to the strong Au—S bonding. However, since GS-Au25 nanoclusters have little affinity to serum proteins and minimal accumulation in the liver (Du et al., 2018), in order to enhance their hepatic delivery, NIR-emitting ICG was conjugated onto the GS-Au25 because ICG has very high affinity to serum proteins and is rapidly transported to the liver and taken up by hepatocytes rather than by liver MPS cells (Shinohara et al., 1996). Thus, conjugation of ICG onto GS-Au25 nanoclusters enhances their transport to the liver while minimizing the liver MPS uptake. Moreover, strong distance-dependent photoinduced electron transfer between ICG and Au25 could enable facile monitoring of thiol conjugation in vivo: once ICG is on the particle surface, ICG NIR emission is completely quenched; whereas once ICG is released from the particle surface, the NIR emission is fully recovered (FIG. 2B).

Figure 15:
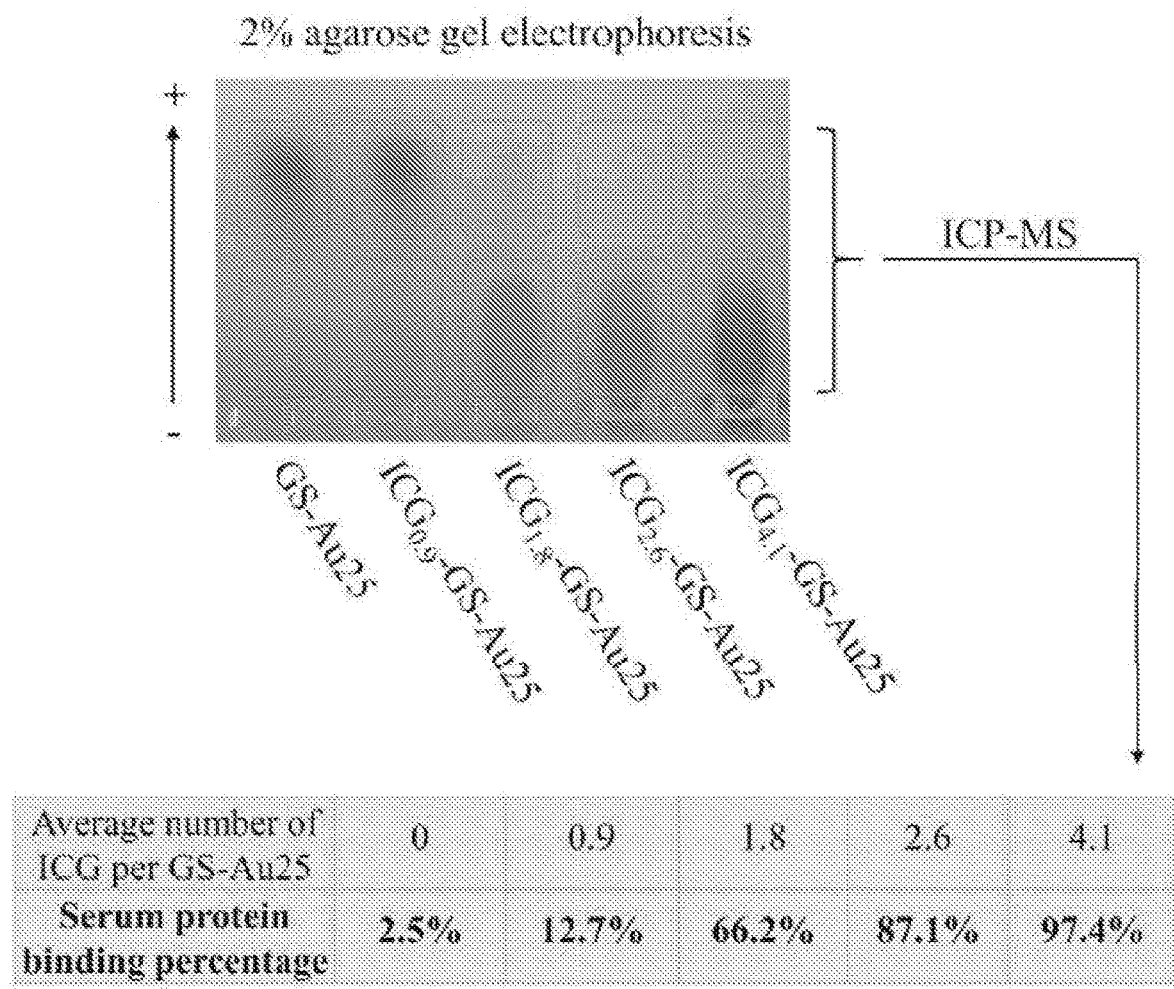
FIG. 15. Serum protein binding profiles of GS-Au25 conjugated with different numbers of ICG molecules. Serum protein binding percentage of each species was quantified by ICP-MS analysis of the Au content in corresponding gel bands (as circled by the dotted line).

Using EDC coupling reaction, ICG was successfully conjugated onto the Au25 and the average number of ICG on the particle surface can be tuned from ~1 to ~4 by changing the ratio of ICG to Au25 in the reactions. As shown in FIG. 2B, with the increase of the number of ICG on particle surface, the characteristic absorption of ICG is blue shifted from 795 nm to 710 nm due to dipole-dipole coupling of multiple ICG on the same particle (Sun et al., 2016). While the absorption of ICG is strongly dependent of the number of ICG on the particle surface, ICG emission was completely quenched regardless of the number of ICG on the Au25 (FIG. 2C), indicating efficient electron transfer between ICG and Au25. However, this efficient electron transfer process was disrupted as soon as ICG was detached from Au25, resulting in an instantaneous "turn-on" of ICG fluorescence (FIG. 2D). Gel electrophoresis studies show that serum protein binding of ICG-GS-Au25 also depends on the number of ICG on particle surface. For GS-Au25 with ~1 ICG, it has low serum protein adsorption efficiency (~13% bound to serum protein). However, the serum protein binding affinity of ICG-GS-Au25 increases rapidly when more than one ICG molecules are presented on Au25 surface, with a protein adsorption efficiency of ~97% for GS-Au25 conjugated with ~4 ICG molecules (FIG. 2E and FIG. 15). GS-Au25 conjugated with ~4 ICG ($ICG_4$-GS-Au25) is therefore chosen as a preferred embodiment because of its high affinity to serum proteins.

It should be understood, that the number of conjugated ICG molecules per nanoparticle can vary between constituent nanoparticles and that the preferred embodiment is a tight average of 4 ICG molecules per nanoparticle. It should be further understood that the disclosure is not be limited to an average of 4 ICG molecules per nanoparticle: any average number of ICG molecules per nanoparticle between 1 and 4 may be used in practice.

Figure 16:
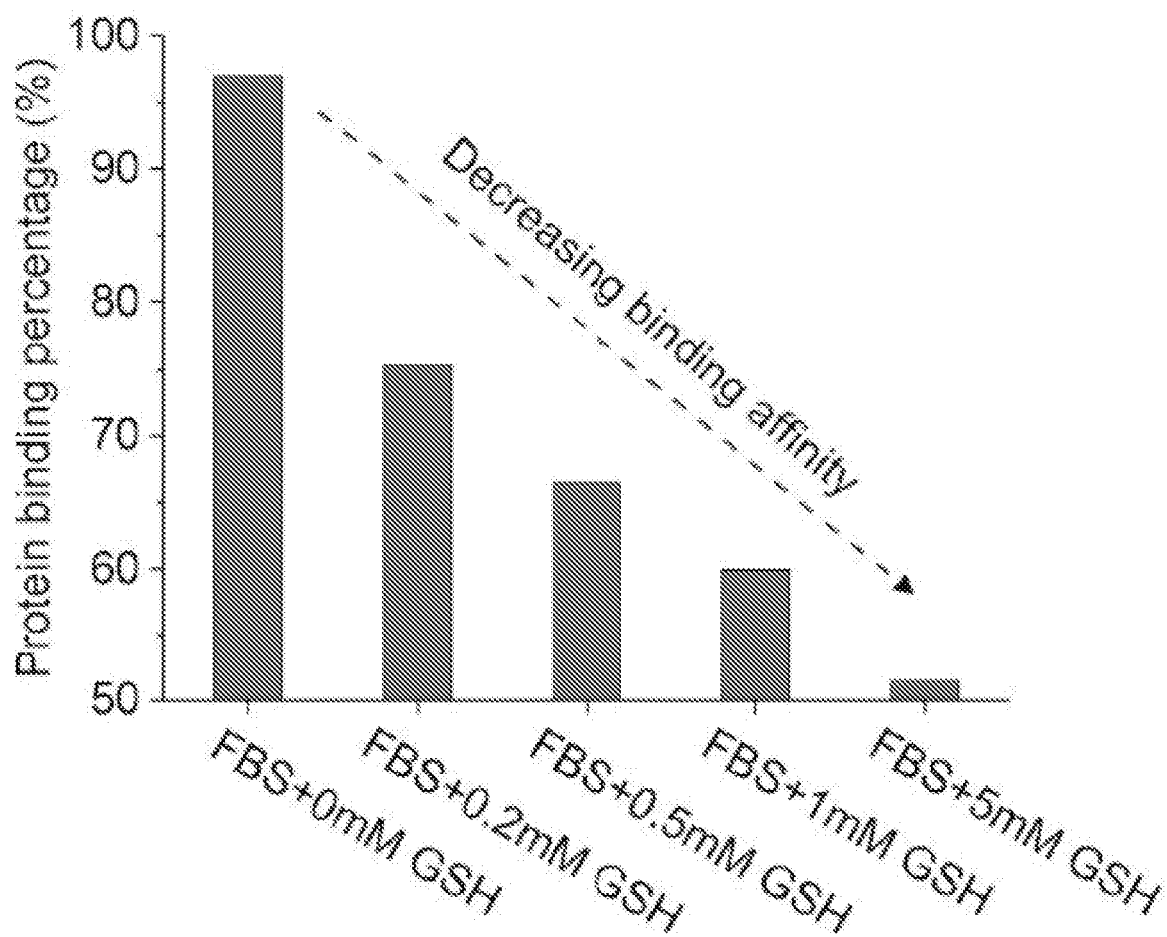
FIG. 16. Serum protein binding profiles of ICG4-GS-Au25 in various concentrations of GSH. ICG4-GS-Au25 was mixed with FBS first and then added into PBS solutions containing different concentrations of GSH (pH=7.4). After 5 min incubation at 37° C., protein binding and non-binding portions were separated by gel electrophoresis and quantified by ICP-MS.

The "turn-on" fluorescence of $ICG_4$-GS-Au25 was glutathione-concentration dependent. As shown in FIG. 2F, the threshold glutathione concentration for activating ICG emission on the Au25 is around 2 mM in phosphate buffered saline (PBS). Interestingly, in the presence of serum protein, the threshold concentration is lowered to around 0.2 mM. The one-order decrease of glutathione-threshold concentration is fundamentally due to the binding of $ICG_4$-GS-Au25 to serum protein, which likely weakened Au—S bond strength, making ICG-GS more easily to be released from the surface of Au25. Consistent with the observed glutathione dependent NIR emission in the presence of serum protein, the binding of $ICG_4$-GS-Au25 to serum protein was also affected by glutathione conjugation. After incubating $ICG_4$-GS-Au25 with glutathione of different concentrations, their affinity to serum protein was significantly reduced as the number of ICG on the particle surface was gradually decreased due to the ligand displacement (FIG. 16). These results clearly indicate that interaction of $ICG_4$-GS-Au25 with serum protein strongly depends on local glutathione concentration and glutathione conjugation can be in situ monitored through the "turn-on" of ICG fluorescence.

Clearance pathways of $ICG_4$-GS-Au25. While GS-Au25 was rapidly eliminated out of the body through the urinary system with an efficiency of ~65% ID at 30 min p.i., only ~33% ID of gold was found in the urine in the same period of time for $ICG_4$-GS-Au25 (FIG. 3A). However, the gold amount cleared into the urine for $ICG_4$-GS-Au25 increased by 73% at 24 hr p.i. (~57% ID), becoming more comparable to that of GS-Au25 (~71% ID at 24 hr p.i.), which only increased by 9% from 30 min to 24 hr p.i. The dramatic decrease of the renal clearance efficiency in the early elimination phase is fundamentally because that serum protein binding of $ICG_4$-GS-Au25 significantly increased its hydrodynamic diameter (HD) from ~3.4 nm (in PBS) to ~8.2 nm (in BSA) in vivo without inducing aggregation (FIGS. 17A-B), which is above the kidney filtration threshold (~6 nm) (Choi et al., 2007). As a result, $ICG_4$-GS-Au25 was no longer immediately eliminated through the kidneys but had longer blood retention over GS-Au25. As shown in FIG. 3B, the 24 hr blood retention (AUC: ~96.7 h×% ID/g) and clearance (CL: ~1.0 mL/h) of $ICG_4$-GS-Au25 were nearly 2 times longer and 2 times slower than those (~49.3 h×% ID/g, ~2.0 mL/h) of GS-Au25, respectively. Serum protein binding not only prevented GS-Au25 from rapid renal clearance and prolonged its blood retention but also enhanced its transport to the liver. Biodistribution studies showed the liver accumulation of $ICG_4$-GS-Au25 is ~7% ID/g, nearly 20 times higher than that of GS-Au25 (~0.35% ID/g) at 1 h p.i. However, after 24 hours. the liver accumulation of Au25 dropped to ~4% ID/g, only 6 times higher than that (~0.65% ID/g) of non-conjugated GS-Au25 at 24 hr p.i. (FIGS. 18A-C). Long-term studies revealed $ICG_4$-GS-Au25 accumulation in liver and other major organs continued to decrease over time, suggesting it can eventually clear out of the body (FIGS. 19A-B). These kidney and liver clearance kinetics are distinct from those of engineered nanoparticles that go through liver MPS-mediated detoxification, which accumulate predominantly and persistently in the liver (Balasubramanian et al., 2010; Dreaden et al., 2012; Hirn et al., 2011). While Au25 nanoclusters were eliminated mainly through the urinary system, ICG cleared primarily via the hepatobiliary system with ~60% ID in feces at 24 hr p.i. (FIG. 3C). This unique bi-pathway clearance of $ICG_4$-GS-Au25 implied that $ICG_4$-GS-Au25 were dissociated in the body.

Hepatic glutathione-mediated biotransformation of $ICG_4$-GS-Au25. To further unravel the bi-pathway clearance mechanism of $ICG_4$-GS-Au25, the inventors investigated the nano-bio interactions of $ICG_4$-GS-Au25 in vivo by non-invasively monitoring the time-dependent ICG fluorescence signals after systemic administration. While $ICG_4$-GS-Au25 is almost non-luminescent during the extra-hepatic blood circulation, strong ICG NIR emission was immediately observed from the liver region after intravenous injection of the particles (FIGS. 20A-B). Based on the in vitro studies, the significantly enhanced fluorescence signals indicate ICG was quickly dissociated from Au25 after entering liver, which was likely induced by sinusoidal glutathione. To further confirm the pivotal role of glutathione efflux in the in vivo dissociation of ICG from Au25, the inventors pretreated BALB/c mice with diethyl maleate (DEM), a widely adopted GSH-selective depletion agent, to temporarily inhibit GSH efflux in the liver (Ookhtens et al., 1985; Plummer et al., 1981). The effectiveness of DEM was confirmed by the rapid drop in plasma GSH level following intraperitoneal administration. A single injection of DEM decreased plasma GSH level down to ~12% of the initial value (~30 μM) and maintained this low GSH level for ~2-3 hr before the gradual recovery of plasma GSH (FIGS. 21A-B), consistent with prior literature reports (Adams et al., 1983; Weber et al., 1990).

While DEM treatment did not significantly affect the liver uptake of ICG (FIGS. 22A-B), the ICG emission signals from the liver were dramatically reduced in DEM-treated mice compared to that of PBS-treated mice injected with the same $ICG_4$-GS-Au25, as shown in FIG. 3D. Quantitative comparison of the liver fluorescence kinetics in the initial 5 min revealed that inhibition of glutathione efflux with DEM slowed down the $ICG_4$-GS-Au25 dissociation kinetics for more than 5 times ($k_{PBS}/k_{DEM}$=5.2±0.3) (FIG. 3E). In agreement with the in vivo fluorescence imaging studies, analysis of the circulating $ICG_4$-GS-Au25 in DEM-treated mice indicated that the ICG dissociation half-life was ~7 times longer than that in PBS-treated mice (142.8±14.6 min vs 19.6±2.4 min) (FIG. 3F). The significant reduction of ICG releasing rate in DEM-treated mice dramatically increased the blood retention of Au25 and slowed down its renal clearance as compared to that in PBS-treated mice (FIG. 3G). Moreover, depletion of liver macrophage by clodronate liposomes did not affect the dissociation of $ICG_4$-GS-Au25 in vivo, indicating that liver MPS uptake was not involved in the observed dissociation (FIGS. 23A-B). The distribution and clearance of $ICG_4$-GS-Au25 in liver sinusoids were further investigated by fluorescent immunohistochemistry.

As shown in FIG. 3H, ICG fluorescence mainly accumulated in hepatocytes at 10 min p.i., indicating that the dissociated ICG-GS moieties were quickly taken up by the hepatocytes. At 24 hr p.i., ICG fluorescence signals in hepatocytes almost completely disappeared, consistent with the observed efficient hepatobiliary clearance of ICG after dissociation. These results further confirm that glutathione mediated the dissociation of $ICG_4$-GS-Au25 in liver sinusoids and hepatobiliary route was the major clearance pathway for the dissociated ICG-GS.

To gain more insights into the $ICG_4$-GS-Au25 nano-bio interactions in vivo, the Au nanoclusters in the urine were extracted and characterized by UV/Vis spectroscopy (FIG. 3I). The absorption spectrum of Au nanoclusters in the urine of PBS-treated mice was almost identical to that of GS-Au25 and negligible ICG absorption was observed, indicating that ICG was completely removed before Au25 reached the urine and the Au25 structure remained intact after in vivo biotransformation. In contrast, Au nanoclusters excreted by DEM-treated mice exhibited an evident ICG absorption peak in addition to Au25 absorption even though the average number of ICG per Au25 is only ~0.5, which further validated the important role of hepatic glutathione efflux in the in vivo dissociation of ICG from Au25 nanoclusters and their renal clearance as well. Combination of all the results suggests that glutathione mediated detoxification in the liver has a significant impact on in vivo transport of $ICG_4$-GS-Au25 by inducing dissociation of ICG from Au25, which in turn reduced serum protein binding and increased renal clearance of Au25 in its later elimination stage.

Cysteine involved in hepatic glutathione-mediated biotransformation of $ICG_4$-GS-Au25. While glutathione-mediated biotransformation in liver sinusoids undoubtedly plays a key role in modulating in vivo transport of $ICG_4$-GS-Au25, similar to its function in enhancing the elimination of small xenobiotics, whether other biothiols are involved in the displacement deserves thorough investigation. Since Au25 can escape MPS uptake, be eliminated through the kidneys and recovered from the urine, the inventors further analyzed the surface chemistries of excreted Au25 in the urine. To obtain surface ligands that were bound to Au25 after circulation, the inventors used a hydrophobic ligand, 2-phenylethanethiol (PET) to displace those hydrophilic ligands on the surface of Au25 with a two-phase ligand-exchange reaction (FIG. 4A). The obtained surface ligands in aqueous phase were then fluorescently labeled with N-(1-pyrenyl)maleimide (NPM) and analyzed by high-performance liquid chromatography (HPLC) according to the established method (Winters et al., 1995; Parmentier et al., 1998). Surprisingly, as shown in FIG. 4B, more than half of the original ligands were replaced by cysteine (Cys, ~42%) and cysteinylglycine (Gly-Cys, ~17%) rather than just glutathione, suggesting that not only glutathione but also cysteine and cysteinylglycine were involved in the biotransformation of $ICG_4$-GS-Au25 in vivo. Since GSH exported from hepatocytes is known to readily reduce the abundant extracellular (plasma) cystine (~200 μM) to cysteine through a thiol-disulfide exchange reaction (Jocelyn, 1967; Wu et al., 2004): GSH+Cystine⇔Cys-SG+Cysteine, the locally generated high concentration of cysteine was also very likely involved in the displacement. Indeed, incubating GSH and cystine at 1:1 molar ratio in PBS (pH 7.4, 37° C.) for just 5 min resulted in the rapid conversion of ~60% cystine to cysteine (FIGS. 27A-B), which in turn could displace ICG-GS from the surface of Au25. To further quantitatively verify the significance of sinusoidal cysteine in modifying nanoparticle surface, the inventors compared the surface ligands of the well-defined $Au_{25}(SG)_{18}$ after 10 min in vivo circulation and 10 min in vitro incubation with freshly acquired blood. Taking advantage of the defined chemical formula of $Au_{25}(SG)_{18}$, the inventors found that the average number of cysteine ligand per Au25 is ~1.3 after in vivo circulation, 6.5-fold more than that (~0.2) of Au25 clusters incubated in in vitro blood, further proving that locally high concentration of cysteine generated through the glutathione-cystine reaction in liver sinusoids was also responsible for the ICG-GS displacement (FIG. 4C). The primary role of sinusoidal glutathione and cysteine in biotransforming surface chemistry of Au25 in vivo was further verified using the inventors' previously developed polyethylene glycol (PEG) coated AuNPs as probes (FIGS. 28A-B), where both glutathione and cysteine were observed on the particle surface at a molar ratio of 1:3 after 10 min in vivo circulation. While cysteinylglycine was also observed from Au25 in the urine, the absence of cysteinylglycine ligand on $Au_{25}(SG)_{18}$ obtained in the plasma indicated that cysteinylglycine ligand was not conjugated onto the particles in the liver or during the blood circulation. Since cysteinylglycine is extensively generated from the enzymatic (γ-glutamyltransferase, GGT) degradation of GSH within kidney proximal tubules (Tate and Meister, 1981; Paolocchi et al., 2003), the small percentage of cysteinylglycine observed on the Au25 surface is likely because that cysteinylglycine in the proximal tubules reacted with the Au25 clusters after they were filtered through the glomeruli. To validate it, kidney slides (10 min p.i.) were prepared from $ICG_4$-GS-Au25 injected BALB/c mice and imaged using fluorescence microscope (FIG. 4D). The ICG fluorescence "turn-on" also occurred predominantly at the brush-border of kidney proximal tubules, where the highest GGT level in kidney is presented (Hanigan and Pitot, 1985), while the glomeruli, where blood filtration takes place, remain to be relatively dark. These results further indicate that the liver detoxified ICG-GS-Au25 nanoclusters (with reduced number of ICG on Au25 and no longer bind to serum protein) were filtered through glomeruli but underwent additional ligand displacement by cysteinylglycine in the lumen of kidney proximal tubule, where the remaining ICG was further removed from Au25.

Figure 31:
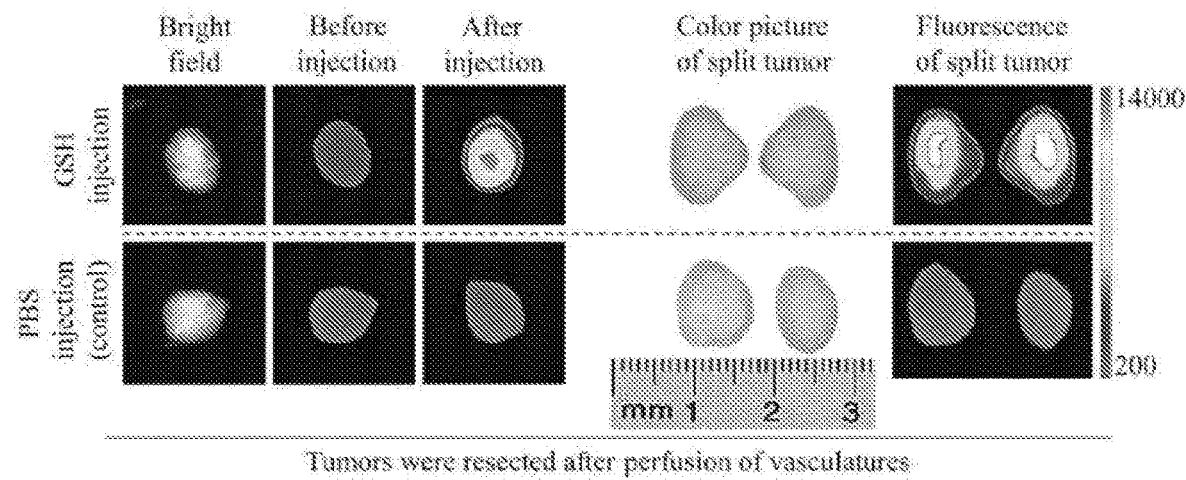
FIG. 31. Intratumoral injection of GSH to release ICG from Au25 in tumor microenvironment. At 15 mM post-intravenous injection of ICG4-GS-Au25, mice were sacrificed and thoroughly perfused with PBS to remove blood from vasculatures before the resection of tumors. Intratumoral injection of 10 mM GSH (pH adjusted to 7.4) could instantaneously light up the tumor by displacing ICG-GS from Au25 in tumor microenvironment whereas intra tumor injection of PBS as the control cannot increase the ICG fluorescence in tumor. The fluorescence images of the split tumor (cut from the center into two pieces) show that ICG-Au25 conjugates had excellent tumor permeability and could infiltrate into tumor core rapidly after systemic administration.
Figure 32:
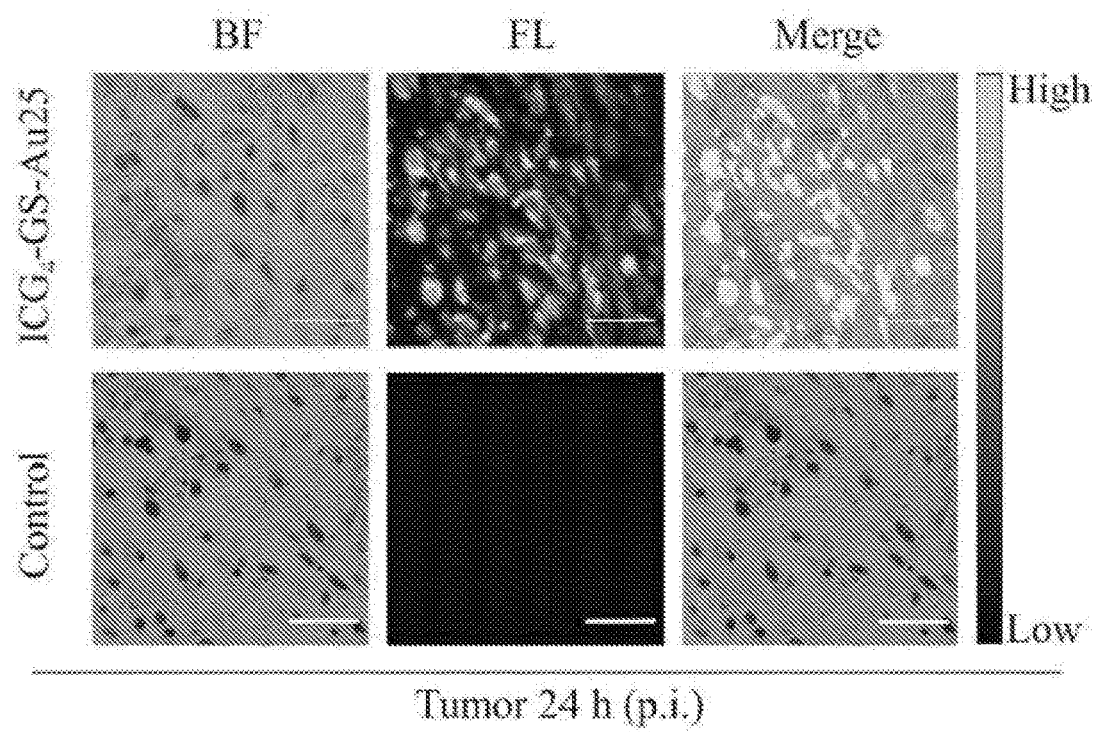
FIG. 32. Additional fluorescence image of tumor tissue from ICG4-GS-Au25 injected mice and the control. Control images are from mice injected with PBS. Scale bar, 20 μm.
Figure 33:
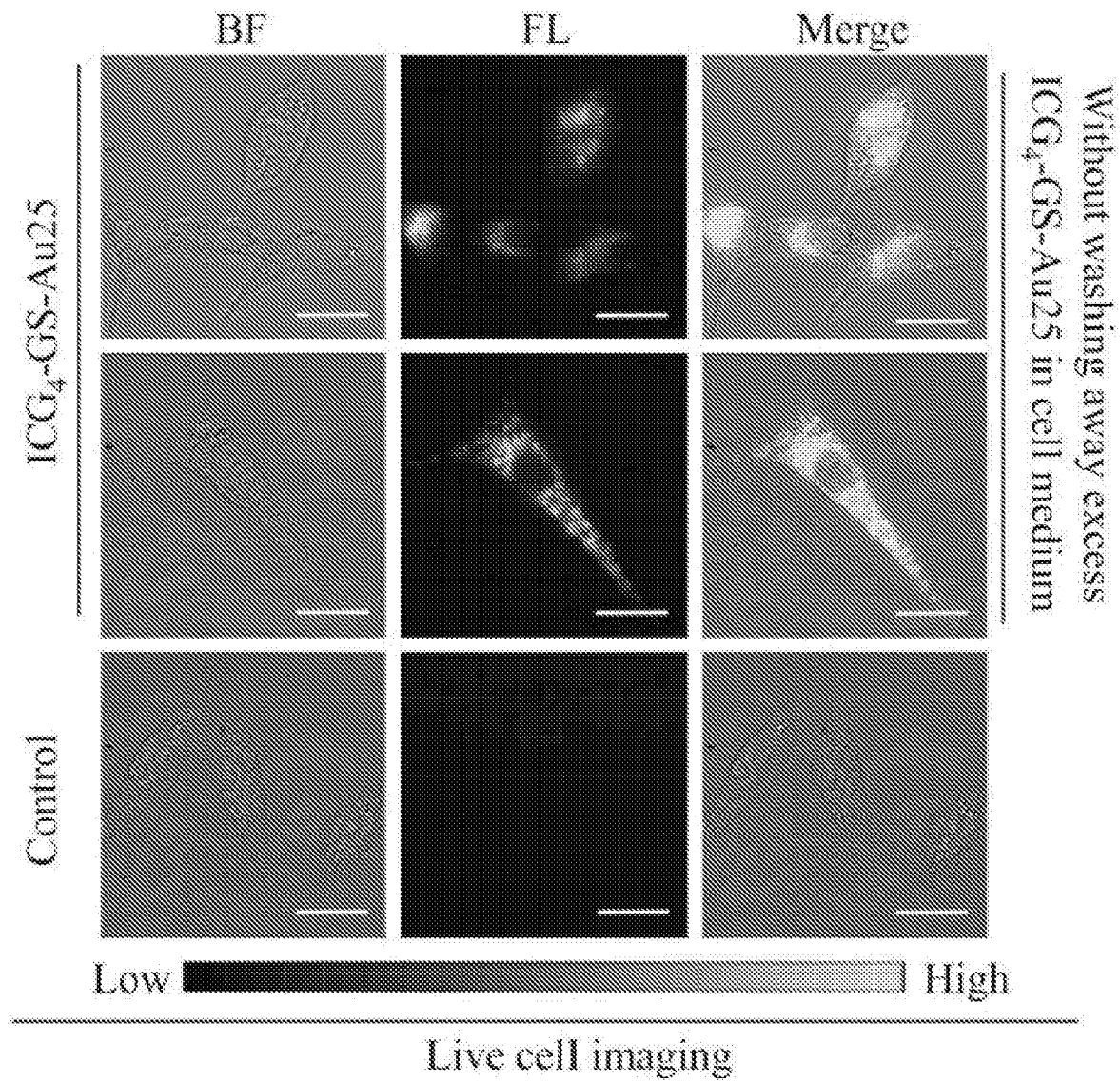
FIG. 33. In vitro tumor cell uptake of 1CG4-GS-Au25. ICG4-GS-Au25 was efficiently endocytosed by MCF-7 cells after 12 hr incubation and located in endosome-like membrane-bound compartments inside cells, similar to that observed in in vivo tumor tissue slides. While ICG4-GS-Au25 was non-fluorescent in cell culture medium, bright ICG fluorescence was observed once ICG4-GS-Au25 entered tumor cells, suggesting that ICG dissociated from Au25 inside tumor cells, very likely due to the high concentration of intracellular GSH. Scale bar, 20 μm.
Figure 34:
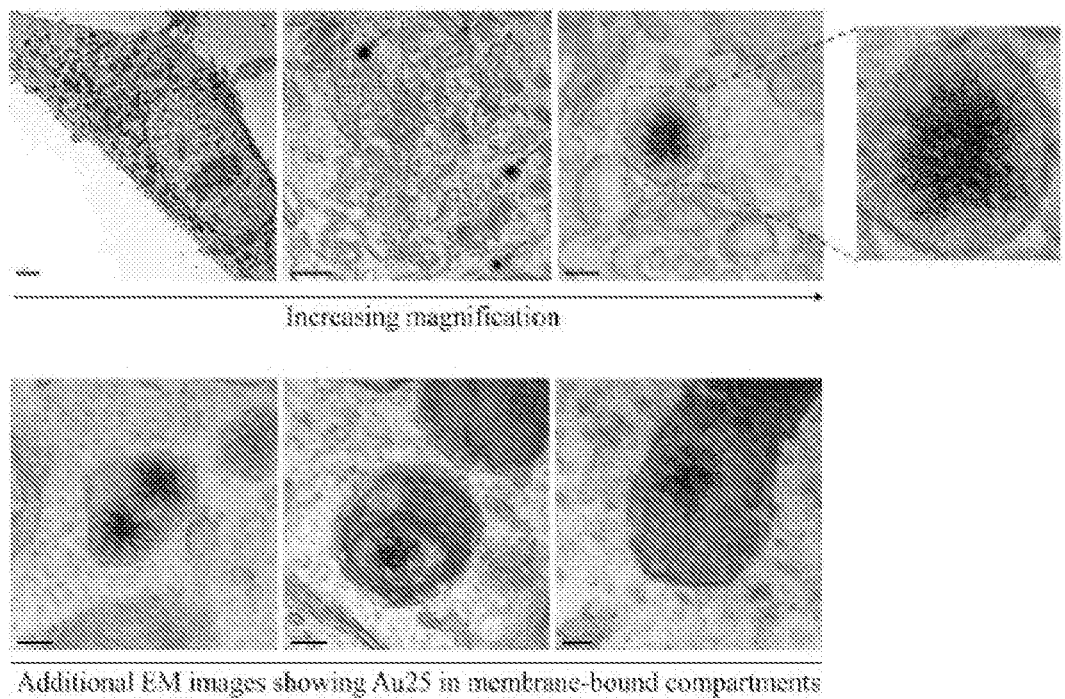
FIG. 34. Electron microscope images of in vitro tumor cell uptake of 1CG4-GS-Au25. MCF-7 tumor cells were incubated with 1 M ICG4-GS-Au25 in cell culture medium for 12 hr before being fixed and embedded. AuNPs (indicated by red arrows) were taken up by the tumor cells and located in membrane-bound cellular compartments, in agreement with the fluorescence cell imaging result.
Figure 35:
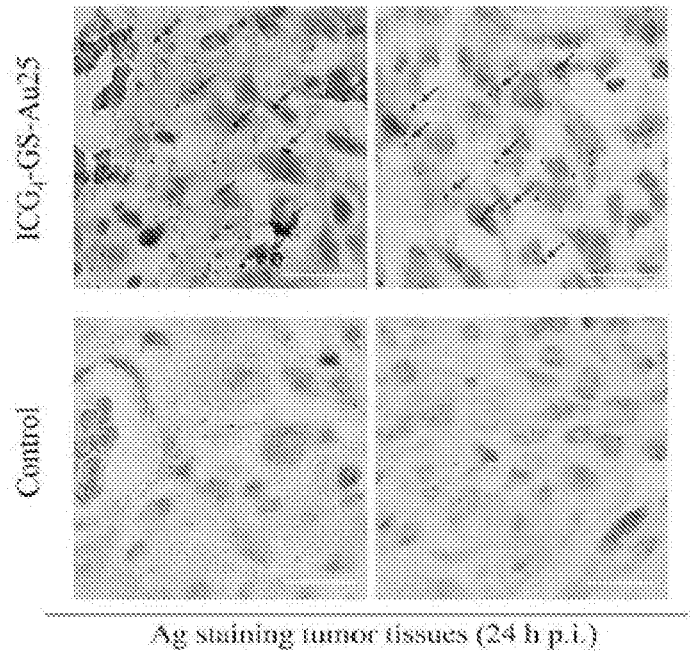
FIG. 35. Silver staining of AuNPs in tumor tissues. Silver staining of the tumor tissues from ICG4-GS-Au25 injected mice revealed that many AuNPs (pointed by blue arrows) were located in cells, indicating that ICG-Au25 conjugates effectively extravasated and penetrated into tumor interstitium and then were efficiently taken up by the cells in tumor. Control images show tumor slides from PBS injected mice underwent the same silver staining procedure. Yellow dashed line outlines the blood vessels. Scale bar, 10 μm.

Tumor targeting and retention of $ICG_4$-GS-Au25. Although both free ICG and GS-AuNPs have low tumor targeting efficiency, integration of ICG and GS-AuNPs resulted in unexpected significant enhancements in tumor targeting for both ICG and GS-AuNPs while retaining their respective clearance pathways due to glutathione-mediated liver detoxification. Using MCF-7 xenograft mice as model, the inventors conducted head-to-head comparison on tumor targeting of $ICG_4$-GS-Au25 and GS-Au25 as well as free ICG under the same conditions. As shown in FIG. 5A, although only 4 ICG molecules were conjugated onto GS-Au25, the accumulation of Au25 in the tumor was improved to ~5.4% ID/g, 2.3 times higher than non-conjugated ones. Such improvement mainly originated from the enhanced blood retention of Au25 due to the serum protein adsorption, which prevented Au25 from a rapid renal clearance without inducing rapid MPS uptake. In addition, integration of ICG with Au25 also enhanced the tumor targeting of ICG. While both free ICG and $ICG_4$-GS-Au25 passively targeted tumors, $ICG_4$-GS-Au25 had 27 times higher tumor targeting efficiency (~4.1% ID/g vs. ~0.15% ID/g) than free ICG at 24 hr p.i. The enhancement in the tumor targeting of ICG is mainly because zwitterionic GS-Au25 slowed down the liver uptake of ICG and greatly increased ICG blood retention (AUC) to ~23.7 h×% ID/g, more than 12 times longer than that (~1.9 h×% ID/g) of free ICG (FIG. 5B). More interestingly, not only tumor targeting efficiency but tumor imaging contrast and time window of ICG were also significantly enhanced (FIG. 5C). For ICG$_4$-GS-Au25 injected mice, tumor contrast index reached threshold (CI=2.5) at 24 hr p.i. and kept increasing for the rest 2 weeks with the maximum contrast index of ~7.6, 4 times higher than that (maximum CI=~1.8) of free ICG injected mice (FIG. 5D). This prolonged tumor-imaging time window is because that ICG could be retained in tumor with a half-life of ~310.3 hr after being conjugated onto Au25, which is more than 80 times longer than that (~3.8 h) of free ICG (FIG. 5E). Meanwhile, the ICG signals of ICG$_4$-GS-Au25 in the background tissues continued decreasing at a rate only slightly slower than that of free ICG (half-life: 13 hr vs. 3.5 hr, see FIGS. 30A-B). The greatly enhanced tumor retention of ICG was fundamentally due to the fact that ICG-Au25 conjugates effectively entered the tumor microenvironment, which was confirmed by the fact that fluorescence of ICG in tumor microenvironment was immediately turned on after injection of glutathione into the tumor tissues ex vivo (FIG. 5F and FIG. 31). At the in vivo level, ICG-Au25 conjugates were taken up by the cells in the tumor microenvironment, turned on fluorescently inside cells due to high concentration of intracellular glutathione and lighted up the tumor for a long period of time. These results were consistent with the observation of the efficient endocytosis of ICG$_4$-GS-Au25 and releasing of ICG from Au25 in tumor cells at the in vitro level (FIGS. 33-34) as well as tumor tissue imaging (FIG. 5G, see FIG. 35 for silver staining of Au25 in tumor tissues).

Figure 36E:
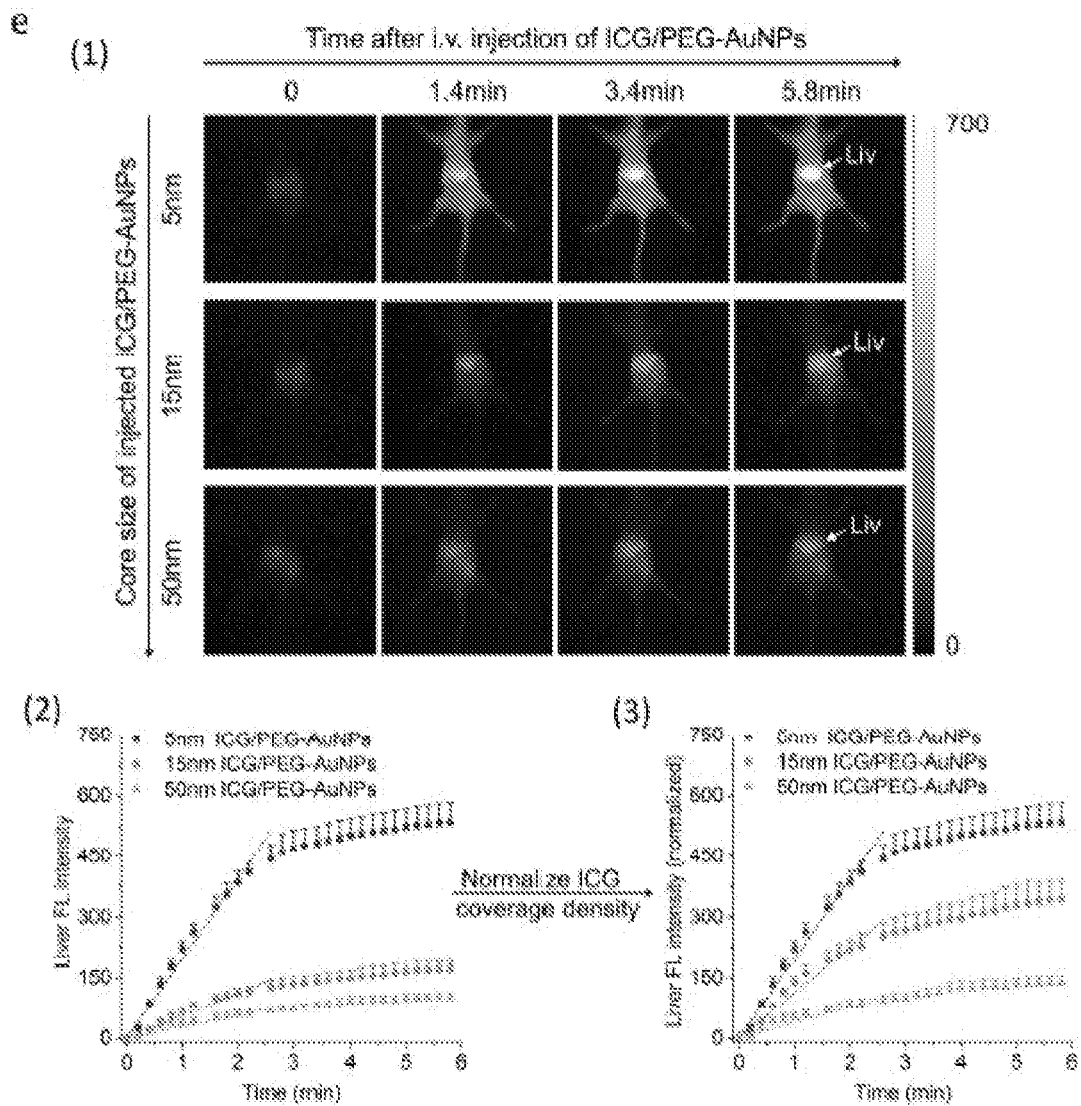

Other Embodiments. These fundamental understandings are not limited to ultrasmall Au25. The inventors also investigated the glutathione-mediated biotransformation of a series of different-sized PEGylated AuNPs ranging from 5 nm to 100 nm in core sizes (FIGS. 36A-G). Both in vitro and in vivo studies revealed that all the AuNPs were subject to hepatic glutathione-mediated biotransformation but smaller AuNPs underwent biotransformation more efficiently than their larger counterparts due to more reactive gold atoms on the highly curved surface of smaller AuNPs (FIG. 36G). Such biotransformation rate of solid AuNPs was found to exponentially decrease with the increase in their core sizes.

While the inventors intentionally used zwitterionic glutathione coated Au25 that resists serum protein adsorption and macrophage uptake to unravel glutathione-mediated biotransformation without much interference from the MPS uptake, it should be noted that MPS uptake and glutathione-mediated biotransformation are coupled together to impact in vivo transport of engineered nanoparticles with high affinity to serum proteins. By synthesizing 4-mercaptobenzoic acid coated gold nanoparticles (MBA-AuNPs) of 3 nm and 6 nm that both strongly bind to serum proteins, the inventors found that 3 nm MBA-AuNPs cleared into urine 10-fold more efficiently than that of 6 nm MBA-AuNPs (26.5% vs 2.5% ID at 24 hr p.i.) because of the glutathione-mediated biotransformation in the liver (FIGS. 37A-G). These results clearly indicate that the two effects are also strongly dependent of particle size. For small nanoparticles, even though they bind to serum proteins, glutathione-mediated biotransformation can enhance their renal clearance significantly; on the other hand, for large nanoparticles, serum protein binding will promote macrophage uptake of large nanoparticles even though the inventors believe surface chemistries of large nanoparticles are also partially modified by the biotransformation process.

Although the inventors did observe size-dependency in the glutathione-mediated biotransformation of PEGylated AuNPs, it is noteworthy that large nanoparticles can still go through the biotransformation effectively as long as they are designed to efficiently react with glutathione or cysteine in the liver. For example, simply mixing of gold salt with glutathione at a molar ratio of 1:3 resulted in 100 nm GS-Au polymeric nanoparticles, which can be quickly disintegrated into 2-3 nm GS-Au oligomers upon exposure to 5 mM glutathione under physiological condition (FIGS. 38A-F). Incorporating ICG onto the 100 nm GS-Au polymeric nanoparticles resulted in the quenching of ICG emission, which can be turned on in vivo once the polymeric nanoparticles were dissociated due to the hepatic glutathione-mediated biotransformation. Because of this biotransformation, nearly 35% ID of such polymeric nanoparticles were cleared out into urine at 48 hr p.i., more than 20 times higher than that of large non-renal clearable GS-AuNPs (Peng et al., 2017).

Such glutathione-mediated biotransformation can also be utilized to enhance the blood retention and tumor targeting of small anticancer drugs. By conjugating ICG onto the cisplatin prodrug (cis,cis,trans-[Pt(NH$_3$)$_2$Cl$_2$(OH) (O$_2$CCH$_2$CH$_2$COOH)]) through a thiol-cleavable disulfide linker, high affinity of ICG to serum proteins slowed down the rapid renal clearance of the cisplatin prodrug, prolonged its blood retention more than 4 times and improved tumor targeting more than 2.5-fold; in the meantime, the "off-target" cisplatin prodrug was also efficiently eliminated through the kidney with ~76% ID in urine at 24 hr p.i. (FIGS. 39A-E).

Figure 1:
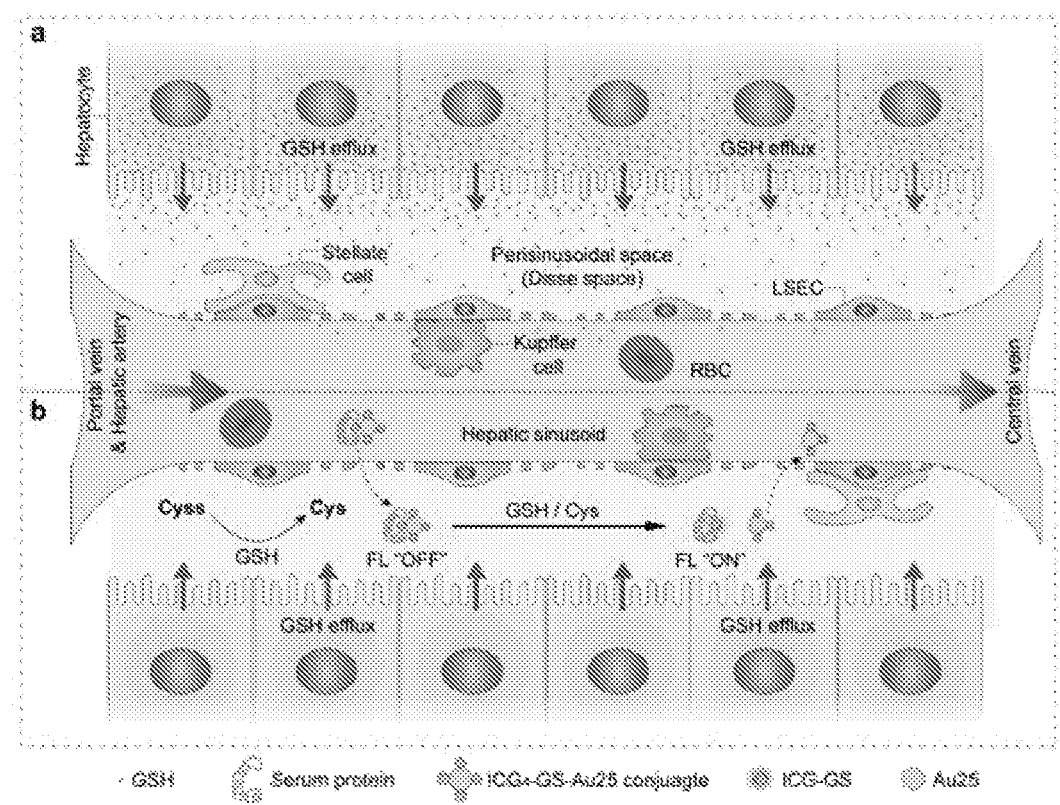
Figure 2:
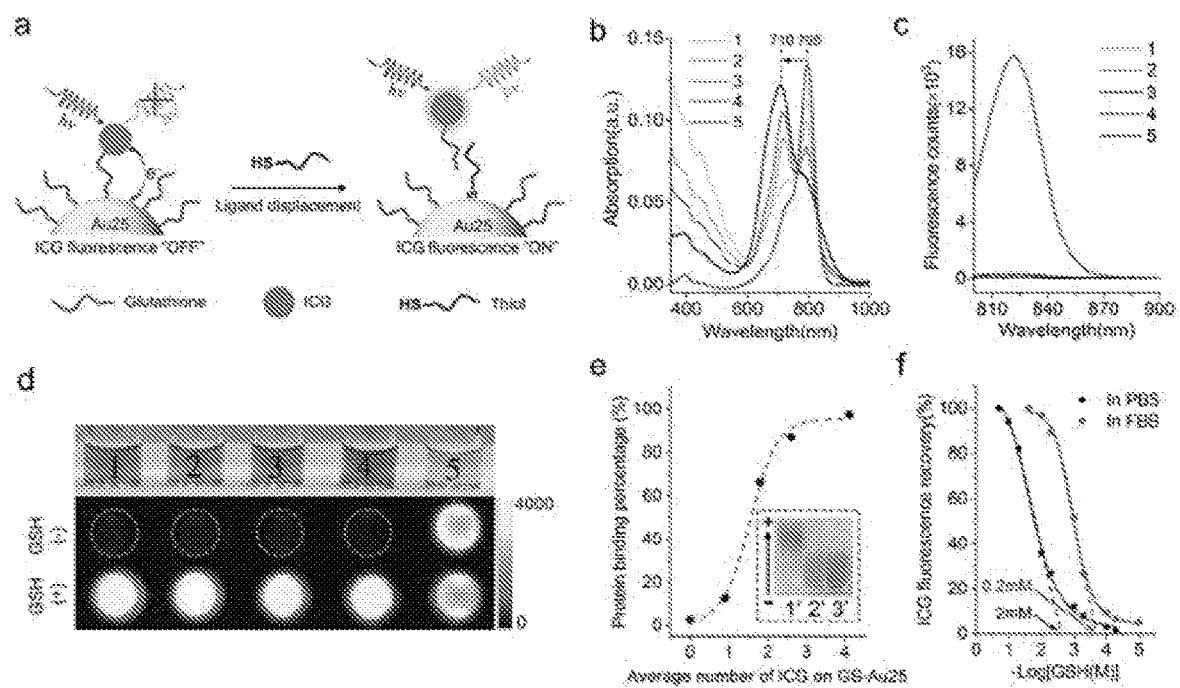
Figure 3:
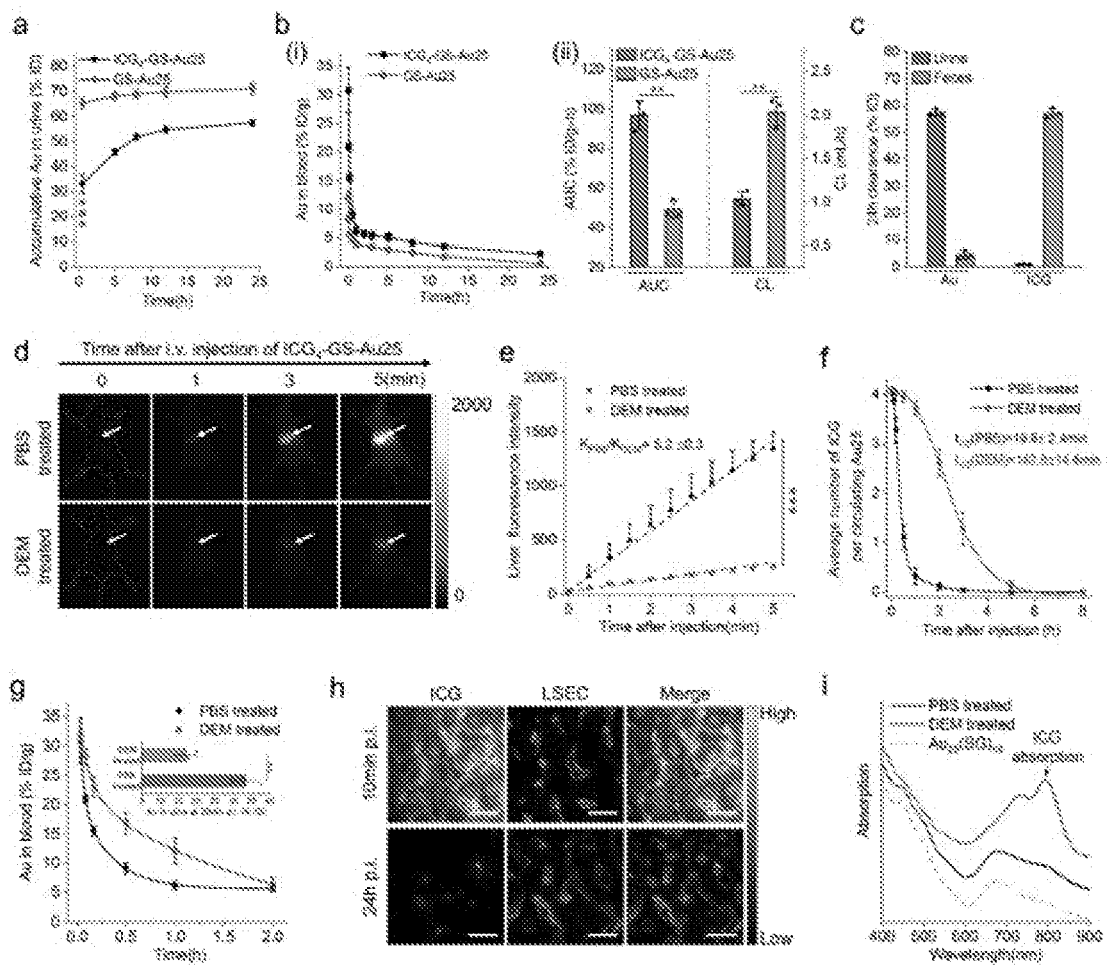
Figure 4:
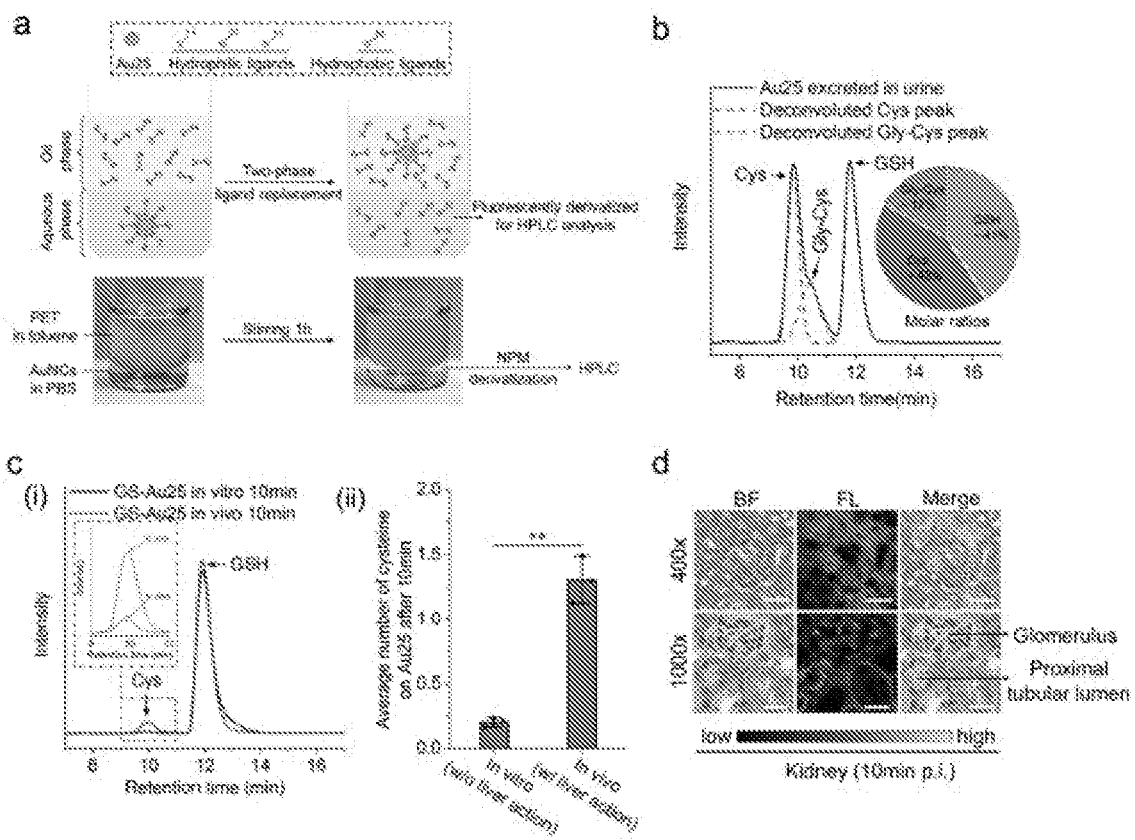
Figure 5:
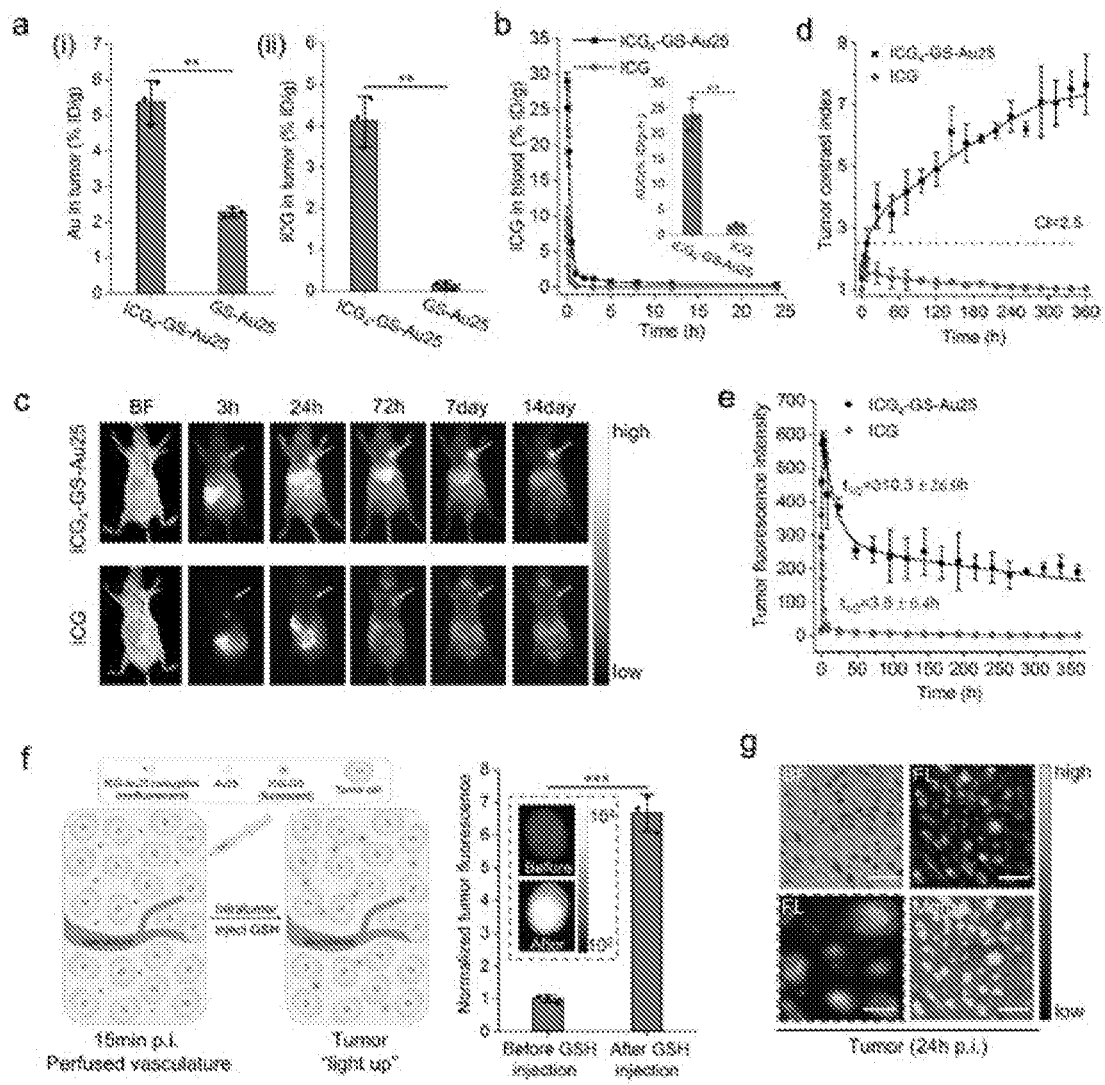
FIG. 5A-G show Tumor targeting of $ICG_4$-GS-Au25.
Figure 6:
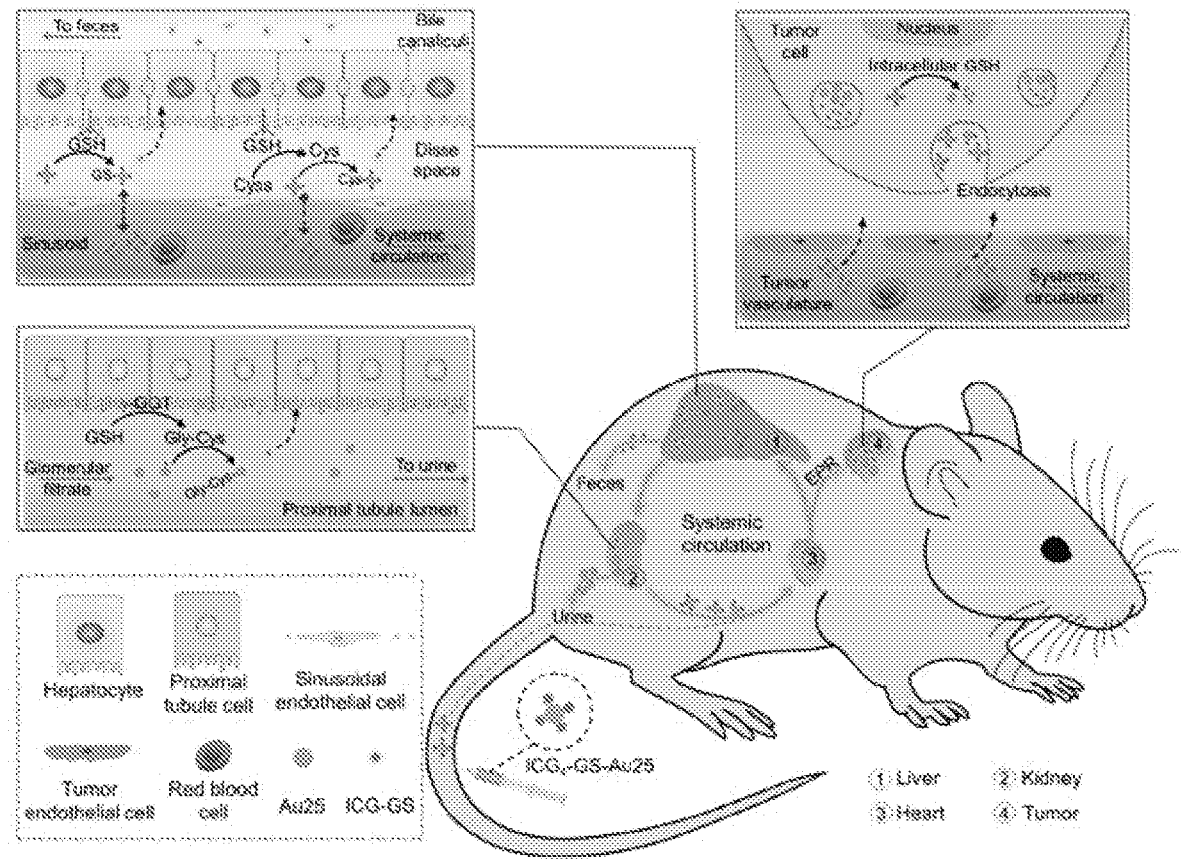
FIG. 6 shows liver glutathione-mediated biotransformation impacting in vivo transport of $ICG_4$-GS-Au25. After intravenous administration, $ICG_4$-GS-Au25 nanoclusters are immediately bound to serum proteins. The protein-bound $ICG_4$-GS-Au25 had an overall hydrodynamic size larger than kidney filtration threshold and thus was prevented from rapid elimination through the kidneys but was transported into the liver sinusoids, where the local high concentrations of glutathione and cysteine resulting from sinusoidal glutathione efflux displaced some or all of the ICG-GS from the surface of Au25, reducing the protein-binding affinity of $ICG_4$-GS-Au25. The displaced ICG-GS was then taken up by hepatocytes and eliminated through hepatobiliary pathway whereas the bio-transformed ICG-GS-Au25 nanoclusters were back to the blood circulation and target tumor through EPR effect. When the bio-transformed ICG-GS-Au25 nanoclusters circulated to the kidneys, those clusters with low affinity to serum proteins passed the glomerular filtration and underwent additional surface modifications in kidney proximal tubules, where the left ICG-GS on Au25 nanoclusters were further displaced by cysteinylglycine, the extracellular metabolite of glutathione in proximal tubules. For those bio-transformed Au25 that still bound to serum proteins, they remained in the blood stream and targeted the tumor. In the tumor, $ICG_4$-GS-Au25 along with its biotransformed derivatives entered the tumor microenvironment and were internalized by the cells in the tumors. The high concentration of intracellular glutathione then induced the dissociation of ICG-GS from Au25 within the cells and the tumor was lighted up for a long time. Some cell types such as Kupffer cells in liver and many stromal cells in tumor are omitted in this scheme for clarity.

Summary. In summary, glutathione-mediated biotransformation in the liver, a recognized detoxification process for the body to remove small xenobiotics, can profoundly impact the in vivo transport and nano-bio interactions of engineered nanoparticles. Using serum protein bound ICG$_4$-GS-Au25 as model, the inventors teach how glutathione efflux from the hepatocytes transforms the nanoparticle in the liver sinusoids in vivo. By gradually displacing ICG-GS from the Au25 surface with glutathione or cysteine in the liver sinusoids, this biotransformation process alters not only the interactions of the nanoparticle with serum proteins but also its clearance and targeting profiles (FIG. 6). While serum protein adsorption and liver uptake have been longstanding barriers in the clinical translation of nanomedicines, combining hepatic glutathione-mediated biotransformation and temporal serum protein binding prolongs blood retention of both ICG and Au25, enable them to much more efficiently target tumors, whereas "off-target" ICG and Au25 are still eliminated out of the body through hepatic and renal pathways, respectively.

Combining all these results clearly indicates that hepatic glutathione-mediated biotransformation, a well-known physiological response to small xenobiotics, can be used to modulate the in vivo transport of nanoparticles; so that disease targeting of nanoparticles can be maximized while nonspecific accumulation and health hazards of "off-target" ones are minimized.

Materials and Equipment. ICG-NHS was purchased from Intrace Medical (Switzerland) while all the other chemicals were obtained from Sigma-Aldrich (USA) and used as received unless specified. Four distinct-sized bare AuNPs (citrate protected) and Clodronate liposomes (Clophosome) were purchased from NanoComposix, Inc (USA) and ForkmuMax Scientific, Inc (USA), respectively. The related absorption spectra were measured with a Virian 50 Bio UV-Vis spectrophotometer. Fluorescence spectra were acquired with a PTI QuantaMaster® 30 fluorometer. The core size and hydrodynamic diameter of nanoparticles were measured 200 kV JEOL 2100 transmission electron microscope and Malvern ZS90 particle size analyzer. In vivo fluorescence images were recorded using a Carestream In vivo FX Pro imaging system. Optical imaging of cultured cells and tissue slides was obtained with an Olympus IX-71 inverted fluorescence microscope coupled with Photon Max 512 CCD camera (Princeton Instruments). Electron microscopic images of cultured cells were acquired using a 120 kV Tecnai G2 spirit transmission electron microscope (FEI) equipped with a LaB6 source. Shimadzu Prominence Modular HPLC equipped with UV-Vis detector (SPD-20A) and fluorescence detector (RF-20A) was used for the separation of derivatized thiol ligands. Agarose gel electrophoresis was carried out in a Bio-Rad Mini-Sub Cell GT system. Agilent 7900 inductively coupled plasma mass spectrometry (ICP-MS) was used for the quantitative analysis of Au in biological samples. Animal studies were performed according to the guidelines of the University of Texas System Institutional Animal Care and Use Committee. BALB/c mice (strain code 047, 6-8 weeks old, weighing 20-25 g) were purchased from Envigo. All mice were randomly allocated and housed under standard environmental conditions (23±1° C., 50±5% humidity and a 12/12 hr light/dark cycle) with free access to water and standard laboratory food.

Synthesis of GS-Au25 (Au2s(SG)1s) and ICG-GS-Au25 conjugates. Atomically monodisperse Au2s(SG)1s nanoclusters were synthesized according to the reported method[4]. Characterization of the synthesized Au2s(SG)1s can be found in FIGS. 12A-D. For the synthesis of 1CG4-GS-Au25, 4 mg ICG-NHS (dissolved in DMSO) was added into 6 mg GS-Au25 aqueous solution and the mixture was vortexed for 3 hr. Then ICG-GS-Au25 conjugates were purified after removing unconjugated ICG dye through centrifugation in the presence of ethanol. The conjugates were again redispersed in 1×PBS buffer and purified by Amicon Ultra centrifuge filters to remove any unconjugated GS-Au25 nanoclusters. The resulting ICG4-GS-Au25 inside the centrifuge filter was resuspended in ultrapure water and lyophilized for future usage. For the synthesis of GS-Au25 conjugated with fewer number of ICG molecules, reduced feeding ratios of ICG-NHS/GS-Au25 were adopted and the products were purified following the same protocol as that of 1CG4-GS-Au25. Additional characterization of the synthesized ICG4-GS-Au25 is in FIGS. 13A-C.

Synthesis of different-sized ICG/PEG-AuNPs, MBA-AuNPs and GS-Au polymeric nanoparticles. Different-sized ICG/PEG-AuNPs were obtained by surface-ligand exchange of different-sized bare AuNPs with ICG-GSH and PEG-SH (average molecular weight ~2000) in water for 1 hr at 55° C. under vigorous stirring. The resulting ICG/PEG-AuNPs were purified by gel filtration column to remove free ICG-GSH and PEG-SH. The 4-mercaptobenzoic acid (MBA) coated AuNPs (MBA-AuNPs) were synthesized by adding 1M HAuCl$_4$ aqueous solution to 10 mM MBA solution containing 50% (v/v) methanol at a molar ratio of 1:3. The mixture was first stirred at room temperature for 15 min and then brought to 0° C. in ice cold water followed by introducing ice cold 150 mM NaBH$_4$ aqueous solution with a NaBH$_4$:HAuCl$_4$ molar ratio of 2:1. The reaction was further proceeded for another 30 min and dark MBA-AuNPs were collected by centrifugation. Large and small MBA-AuNPs were obtained by 25% native polyacrylamide gel electrophoresis (PAGE) separation of the synthesized MBA-AuNPs. The ~100 nm (HD) GS-Au polymeric nanoparticles were synthesized by adding 1M HAuCl$_4$ aqueous solution to GSH aqueous solution (~12 mM) at a molar ratio of 1:3 with gentle stirring. Colorless GS-Au polymer precipitates were formed subsequently and collected by centrifugation. The precipitates were redispersed in water and freeze dried to yield GS-Au polymeric nanoparticles. Conjugation of ICG to GS-Au polymeric nanoparticles were performed in a similar way to that of GS-Au25 using amine-reactive ICG-NHS.

Synthesis of ICG-GSSG, ICG-GSH, ICG-Cis-Pt prodrug. ICG-GSSG conjugates were synthesized by mixing ICG-NHS (dissolved in DMSO) and GSSG (glutathione oxidized, dissolved in water) at a molar ratio of 1:5 and pH 8. The reaction proceeded for 2 hr under agitation and ICG-GSSG could be purified by acetone-induced precipitation and subsequent dialysis against ultrapure water. ICG-GSH was facilely obtained by reducing ICG-GSSG with TCEP (tris(2-carboxyethyl)phosphine) in aqueous solution. ICG-Cis-Pt prodrug was synthesized by linking the primary amine group of ICG-GSSG with the carboxyl group of Cis-Pt prodrug through a typical EDC/NHS coupling reaction. The mono-carboxylated Cis-Pt prodrug (cis,cis,trans-[Pt(NH$_3$)$_2$Cl$_2$(OH)(O$_2$CCH$_2$CH$_2$COOH)]) was synthesized according to the reported protocol (Dhar et al., 2009).

Figure 14:
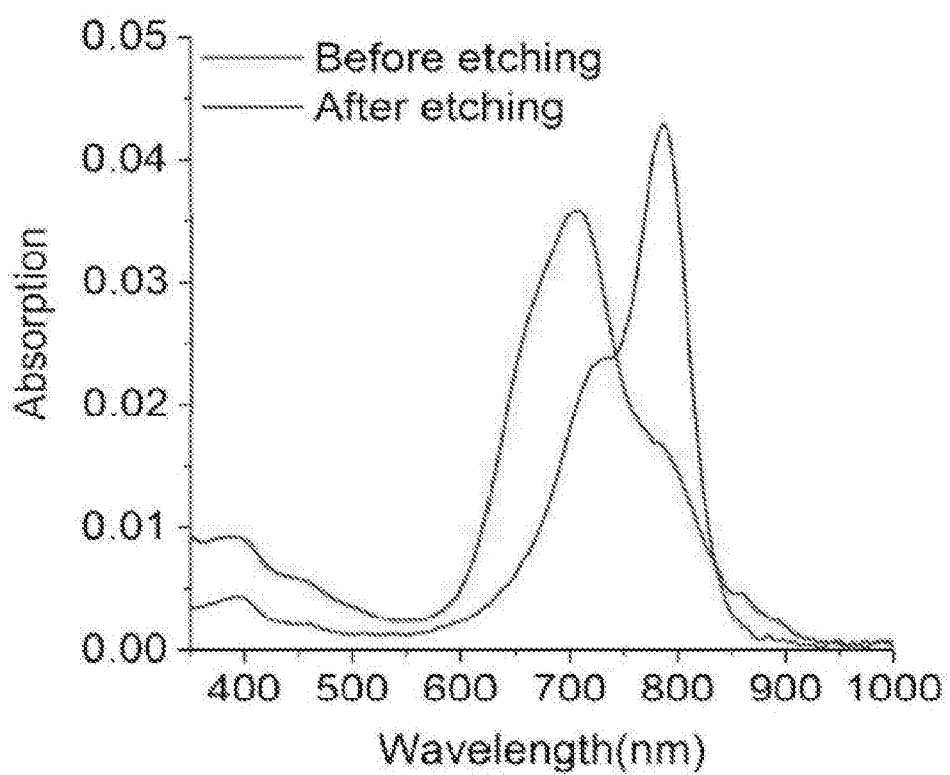
FIG. 14. UV-Vis absorption of ICG4-GS-Au25 before and after etching. After etching in 20 mM cysteine (pH=7.4) for 30 mM, ICG was completely detached from Au25 surface and showed its characteristic monomer absorption profile.

Quantification of the number of ICG molecules per GS-Au25 nanocluster. The purified ICG-GS-Au25 conjugates were dissolved in ultrapure water containing 20 mM cysteine (pH adjusted to 7.4 by NaOH) and incubated for 30 min (protected from light exposure) to completely release ICG from Au25 surface (see FIG. 14), then ICG concentration was quantified by its characteristic absorption peak at 780 nm and a pre-established concentration vs. absorption standard curve while the Au25 concentration was quantified by ICP-MS analysis of the Au content.

Depletion of tissue GSH in vivo. The temporary depletion of tissue GSH was achieved by a single injection of diethyl maleate (DEM). DEM was intraperitoneally administered into BALB/c mice at a dose of 1 mL/kg body weight ~40 min prior to the injection of 1CG4-GS-Au25 or other probes. The success of tissue GSH depletion was verified by the rapid decrease in plasma GSH level following DEM administration (FIGS. 21A-B), consistent with the literatures 6J. Quantification of GSH was carried out by a modified Tietze enzymatic recycling assay established previously (Rahman et al., 2006).

In vivo fluorescence imaging of ICG4-GS-Au25. Hair-removed BALB/c mice (~25 g/mouse) were pretreated with PBS, DEM (1 mL/kg body weight), Clophosome (7 mg/mL clodronate disodium, 200 μL/mouse as recommended by the manufacturer) and control liposomes, respectively. Then under 3% isoflurane anesthesia, mouse was tail-vein catheterized and prone-positioned on the imaging stage. 150 μL ICG4-GS-Au25 (20 μM, in PBS) was tail vein injected following by a sequential time-series imaging collection. The fluorescence imaging parameters were set as follows: EX760 nm/EM830 nm; 10 s exposure time; 2×2 binning.

Quantification of the average number of ICG molecules per circulating Au25 nanocluster. Blood samples (~30 μL) from BALB/c mice were collected retro-orbitally at different time points after i.v. injection of 1CG4-GS-Au25 Immediately after each collection, blood sample was mixed with 100 μL ice cold PBS buffer containing 2% EDTA and centrifuged at 1200 g for 5 μL to precipitate blood cells. Then the supernatant was equally divided into two aliquots and 50 μL PBS or cysteine (20 mM) PBS solution were added to each aliquot, respectively. After 30 min incubation, the ICG fluorescence of each aliquot was measured and the increase (cysteine treated vs. PBS treated) in fluorescence intensity was normalized to Au amount (quantified by ICP-MS) for each time point. The percentage of ICG fluorescence increment per Au at each time point with respect to that of ICG4-GS-Au25 dissolved directly in plasma (simulated as the 0 min time point) was used to calculate the average number of ICG molecules per circulating Au25. A scheme of these experiment procedure is included in FIG. 24.

Pharmacokinetics and biodistribution study of 1CG4-GS-Au25. PBS or DEM pretreated BALB/c mice were i.v. injected with 150 μL ICG4-GS-Au25 (~20 μM, in PBS) per mouse. At certain time point post-injection, blood sample (~30 μL) was retro-orbitally collected and weighed, followed by the addition of 500 μL lysis buffer containing 20 mM cysteine (pH~8) to liberate ICG from Au25 nanocluster and recover the quenched fluorescence of ICG. Then fluorescence of cysteine treated blood sample was measured by the in vivo imaging system to quantify ICG in blood. Afterwards, the blood sample was completely dissolved in freshly made aqua regia and the Au amount in blood was analyzed by ICP-MS. Biodistribution of ICG4-GS-Au25 in different organs/tissues was quantified in a similar way. Organs/tissues were collected and weighed following the sacrifice of mice and then completely digested in aqua regia to determine the Au content via ICP-MS. The ICG content in different organs/tissues was quantified by its NIR fluorescence after dissociation from Au25 by homogenizing organs/tissues in lysis buffer containing 20 mM cysteine (pH 8). Standard curves of ICG fluorescence vs. concentration were constructed in the respective control organ/tissue lysate.

Tissue slide imaging with an optical microscope. BALB/c mice were sacrificed at 10 min following the i.v administration of 150 μL/mouse ICG4-GS-Au25, ICG-GSH, ICG or PBS, respectively. The liver and kidneys were then collected and fixed immediately in 10% neutral buffered formalin, followed by standard dehydration and paraffin embedding. The embedded tissues were then sectioned into 4 μm slices and H&E stained. The final slides were visualized under Olympus IX-71 fluorescence microscope equipped with ICG filters set (Chroma). Tumor tissues were obtained from BALB/c nude mice bearing MCF-7 xenograft tumors 24 hr after i.v. injection of 1CG4-GS-Au25 and processed with the same procedures as those for liver and kidney tissues. To visualize the gold nanoclusters in tumor tissues under brightfield optical microscope, silver staining was used to enhance their size and contrast. Tumor slides were first dewaxed in xylene and incubated in silver staining solution containing 0.05M $AgNO_3$ and 1 mM hydroquinone for half an hour. Afterwards, tumor slides were washed with copious ultrapure water and dried in lab oven (65° C.) for imaging under bright-field of Olympus IX-71 microscope.

Fluorescent immunohistochemistry of liver tissue. Liver tissues from BALB/c mice i.v. injected with ICG4-GS-Au25 were harvested at 10 min as well as 24 hr p.i. and immediately fixed with 4% freshly prepared paraformaldehyde PBS solution for 2 hr. Then the fixed liver tissues were immersed in 20% sucrose PBS solution overnight at 4° C. before being embedded in freezing medium (OTC). The embedded liver tissues were sectioned into 5 μm-thickness slides in cryostat and blocked with PBS containing 5% normal goat serum for 1 hr at RT. Afterwards, liver slides were incubated with either rat anti-mouse F4/80 (Invitrogen) or 2.4G2 (CD16/CD32, BD Biosciences) primary antibodies in PBS containing 1% goat serum overnight at 4° C. to stain macrophage or liver sinusoidal endothelial cell (LSEC), respectively. Primary antibody binding was visualized using goat anti-rat IgG secondary antibody conjugated with Alexa Fluor 647 (Invitrogen). Cell nuclei were counterstained with DAPI for 10 min before slides were mounted and subject to fluorescent microscopy.

Extract gold nanoparticles from the urine and blood samples for surface ligand analysis. The excreted AuNPs in the urine were purified first by adding 10% (m/v) 5-sulfosalicylic acid to precipitate urine proteins and followed by 10 kDa centrifuge filter to separate AuNPs from the small molecules (urea, etc.) presented in the urine. The separated AuNPs were further purified by 2% agarose gel electrophoresis and gel filtration column (Sephadex LH-20, GE Healthcare). The extraction of AuNPs in blood was similar to that in the urine. The blood from AuNPs injected mice was collected by cardiac puncture and centrifuged to obtain the plasma, then plasma protein was precipitated by adding 5-sulfosalicylic acid and the remaining AuNPs in supernatant were purified following the same protocol as the inventors did for the urine. To extract sufficient AuNPs from the blood after circulation, renal arteries were clamped right before the i.v. injection of AuNPs in order to prevent the rapid blood elimination of ultrasmall AuNPs through the kidney filtration.

HPLC analysis of gold nanoparticle surface ligands. Toluene of 1 mL was added to 500 μL PBS containing purified AuNPs, then 2-phenylethanethiol was added to the top toluene layer and the mixture was vigorously stirred for 1-2 hr at room temperature to transfer gold cores to the organic phase while leaving the original hydrophilic ligands in the aqueous phase. Afterwards, TCEP was added to the PBS solution to reduce any disulfides formed in this process before[;\;]HPLC analysis of the thiol ligands. A well-established NPM derivatization method9 was used to quantitatively analyze the thiol ligands in PBS. The derivatives were separated by Shimadzu HPLC equipped with TSK gel column (Tosoh Bioscience) and fluorescence detector. The HPLC conditions were as follow: mobile phase 20/80 $H_2O$/MeCN containing 1 ml/L acetic acid and 1 ml/L phosphoric acid; isocratic flow 0.6 ml/min; column temperature 25° C.; detector wavelength EX330 nm/EM380 nm.

Example 2

Materials and equipment. ICG-NHS was purchased from Intrace Medical (Switzerland) while all the other chemicals were obtained from Sigma-Aldrich (USA) and used as received unless specified. The absorption spectra were measured with a Virian 50 Bio UV-Vis spectrophotometer. Fluorescence spectra were acquired with a PTI QuantaMaster™ 30 fluorometer. The size of nanoparticles was measured by 200 kV JEOL 2100 transmission electron microscope. In vivo fluorescence images were recorded using a Carestream In-Vivo FX Pro imaging system. Optical imaging of liver tissue slides was conducted with an Olympus IX-71 inverted fluorescence microscope coupled with Photon Max 512 CCD camera (Princeton Instruments) Animal studies were performed according to the guidelines of the University of Texas System Institutional Animal Care and Use Committee. BALB/c mice (strain code 047, 6-8 weeks old, weighing 20-25 g) were purchased from Envigo. All mice were randomly allocated and housed under standard environmental conditions (23±1° C., 50±5% humidity and a 12/12 h light/dark cycle) with free access to water and standard laboratory food.

Synthesis of $ICG_4$-GS-Au25 nanoprobes. Atomically monodisperse $Au_{25}(SG)_{18}$ (GS-Au25) nanoclusters were first synthesized according to the reported method (Wu et al., 2009). For the synthesis of $ICG_4$-GS-Au25, 4 mg ICG-NHS (dissolved in DMSO) was added into 6 mg GS-Au25 aqueous solution and the mixture was vortexed for 3 h. Then ICG-GS-Au25 conjugates were purified after removing unconjugated ICG dye through centrifugation in the presence of ethanol. The conjugates were again re-dispersed in 1×PBS buffer and purified by 30 KDa Amicon Ultra centrifuge filters to remove any unconjugated GS-Au25 nanoclusters. The resulting ICG$_4$-GS-Au25 inside the centrifuge filter was resuspended in ultrapure water and lyophilized for future usage.

Depletion of liver GSH by DEM and quantification of liver GSH level. The variation of liver GSH level was achieved by a single injection of different doses of diethyl maleate (DEM). DEM was intraperitoneally administered into BALB/c mice at a dose of 0, 0.3 and 0.6 mL/kg body weight ~30 min prior to the injection of ICG$_4$-GS-Au25 nanoprobes. Immediately after the in vivo liver fluorescence imaging, mice were sacrificed and their livers were harvested and promptly snap frozen in liquid nitrogen for the determination of liver GSH level. Quantification of liver GSH level was carried out by a modified Tietze enzymatic recycling assay reported previously (Rahman et al., 2006).

In vivo liver fluorescence imaging with ICG$_4$-GS-Au25. Hair-removed BALB/c mice were pretreated with saline (control), DEM or APAP. Then under 3% isoflurane anesthesia, mouse was tail-vein catheterized and prone-positioned on the imaging stage. 150 µL ICG$_4$-GS-Au25 (20 µM, in PBS) was then tail vein injected under sequential time-series imaging collection for ~4 min. The fluorescence imaging parameters were set as follow: EX760 nm/EM830 nm; 7 s exposure time; 2×2 binning.

APAP-induced liver injury animal model. Healthy male BALB/c mice were pre-fasted for 5 h and then intraperitoneally injected with APAP saline solution (~28 mg/mL) at an overdose of 300 mg/kg body weight. As control, the pre-fasted mice were intraperitoneally injected with APAP at a normal dose of 60 mg/kg body weight or an equivalent volume of saline. The normal APAP dose of 60 mg/kg body weight was derived from the maximum recommended daily dose (3-4 mg) of a healthy adult human (~70 kg) in literature. Food was immediately retrieved after the injection of APAP or saline.

Serum ALT level test. Blood was withdrawn retro-orbitally from mice at specific time points and placed on ice for 30 min to allow for coagulation. Then the blood samples were centrifuged at 10000 g at 4° C. to separate serum from blood cells. The serum samples were collected and stored at −20° C. until ALT test. The serum ALT activity was measured colorimetrically with the Alanine Aminotransferase Activity Assay Kit (Sigma-Aldrich, Catalog #MAK052).

Measurement of the ICG fluorescence ON/OFF ratio in blood sample. At specific time points following the intravenous injection of ICG$_4$-GS-Au25, ~10 µL blood was withdrawn retro-orbitally from the mouse and immediately placed in a glass vial containing 500 µL 2% EDTA PBS solution. After this, the OFF-state blood ICG fluorescence in the vial was promptly recorded using the in vivo fluorescence imaging system. Then 500 µL DTT solution (40 µM, pH 7.4) was added to the vial to release ICG-GS from the Au25 surface and the ON-state blood ICG fluorescence in the vial was recorded at the same imaging condition after 10 min incubation. The ON/OFF ratio of the blood ICG fluorescence was then calculated based on these two measurements.

TUNEL imaging of liver tissue. Liver tissues were excised promptly from euthanized mice and immediately fixed with 4% freshly prepared paraformaldehyde PBS solution for 2 h. Then the fixed liver tissues were immersed in 20% sucrose PBS solution overnight at 4° C. before being embedded in OCT freezing compound. The embedded liver tissues were sectioned into 5 µm-thickness slides in cryostat and placed on Superfrost Plus microscope slides (Fisherbrand) for TUNEL staining. The TUNEL staining was accomplished using the ApopTag® Fluorescein In Situ Apoptosis Detection Kit (Millipore Sigma, Catalog #S7110). Cell nuclei were counterstained with DAPI before slides were mounted and subject to fluorescent microscopy.

Fluorescence activation kinetics of ICG4-GS-Au25 depends linearly on GSH level both in vitro and in vivo. In order to successfully detect hepatic GSH depletion, the signals of probes need to specifically correlate with hepatic GSH level. Activatable NIR emission of ICG4-GS-Au25 in the presence of GSH made it possible to use fluorescence measurement to investigate this process at both the in vitro and in vivo level. The ICG4-GS-Au25 nanoprobe was synthesized by conjugating ICG to GSH-coated Au25 nanocluster GS-Au25 (Au25(SG)18), according to procedures reported in our previous study (Jiang et al., 2019). The monodispersity and purity of ICG4-GS-Au25 after conjugation was confirmed by TEM and HPLC (FIGS. 46A-B). The conjugation of ICG onto GS-Au25 led to significant blue shift of ICG absorption peak from 795 nm to 710 nm, which was due to the H-coupling effect of multiple ICG molecules on the same Au25 surface (Sun et al., 2016) (FIG. 41A). Because of the close proximity between Au25 and the conjugated ICG, the NIR fluorescence of ICG was nearly completely quenched due to the efficient photo-induced electron transfer process (Barazzouk et al., 2005).

However, once the ICG-GS was displaced from the Au25 surface by free GSH, the NIR fluorescence of ICG was instantaneously recovered, resulting in over 100-fold enhancement in the NIR emission (FIGS. 47A-B). In vitro incubation of ICG4-GS-Au25 in PBS solution containing 0.2~1 mM GSH revealed that the activation of ICG fluorescence as a function of incubation time exhibited a quasi-linear relationship within the first 180 seconds of incubation (FIG. 41B). Moreover, the fluorescence activation kinetics was found to linearly correlate with both the GSH concentration (Pearson's r=0.99, FIG. 2C) and ICG4-GS-Au25 concentration (r=1.00, FIGS. 48A-B) in vitro, indicating that GSH-mediated activation kinetics of ICG fluorescence is a second-order reaction at the in vitro level. These results indicate a potential in using the fluorescence activation kinetics of ICG4-GS-Au25 to measure the GSH concentration.

Figure 49:
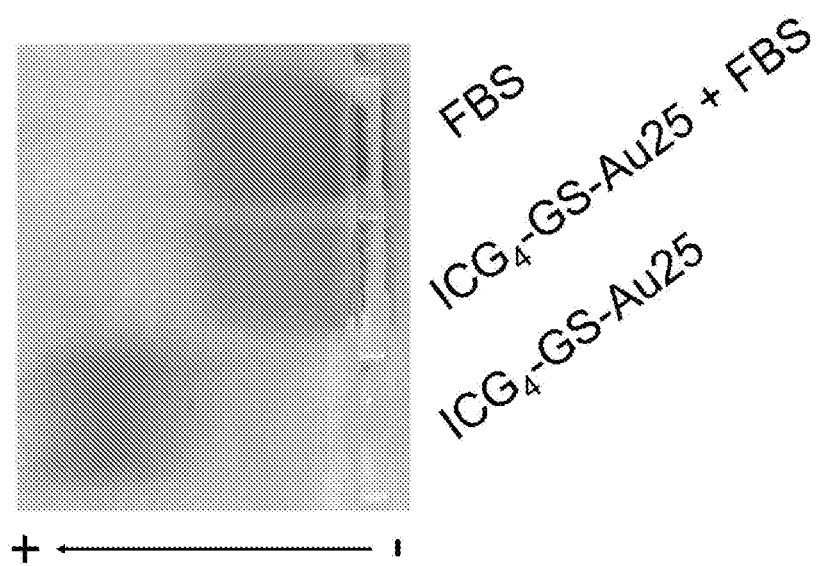
FIG. 49. Serum protein binding of ICG4-GS-Au25. 2% agarose gel electrophoresis results indicate that ICG4-GS-Au25 strongly binds to serum proteins because of the high affinity between the lipophilic ICG and serum proteins. FBS was stained with Coomassie Brilliant Blue (CBB) dye for visualization.
Figure 50:
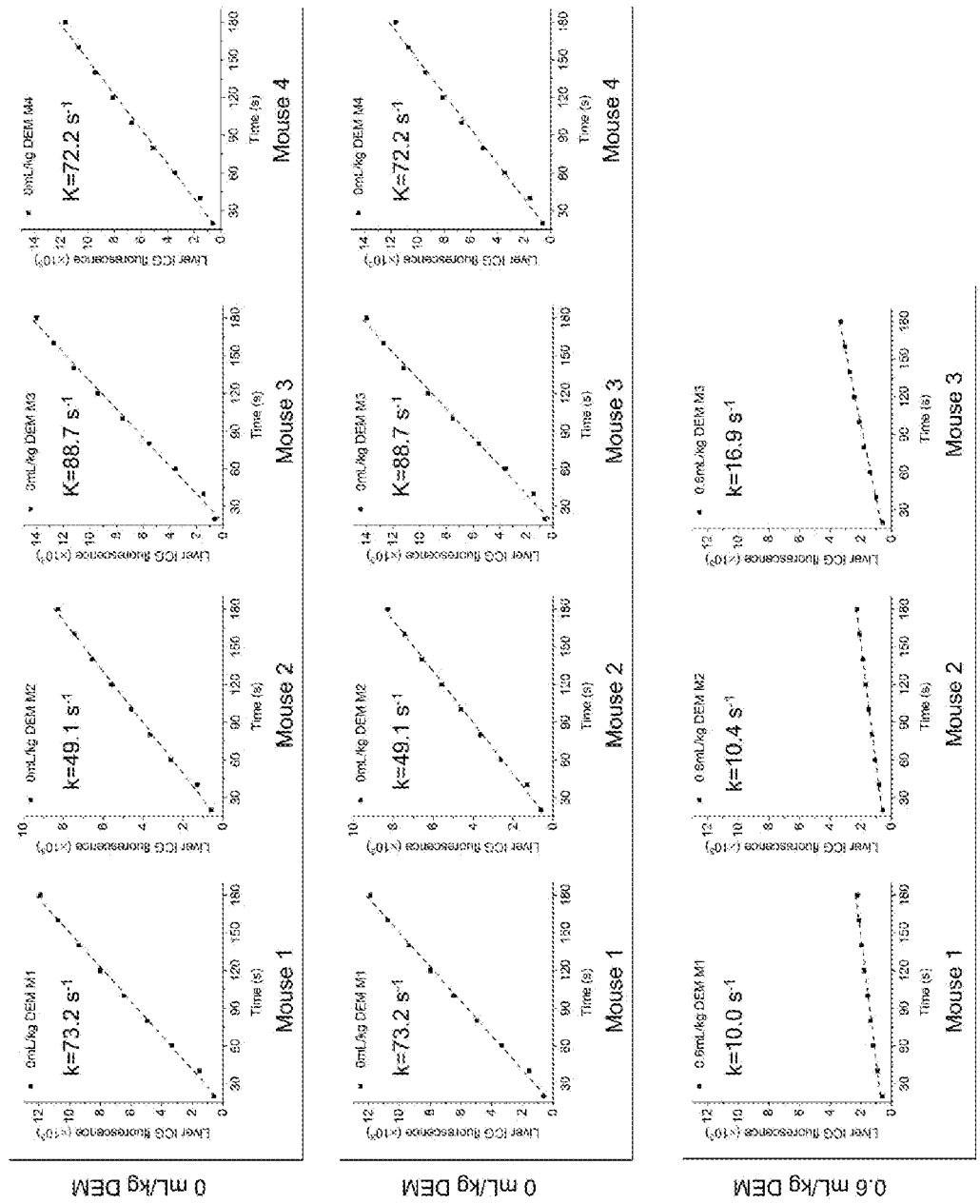
FIG. 50. Liver ICG fluorescence kinetics of individual DEM-treated mouse following i.v. injection of ICG4-GS-Au25. ICG4-GS-Au25 (3 nmol/mouse) was administered at 30 min after DEM or saline (0 mL/kg DEM) treatment.

Due to the high affinity of ICG to serum protein, ICG4-GS-Au25 strongly bound to serum proteins as well (FIG. 49), which induced rapid liver transport once entered the blood stream. To test whether the fluorescence activation kinetics of ICG4-GS-Au25 in the liver was also linearly dependent of hepatic GSH at the in vivo level, the inventors treated BALB/c mice with different doses of diethyl maleate (DEM; 0, 0.3 and 0.6 mg/kg body weight; intraperitoneal injection), a GSH-selective depletion agent that can temporarily deplete liver GSH29. At 30 min after DEM treatment, they intravenously injected ICG4-GS-Au25 into the mice and then conducted the noninvasive dynamic in vivo fluorescence imaging of the liver within 180 seconds, followed by immediately collecting the liver tissue samples and directly measuring GSH level of the extracted liver ex vivo. As shown in FIGS. 41D-E, in the mice without DEM treatment, intravenous injection of ICG4-GS-Au25 resulted in immediate activation of ICG fluorescence in the liver because the liver sinusoidal GSH efflux from the hepatocytes generated high local concentration of GSH, which displaced ICG from GS-Au25 and activated ICG emission (Jiang et al., 2019). Interestingly, in DEM-treated mice, the ICG fluorescence activation kinetics in the liver decreased accordingly with the increased DEM doses and remained the quasi-linear characteristics (FIGS. 2D-E and FIG. 50). By directly measuring GSH level of the extracted liver ex vivo, the inventors further confirmed that DEM treatment led to a dramatic decrease of liver GSH level from ~6.6 μmole/g liver tissue in the control mice to ~3.1 and ~0.6 μmole/g liver tissue in the mice receiving 0.3 and 0.6 mg/kg body weight DEM, respectively. By plotting the liver GSH levels against the liver fluorescence activation kinetics of ICG4-GS-Au25, the inventors found that the corresponding activation kinetics of the liver ICG fluorescence decreased from 71 s−1 to 33 and 12 s−1, and exhibited a strong linear correlation with the decrease in liver GSH level (Pearson's r=0.95, FIG. 41F), consistent with the observation at the in vitro level. This result also suggests the displacement of ICG from Au25 is mainly dictated by hepatic GSH in vivo and the linear correlation of liver fluorescence activation kinetics with hepatic GSH level in vivo lays down the foundation for further understanding of activation process in the diseased mouse model.

Figure 51:
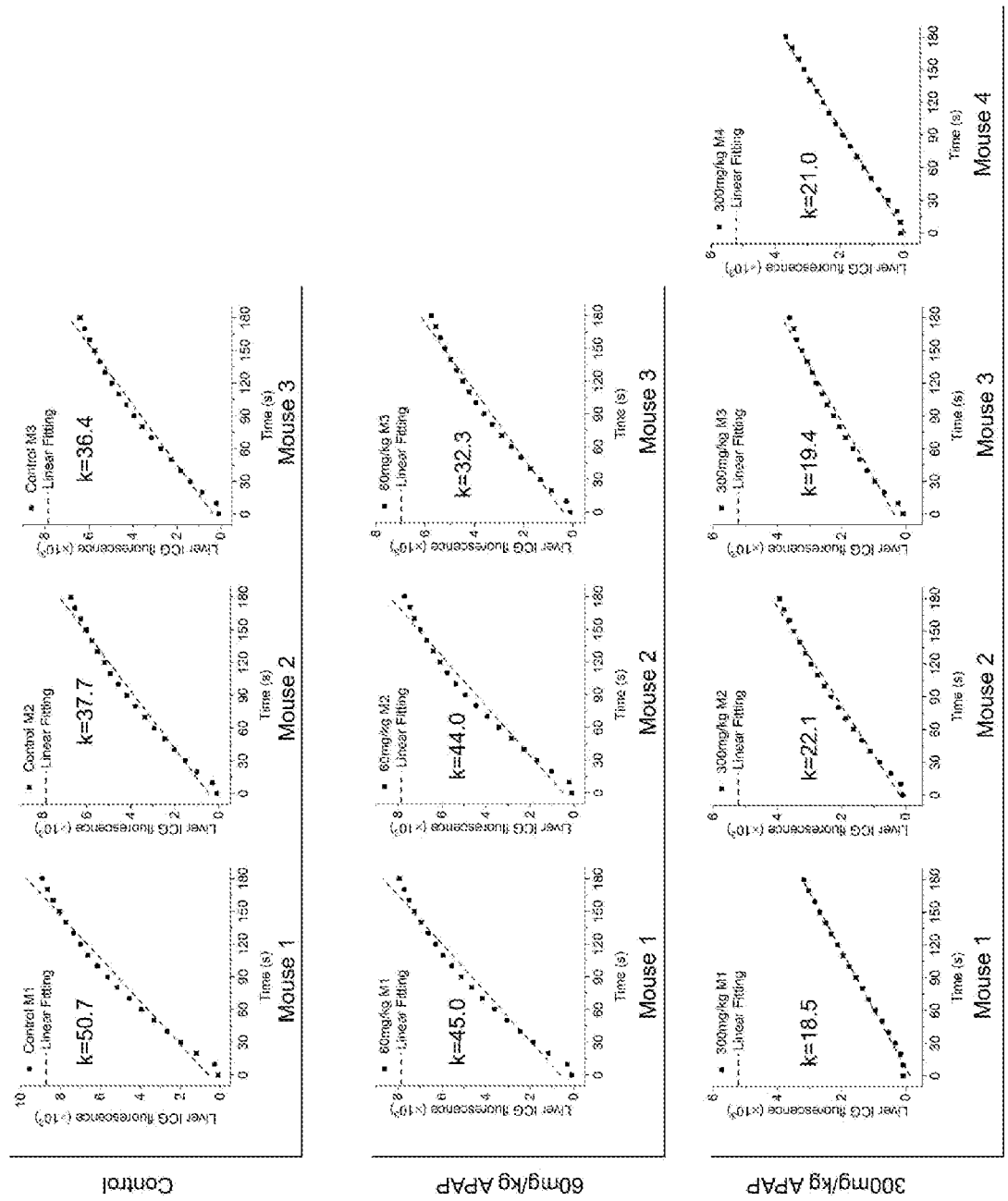
FIG. 51. Liver ICG fluorescence kinetics of individual APAP-treated mouse following i.v. injection of ICG4-GS-Au25. ICG4-GS-Au25 (3 nmol/mouse) was administered at 30 min after APAP or saline (control) treatment.

Fluorescence monitoring of drug-induced hepatic GSH depletion. Previous ex vivo studies have shown that the overdosed drugs induce hepatic GSH depletion; however, hepatic GSH depletion has never been noninvasively detected with in vivo fluorescence imaging technique (Iida et al., 2015; Casini et al., 1985; Mohar et al., 2014). To answer this question, the inventors established the well-known APAP-induced liver injury mouse model by intraperitoneally administering the mice with an overdose of APAP (300 mg/kg body weight), a normal dose of APAP (60 mg/kg body weight) or saline as control. At 30 min after APAP administration, in vivo fluorescence imaging was conducted after intravenous injection of the same ICG4-GS-Au25. As shown in FIGS. 42A-B, the liver ICG fluorescence activation in APAP-overdosed mice was significantly slower than that of the control and normally dosed mice (see FIG. 51 for data of individual mouse). Quantitative analysis showed that the liver fluorescence activation kinetics of the overdosed mice (20±1.6 s−1) was ~50% of those of the control mice (41.6±7.9 s−1) and the normally dosed mice (40.4±7.1 s−1), implying the hepatic GSH level of overdosed mice was significantly reduced by APAP metabolism-induced depletion of liver GSH (FIG. 42C). The severely diminished liver GSH content in APAP overdosed mice at 30 min p.i. was also confirmed by directly measuring GSH level of the extracted liver ex vivo (FIG. 42D). The results revealed that hepatic GSH level of overdosed mice (2.1±1.2 μmole/g tissue) was only ~36% of that of the control mice (6.0±0.1 μmole/g tissue), which was comparable to that of the normally dosed mice (6.6±0.8 μmole/g tissue).

Figure 53:
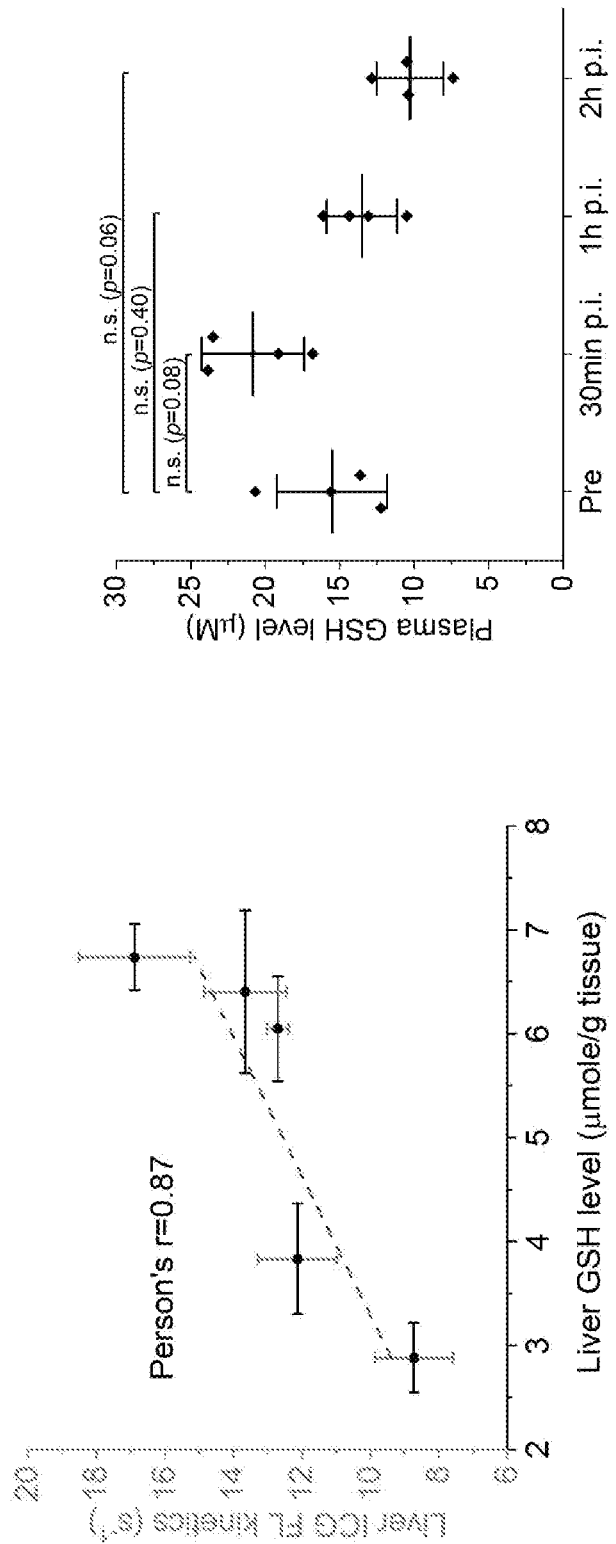
FIG. 53. Correlation of liver ICG fluorescence kinetics and liver GSH level in consecutive imaging of APAP-overdosed mice.

ICG4-GS-Au25 can also be used to consecutively image the glutathione depletion and recovery in the APAP-induced mouse model. Because of the efficient biotransformation and hepatobiliary clearance of ICG, the ICG fluorescence signals in the blood (half-life ~11 min) and liver (half-life ~33 min) decayed rapidly after injection of ICG4-GS-Au25 (FIGS. 52A-B), allowing for re-administration of the nanoprobe for continuous imaging of hepatic GSH level during the progression of liver injury. The inventors repeatedly administered the nanoprobes to the same mice at various time points after APAP overdose and monitored their liver ICG fluorescence activation kinetics, which were found to correlate well (Person's r=0.87, FIG. 53) with the liver GSH level at the respective time points (FIG. 42E). The liver GSH level was detected to drop rapidly after APAP overdose and recovered gradually afterwards, consistent with the previous reports (Mohar et al., 2014).

Monitoring drug-induced hepatic GSH depletion through blood test. While in vivo liver fluorescence imaging has been successfully used to image drug-induced GSH depletion in the mouse model at high specificity, it is challenging to translate this fluorescence imaging to large animals and humans due to the limited tissue penetration depth of light. Since the Au25 can escape the liver uptake and returned to blood circulation after GSH-mediated biotransformation in the liver sinusoids, the hepatic GSH depletion could be potentially monitored through the blood test. To validate this feasibility, the inventors first investigated the stability of ICG4-GS-Au25 in the blood plasma. As shown in FIG. 43A, very little (less than 5%) activation of the ICG4-GS-Au25 was observed after 20 min incubation in fresh blood plasma due to the high activation threshold of ICG4-GS-Au25. Since fluorescence activation of ICG on the Au25 is almost exclusively dependent of hepatic GSH, once the liver GSH level is significantly lower than normal conditions, more ICG molecules will remain on the Au25 surface even after being transported to the liver sinusoids. As a result, more ICG molecules will be retained on the Au25 extracted from the peripheral blood, leading to larger fluorescence ON/OFF ratios after detaching ICG-GS from the Au25 by dithiothreitol (DTT) (FIG. 43B). As shown in FIG. 43C, at 30 min after APAP administration, ICG4-GS-Au25 was intravenously injected and two peripheral blood samples (~10 μL) were acquired at 1 min and 15 min afterwards. The blood samples of APAP overdosed, normal dosed and control mice all exhibited weak ICG fluorescence when measured directly after the withdrawal; however, after incubation with DTT the blood ICG fluorescence of overdosed mice increased much stronger than that of control and normal dosed mice (FIG. 43D), which allowed us to quantitatively compare the fluorescence ON/OFF ratio before and after DTT treatment. Shown in FIG. 43E, the fluorescence ON/OFF ratio of APAP overdosed mice was ~2-fold and ~2.6-fold higher than that of control mice at 1 min p.i. and 15 min p.i., respectively, indicating the significantly lowered hepatic GSH level in APAP overdosed mice, while the ON/OFF ratio of normally dosed mice was statistically the same as that of the control mice at both time points. Moreover, through re-administration of the ICG4-GS-Au25 nanoprobe to the same mice and multiple blood samplings, the inventors also consecutively monitored the rapid drop and subsequent recovery of hepatic GSH level during the progression of APAP-induced liver injury (FIG. 43F).

Figure 54:
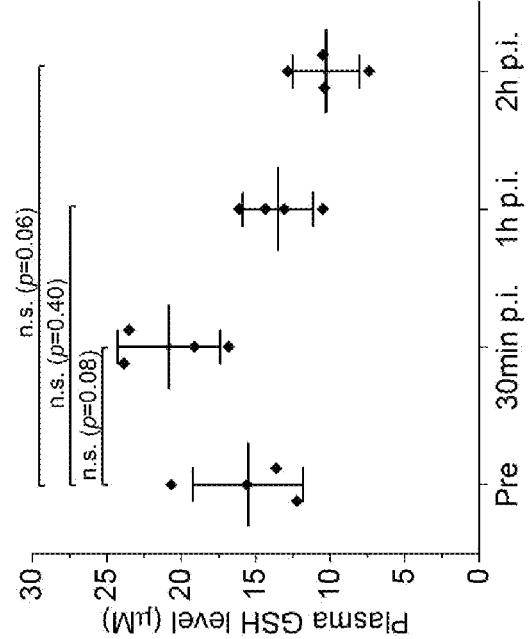
FIG. 54. Serum GSH level following APAP administration. GSH level in the blood serum didn't change significantly during the first 2 h after i.p. administration of 300 mg/kg body weight APAP. Data reported are means and standard deviation overlapped with data points from individual mouse. Statistical significance is evaluated by two-sample equal variance t-test. $P<0.05$ is considered statistically significant. N=4 mice for the experiment.

Monitoring hepatic GSH depletion improves prognosis of drug-induced liver injury. Depletion of hepatic GSH by hepatotoxic drug such as APAP is known to strongly correlate with subsequent liver injuries, but it usually occurs much earlier than the death of liver cells and the elevation of common liver function biomarkers (FIG. 44A) (Yoon et al., 2016; Jaeschke et al., 2014). While hepatic GSH depletion can be readily detected with ICG4-GS-Au25 just 30 min after the administration of overdosed APAP, the clinically most used "gold standard" liver injury biomarker, serum ALT level, failed to show significant increase even 4 h after overdosing APAP and only exhibited a less than two-fold increase over the normal values at 5 h p.i. (FIG. 44B). If left untreated, the liver damage was found to progress rapidly, and the serum ALT level would exponentially increase by over 100-fold at 12 h p.i. Moreover, the inventors monitored the serum GSH level after APAP overdose and found that serum GSH level didn't change significantly even after 2 h of APAP administration (FIG. 54), which suggested serum GSH level was much less sensitive to drug induced liver injury than liver GSH level, likely due to the fact that serum GSH level is over two orders of magnitude lower than that of liver.

Early detection of hepatic GSH depletion in APAP-induced liver injury with ICG4-GS-Au25 allows early treatment and effective remedy of liver damage. The inventors administered N-acetylcysteine (NAC), a precursor for hepatic GSH biosynthesis, to the mice at various time points after the injection of overdosed APAP and measured their serum ALT levels at 12 h p.i. of APAP (FIG. 44C). Our results showed the antidote NAC could effectively remedy the liver injury progression when administered at early time period after APAP overdose, but its protective effect would decrease exponentially as the administration time was postponed. Notably, as shown in FIG. 44D, NAC administered at 30 min post-injection of APAP (early treatment) could almost completely reverse the liver damage, as proven by the morphology evaluation and cell death analysis of liver tissues via terminal deoxynucleotidyl transferase dUTP nick end labeling (TUNEL). In contrast, NAC given at 5.5 h after APAP overdose (delayed treatment) still resulted in severe hemorrhage on the liver tissue as well as the pervasive death of liver cells, consistent with the serum ALT test. These results further highlighted the importance of early diagnosis of hepatic GSH depletion before the elevation of biomarkers, which could indeed offer a critical time-window for early and effective treatment of liver injury that the conventional biomarker failed to do.

Discussion. As the major detoxification organ in the body, the liver is injured most frequently by various xenobiotics such as overdosed drugs, heavy metals and alcohol. In particular, drug-induced liver injury has been the primary cause of non-approval of new drugs as well as market withdrawal of existing drugs and the leading reason of acute liver failure in many countries[33, 34]. Thus, early detection of the liver injuries is crucial to both preclinical drug development and reducing the liver failure incidents in the clinics. To date, the detection of liver injuries relies heavily on the endogenous serum biomarkers (e.g., ALT) released into the blood after the death of liver cells[35], which, however, are known not sensitive enough for early detection of liver injuries yet still being widely used in the clinics because of the simplicity of blood test. Despite that more sensitive exogenous probes have been developed to optically image liver injuries by detecting reactive oxidative species[34, 36], none of them can be used for blood test and their future clinical application is severely limited by the shallow tissue penetration depth of light.

Not limited to APAP, many other hepatotoxic drugs[7, 30, 37], heavy metals[38, 39] and chemicals[18, 31, 40] can also injure the liver cells through the similar GSH-depletion mechanism. Considering that hepatic GSH depletion is a common phenomenon that precedes many types of liver injuries and diseases, this strategy should also be applied to other drugs as well. For example, the inventors showed that this strategy could also be used to prognosticate liver injuries induced by chlorpromazine (CPZ), a widely used antipsychotic drug that is hepatotoxic if overdosed, earlier than the conventional serum ALT test (FIG. 45A-G).

Figure 55:
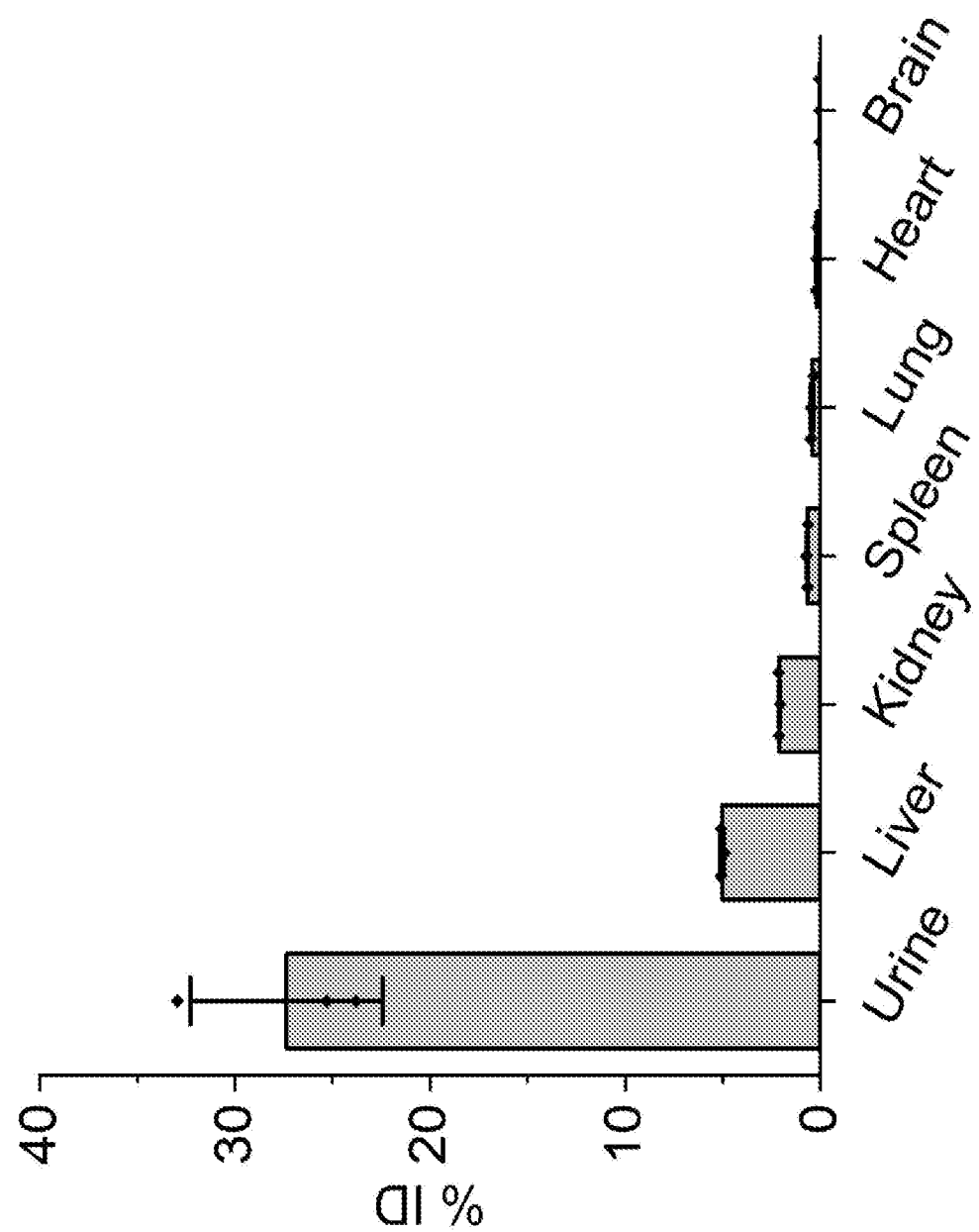
FIG. 55. Biodistribution of Au at 24 h after administration of ICG4-GS-Au25 in APAP overdosed mice. Mice (N=3) were overdosed with 300 mg/kg body weight APAP and i.v. injected with ICG4-GS-Au25 afterwards. ICP-MS quantification of Au in the organs at 24 h p.i. showed that Au accumulation in the RES organs (e.g., liver) was low, over 10 times lower than those reported for larger non-renal clearable gold nanoparticles (Hirn et al., 2011).

In conclusion, the inventors demonstrated that combining the GSH-activatable nanoprobe, ICG$_4$-GS-Au25, and hepatic GSH efflux, an intrinsic physiological process in the body, drug-induced depletion of hepatic GSH can be noninvasively detected by in vivo fluorescence imaging before the elevation of conventional liver biomarkers; so that early remedy of the liver function can be achieved. Since the nanoprobe can be rapidly eliminated out of the body, they can also noninvasively and fluorescently image hepatic GSH recovery kinetics after the liver was injured by APAP at high specificity. More importantly, since the nanoprobe is highly stable during the extrahepatic blood circulation and can only be activated by hepatic GSH in the liver, it carried the information of the hepatic GSH level back to the blood stream, and thus allowed us to quantitatively and consecutively monitor hepatic GSH depletion and recovery kinetics through the simple blood test. These findings highlight that changes in the local physiological environment can be remotely monitored through the blood test once the transport and bio-nano interactions of the nanoprobe are specially engineered and combined with unique pathophysiological processes. The simplicity and high specificity of this nanoprobe also lays down a solid foundation for overcoming the limited tissue penetration depth of light for monitoring hepatic GSH level in large animals and even humans in the future. Moreover, the Au25 nanoclusters in APAP overdosed mice were still efficiently cleared through the urine with minimal accumulation in the liver and other major organs at 24 h p.i. (FIG. 55). Collectively, this GSH-activatable and body-clearable nanoprobes successfully addressed a long-standing challenge in the noninvasive monitoring of hepatic GSH status, holding great promise in advancing oxidative stress-related research and early management of many diseases in the clinical settings.

The descriptions of the various embodiments of the present disclosure have been presented for purposes of illustration and are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

REFERENCES

The following references, to the extent that they provide exemplary procedural or other details supplementary to those set forth herein, are specifically incorporated herein by reference.

Tsoi K M, MacParland S A, Ma X-Z, Spetzler V N, Echeverri J, Ouyang B, et al. Mechanism of hard-nanomaterial clearance by the liver. *Nature materials* 2016, 15(11): 1212.

Wilhelm S, Tavares A J, Dai Q, Ohta S, Audet J, Dvorak H F, et al. Analysis of nanoparticle delivery to tumours. *Nature Reviews Materials* 2016, 1(5): 16014.

Fischer H C, Liu L, Pang K S, Chan W C. Pharmacokinetics of nanoscale quantum dots: in vivo distribution, sequestration, and clearance in the rat. *Adv Funct Mater* 2006, 16(10): 1299-1305.

Ye L, Yong K-T, Liu L, Roy I, Hu R, Zhu J, et al. A pilot study in non-human primates shows no adverse response to intravenous injection of quantum dots. *Nature nanotechnology* 2012, 7(7): 453.

Balasubramanian S K, Jittiwat J, Manikandan J, Ong C-N, Liya E Y, Ong W-Y. Biodistribution of gold nanoparticles and gene expression changes in the liver and spleen after intravenous administration in rats. *Biomaterials* 2010, 31(8): 2034-2042.

Gu X, Manautou J E. Molecular mechanisms underlying chemical liver injury. *Expert Rev Mol Med* 2012, 14.

Braet F, Wisse E. Structural and functional aspects of liver sinusoidal endothelial cell fenestrae: a review. *Comparative hepatology* 2002, 1(1): 1.

Kaplowitz N, Aw T Y, Ookhtens M. The regulation of hepatic glutathione. *Annu Rev Pharmacool Toxicol* 1985, 25(1): 715-744.

Ballatori N, Krance S M, Marchan R, Hammond C L. Plasma membrane glutathione transporters and their roles in cell physiology and pathophysiology. *Mol Aspects Med* 2009, 30(1-2): 13-28.

Dickinson D A, Forman H J. Cellular glutathione and thiols metabolism. *Biochem Pharmacol* 2002, 64(5-6): 1019-1026.

Singhal R K, Anderson M E, Meister A. Glutathione, a first line of defense against cadmium toxicity. *The FASEB Journal* 1987, 1(3): 220-223.

Du B, Jiang X, Das A, Zhou Q, Yu M, Jin R, et al. Glomerular barrier behaves as an atomically precise band-pass filter in a sub-nanometre regime. *Nature Nanotechnology* 2017, 12: 1096.

Du B, Yu M, Zheng J. Transport and interactions of nanoparticles in the kidneys. *Nature Reviews Materials* 2018: 1.

Shinohara H, Tanaka A, Kitai T, Yanabu N, Inomoto T, Satoh S, et al. Direct measurement of hepatic indocyanine green clearance with near-infrared spectroscopy: Separate evaluation of uptake and removal. *Hepatology* 1996, 23(1): 137-144.

Sun S, Ning X, Zhang G, Wang Y C, Peng C, Zheng J. Dimerization of organic dyes on luminescent gold nanoparticles for ratiometric pH sensing. *Angew Chem* 2016, 128(7): 2467-2470.

Choi H S, Liu W, Misra P, Tanaka E, Zimmer J P, Ipe B I, et al. Renal clearance of quantum dots. *Nat Biotechnol* 2007, 25(10): 1165.

Dreaden E C, Austin L A, Mackey M A, El-Sayed M A. Size matters: gold nanoparticles in targeted cancer drug delivery. *Ther Deliv* 2012, 3(4): 457-478.

Ookhtens M, Hobdy K, Corvasce M, Aw T Y, Kaplowitz N. Sinusoidal efflux of glutathione in the perfused rat liver. Evidence for a carrier-mediated process. *J Clin Invest* 1985, 75(1): 258.

Plummer J L, Smith B R, Sies H, Bend J R. [8] Chemical depletion of glutathione in vivo. *Methods Enzymol* 1981, 77: 50-59.

Adams J, Lauterburg B, Mitchell J. Plasma glutathione and glutathione disulfide in the rat: regulation and response to oxidative stress. *J Pharmacol Exp Ther* 1983, 227(3): 749-754.

Weber C A, Duncan C A, Lyons M J, Jenkinson S G. Depletion of tissue glutathione with diethyl maleate enhances hyperbaric oxygen toxicity. *American Journal of Physiology-Lung Cellular and Molecular Physiology* 1990, 258(6): L308-L312.

Winters R A, Zukowski J, Ercal N, Matthews R H, Spitz D R. Analysis of glutathione, glutathione disulfide, cysteine, homocysteine, and other biological thiols by high-performance liquid chromatography following derivatization by n-(1-pyrenyl) maleimide. *Anal Biochem* 1995, 227(1): 14-21.

Parmentier C, Leroy P, Wellman M, Nicolas A. Determination of cellular thiols and glutathione-related enzyme activities: versatility of high-performance liquid chromatography-spectrofluorimetric detection. *Journal of Chromatography B: Biomedical Sciences and Applications* 1998, 719(1-2): 37-46.

Jocelyn P. The Standard Redox Potential of Cysteine-Cystine from the Thiol-Disulphide Exchange Reaction with Glutathione and Lipoic Acid. *The FEBS Journal* 1967, 2(3): 327-331.

Wu G, Fang Y-Z, Yang S, Lupton J R, Turner N D. Glutathione metabolism and its implications for health. *The Journal of nutrition* 2004, 134(3): 489-492.

Tate S S, Meister A. γ-Glutamyl transpeptidase: catalytic, structural and functional aspects. *The Biological Effects of Glutamic Acid and Its Derivatives*. Springer, 1981, pp 357-368.

Paolicchi A, Sotiropuolou M, Perego P, Daubeuf S, Visvikis A, Lorenzini E, et al. γ-Glutamyl transpeptidase catalyses the extracellular detoxification of cisplatin in a human cell line derived from the proximal convoluted tubule of the kidney. *Eur J Cancer* 2003, 39(7): 996-1003.

Hanigan M H, Pitot H C. Gamma-glutamyl transpeptidase—its role in hepatocarcinogenesis. *Carcinogenesis* 1985, 6(2): 165-172.

Peng C, Gao X, Xu J, Du B, Ning X, Tang S, et al. Targeting orthotopic gliomas with renal-clearable luminescent gold nanoparticles. *Nano research* 2017, 10(4): 1366-1376.

Wu, Z., Chen, J. & Jin, R. One-Pot Synthesis of Au25 (S G) 18 2- and 4-nm Gold Nanoparticles and Comparison of Their Size-Dependent Properties. *Adv. Funct. Mater.* 21, 177-183 (2011).

Liu, J. et al. PEGylation and Zwitterionization: Pros and Cons in the Renal Clearance and Tumor Targeting of Near-IR-Emitting Gold Nanoparticles. *Angew. Chem.* 125, 12804-12808 (2013).

Jocelyn, P. The Standard Redox Potential of Cysteine-Cystine from the Thiol-Disulphide Exchange Reaction with Glutathione and Lipoic Acid. *The FEES Journal* 2, 327-331 (1967).

Wu, Z., Suhan, J. & Jin, R. One-pot synthesis of atomically monodisperse, thiol-functionalized Au 25 nanoclusters. *J Mater. Chem.* 19, 622-626 (2009).

Dhar, S., Daniel, W. L., Giljohann, D. A., Mirkin, C. A. & Lippard, S. J. Polyvalent oligonucleotide gold nanoparticle conjugates as delivery vehicles for platinum (IV) warheads. *J American Chemical Society* 131, 14652-14653 (2009).

Weber, C. A., Duncan, C. A., Lyons, M. J. & Jenkinson, S. G. Depletion of tissue glutathione with diethyl maleate enhances hyperbaric oxygen toxicity. *American J Physiology-Lung Cellular Molecular Physiol* 258, L308-L312 (1990).

Adams, J., Lauterburg, B. & Mitchell, J. Plasma glutathione and glutathione disulfide in the rat: regulation and response to oxidative stress. *J Pharmacol. Exp. Ther.* 227, 749-754 (1983).

Winters, R. A., Zukowski, J., Ercal, N., Matthews, R. H. & Spitz, D. R. Analysis of glutathione, glutathione disulfide, cysteine, homocysteine, and other biological thiols by high-performance liquid chromatography following derivatization by n-(1-pyrenyl) maleimide. *Anal. Biochem.* 227, 14-21 (1995).

Wu, Z., Suhan, J. & Jin, R. One-pot synthesis of atomically monodisperse, thiol-functionalized Au 25 nanoclusters. *J. Mater. Chem.* 19, 622-626 (2009).

Rahman, I, Kode, A. & Biswas, S. K. Assay for quantitative determination of glutathione and glutathione disulfide levels using enzymatic recycling method. *Nature protocols* 1, 3159 (2006).

Hirn, S. et al. Particle size-dependent and surface charge-dependent biodistribution of gold nanoparticles after intravenous administration. *European journal of pharmaceutics and* biopharmaceutics 77, 407-416 (2011).

Chen, Y. et al. Glutathione defense mechanism in liver injury: insights from animal models. *Food and chemical toxicology* 60, 38-44 (2013).

Deleve, L. D. & Kaplowitz, N. in *Seminars in liver disease*. 251-266 (© 1990 by Thieme Medical Publishers, Inc.).

Meister, A. & Anderson, M. E. Glutathione. *Annual review of biochemistry* 52, 711-760 (1983).

Kaplowitz, N., Aw, T. Y. & Ookhtens, M. The regulation of hepatic glutathione. *Annual review of pharmacology and toxicology* 25, 715-744 (1985).

Kaplowitz, N. The importance and regulation of hepatic glutathione. *The Yale journal of biology and medicine* 54, 497 (1981).

Mitchell, J., Jollow, D., Potter, W., Gillette, J. & Brodie, B. Acetaminophen-induced hepatic necrosis. IV. Protective role of glutathione. *Journal of Pharmacology and Experimental Therapeutics* 187, 211-217 (1973).

Lee, A. U. & Farrell, G. C. Mechanism of azathioprine-induced injury to hepatocytes: roles of glutathione depletion and mitochondrial injury. *Journal of hepatology* 35, 756-764 (2001).

Hirano, A., Kaplowitz, N., Tsukamoto, H., Kamimura, S. & Fernandez-Checa, J. C. Hepatic mitochondrial glutathione depletion and progression of experimental alcoholic liver disease in rats. *Hepatology* 16, 1423-1427 (1992).

Fernandez-Checa, J. C. & Kaplowitz, N. Hepatic mitochondrial glutathione: transport and role in disease and toxicity. *Toxicology and applied pharmacology* 204, 263-273 (2005).

Gao, B. & Bataller, R. Alcoholic liver disease: pathogenesis and new therapeutic targets. *Gastroenterology* 141, 1572-1585 (2011).

Rolo, A. P., Teodoro, J. S. & Palmeira, C. M. Role of oxidative stress in the pathogenesis of nonalcoholic steatohepatitis. *Free Radical Biology and Medicine* 52, 59-69 (2012).

Garcia-Ruiz, C. & Fernandez-Checa, J. C. Mitochondrial glutathione: hepatocellular survival-death switch. *Journal of gastroenterology and hepatology* 21, S3-S6 (2006).

Czeczot, H., Scibior, D., Skrzycki, M. & Podsiad, M. Glutathione and GSH-dependent enzymes in patients with liver cirrhosis and hepatocellular carcinoma. *Acta biochimica polonica* 53, 237-241 (2006).

Purucker, E., Winograd, R., Roeb, E. & Matern, S. Glutathione status in liver and plasma during development of biliary cirrhosis after bile duct ligation. *Research in experimental medicine* 198, 167-174 (1998).

Lu, S. C. Glutathione synthesis. *Biochimica et Biophysica Acta (BBA)-General Subjects* 1830, 3143-3153 (2013).

Ookhtens, M., Hobdy, K., Corvasce, M., Aw, T. Y. & Kaplowitz, N. Sinusoidal efflux of glutathione in the perfused rat liver. Evidence for a carrier-mediated process. *The Journal of clinical investigation* 75, 258-265 (1985).

Lauterburg, B. H., Adams, J. D. & Mitchell, J. R. Hepatic glutathione homeostasis in the rat: efflux accounts for glutathione turnover. *Hepatology* 4, 586-590 (1984).

Vogt, B. L. & Richie Jr, J. P. Glutathione depletion and recovery after acute ethanol administration in the aging mouse. *Biochemical pharmacology* 73, 1613-1621 (2007).

Shaw, S., Rubin, K. P. & Lieber, C. S. Depressed hepatic glutathione and increased diene conjugates in alcoholic liver disease. *Digestive diseases and sciences* 28, 585-589 (1983).

Jewell, S. et al. Decreased hepatic glutathione in chronic alcoholic patients. *Journal of hepatology* 3, 1-6 (1986).

Macdonald, J. M., Schmidlin, O. & James, T. L. In vivo monitoring of hepatic glutathione in anesthetized rats by 13C NMR. *Magnetic Resonance in Medicine: An Official Journal of the International Society for Magnetic Resonance in Medicine* 48, 430-439 (2002).

Skamarauskas, J. T. et al. *Noninvasive In Vivo Magnetic Resonance Measures of Glutathione* Synthesis in Human and Rat Liver as an Oxidative Stress Biomarker. *Hepatology* 59, 2321-2330, doi:10.1002/hep.26925 (2014).

Jiang, X., Du, B. & Zheng, J. Glutathione-mediated biotransformation in the liver modulates nanoparticle transport. *Nature nanotechnology* 14, 874-882 (2019).

Yoon, E., Babar, A., Choudhary, M., Kutner, M. & Pyrsopoulos, N. Acetaminophen-induced hepatotoxicity: a comprehensive update. *Journal of clinical and translational hepatology* 4, 131 (2016).

Jaeschke, H., Xie, Y. & McGill, M. R. Acetaminophen-induced liver injury: from animal models to humans. *Journal of clinical and translational hepatology* 2, 153 (2014).

Yang, X. et al. Mouse liver protein sulfhydryl depletion after acetaminophen exposure. *Journal of Pharmacology and Experimental Therapeutics* 344, 286-294 (2013).

Sun, S. et al. Dimerization of organic dyes on luminescent gold nanoparticles for ratiometric pH sensing. *Angewandte Chemie International Edition* 55, 2421-2424 (2016).

Barazzouk, S., Kamat, P. V. & Hotchandani, S. Photoinduced electron transfer between chlorophyll a and gold nanoparticles. *The Journal of Physical Chemistry B* 109, 716-723 (2005).

Plummer, J. L., Smith, B. R., Sies, H. & Bend, J. R. in *Methods in enzymology* Vol. 77 50-59 (Elsevier, 1981).

Iida, A. et al. Carbamazepine-induced liver injury requires CYP3A-mediated metabolism and glutathione depletion in rats. *Drug Metabolism and Disposition* 43, 958-968 (2015).

Casini, A., Pompella, A. & Comporti, M. Liver glutathione depletion induced by bromobenzene, iodobenzene, and diethylmaleate poisoning and its relation to lipid peroxidation and necrosis. *The American journal of pathology* 118, 225 (1985).

Mohar, I. et al. Acetaminophen-induced liver damage in mice is associated with gender-specific adduction of peroxiredoxin-6. *Redox biology* 2, 377-387 (2014).

Lee, W. M. Drug-induced hepatotoxicity. *New England Journal of Medicine* 349, 474-485 (2003).

Shuhendler, A. J., Pu, K., Cui, L., Uetrecht, J. P. & Rao, J. Real-time imaging of oxidative and nitrosative stress in the liver of live animals for drug-toxicity testing. *Nature biotechnology* 32, 373 (2014).

Eguchi, A., Wree, A. & Feldstein, A. E. Biomarkers of liver cell death. *Journal of hepatology* 60, 1063-1074 (2014).

Miao, Q. et al. Molecular afterglow imaging with bright, biodegradable polymer nanoparticles. *Nature biotechnology* 35, 1102 (2017).

MacAllister, S. L., Young, C., Guzdek, A, Zhidkov, N. & O'Brien, P. J. Molecular cytotoxic mechanisms of chlorpromazine in isolated rat hepatocytes. *Canadian journal of physiology and pharmacology* 91, 56-63 (2013).

Nigam, D., Shukla, G. S. & Agarwal, A. K. Glutathione depletion and oxidative damage in mitochondria following exposure to cadmium in rat liver and kidney. *Toxicology letters* 106, 151-157 (1999).

Sheweita, S. A. Heavy metal-induced changes in the Glutathione levels and Glutathione Reductase/Glutathione S-Transferase activities in the liver of male mice. *International journal of toxicology* 17, 383-392 (1998).

Maellaro, E., Casini, A. F., Del Bello, B. & Comporti, M. Lipid peroxidation and antioxidant systems in the liver injury produced by glutathione depleting agents. *Biochemical pharmacology* 39, 1513-1521 (1990).

What is claimed is:

1. A biothiol-activatable composition which dissociates in the presence of a concentration of biothiols in a liver of a living subject, the biothiol-activatable composition comprising:
   a metal nanoparticle;
   a protein-binding reporter molecule, wherein the protein-binding reporter molecule is indocyanine green (ICG); and
   a linker molecule that is conjugated to the metal nanoparticle and further conjugated to the reporter molecule, wherein the linker molecule comprises glutathione, oxidized glutathione, thiolated polyethylene glycol, or disulfide polyethylene glycol;
   wherein the protein-binding reporter molecule is configured to bind serum protein;
   wherein the metal nanoparticle has an average number of ICG molecules conjugated thereto, and the average number of ICG molecules conjugated to the metal nanoparticle is 1 to 4; and
   wherein the linker molecule is displaceable or cleavable in the liver in the presence of a concentration of biothiols that are produced by the liver, such that the protein-binding reporter molecule and the metal nanoparticle are released from each other in the presence of the concentration of biothiols that are produced by the liver, and the metal nanoparticle is configured to be excreted by the kidneys into the urine upon release.

2. The biothiol-activatable composition of claim 1, wherein the protein-binding reporter molecule comprises at least one of a fluorescent dye molecule, a radioactive agent for PET or SPECT imaging, a CT contrast agent, an MRI contrast agent, or a therapeutic agent.

3. The biothiol-activatable composition of claim 2, wherein the protein-binding reporter molecule comprises the therapeutic agent and the therapeutic agent is a drug molecule.

4. The biothiol-activatable composition of claim 2, wherein the protein-binding reporter molecule comprises the radioactive agent for PET or SPECT imaging and the radioactive agent comprises at least one of a $^{64}Cu^{2+}$ complex or iodine.

5. The biothiol-activatable composition of claim 2, wherein the protein-binding reporter molecule comprises the MRI contrast agent and the MRI contrast agent comprises at least one of a gadolinium or iron oxide nanoparticles.

6. The biothiol-activatable composition of claim 1, wherein the metal nanoparticle comprises noble metal, gold, silver, platinum, carbon, iron oxide, ZnS, an organic material, metal complexes, semiconductor quantum dots, MoS, or a combination thereof.

7. The biothiol-activatable composition of claim 1, wherein the metal nanoparticle has a core size of less than 5 nm.

8. The biothiol-activatable composition of claim 1, wherein the metal nanoparticle is a gold nanoparticle comprising 25 gold atoms.

9. The biothiol-activatable composition of claim 1, wherein the linker molecule is selected from the group consisting of glutathione, a peptide containing glutathione, and thiol-terminated polyethylene glycol.

10. The biothiol-activatable composition of claim 1, wherein the biothiol-activatable composition has a hydrodynamic diameter in PBS less than the kidney filtration threshold prior to serum protein binding of the protein-binding reporter molecule when the biothiol-activatable composition is introduced in the blood stream of the living subject.

11. The biothiol-activatable composition of claim 1, wherein the metal nanoparticle quenches a signal from the protein-binding reporter molecule when the linker molecule is conjugated to both the metal nanoparticle and the protein-binding reporter molecule, and the signal from the protein-binding reporter molecule is no longer quenched by the metal nanoparticle upon release.

12. The biothiol-activatable composition of claim 1, wherein the linker molecule contains at least one disulfide bond that forms between thiols including glutathione, peptide containing glutathione, and thiolated polyethylene glycol.

13. The biothiol-activatable composition of claim 1, wherein the metal nanoparticle comprises a noble metal, gold, silver, platinum, carbon, iron oxide, ZnS, an organic material, or a combination thereof.

14. The biothiol-activatable composition of claim 1, wherein the protein-binding reporter molecule is a fluorescent dye molecule.

15. The biothiol-activatable composition of claim 11, wherein the protein-binding reporter molecule is indocyanine green (ICG).

16. The biothiol-activatable composition of claim 1, wherein the biothiol-activatable composition is ICG4-GS-Au25.

17. The biothiol-activatable composition of claim 1, wherein the concentration of biothiols is similar to what is found in liver sinusoids of the living subject when the living subject has a normal liver function.

18. The biothiol-activatable composition of claim 1, wherein the biothiol is glutathione and the glutathione has a concentration for displacing or cleaving the linker molecule of about 0.2 mM or greater.

19. The biothiol-activatable composition of claim 1, wherein the biothiol is cysteine and the cysteine has a concentration for displacing or cleaving the linker molecule of about 0.01 mM or greater.

20. A biothiol-activatable probe comprising:
   a gold nanoparticle;
   a set of linker molecules, comprising glutathione molecules, conjugated to the gold nanoparticle; and
   a set of ICG molecules conjugated to the gold nanoparticle through the linker molecule,
   wherein the gold nanoparticle has an average number of ICG molecules conjugated thereto, and the average number of ICG molecules conjugated to the gold nanoparticle is 1 to 4,
   wherein the biothiol-activatable probe has a hydrodynamic diameter in PBS less than the kidney filtration threshold, of about 6 nm, of a living subject prior to serum protein binding of the biothiol-activatable probe.

21. The biothiol-activatable probe of claim 20, wherein the gold nanoparticle comprises about 25 gold atoms.

* * * * *